US012655292B2

(12) United States Patent
Farrugia et al.

(10) Patent No.: US 12,655,292 B2
(45) Date of Patent: *Jun. 16, 2026

(54) THERMOPLASTIC POLYMER PARTICLES AND METHODS OF PRODUCTION AND USES THEREOF

(71) Applicant: Xerox Corporation, Norwalk, CT (US)

(72) Inventors: Valerie M. Farrugia, Oakville (CA);
Cristina Resetco, Toronto (CA);
Michael S. Hawkins, Cambridge (CA);
Shivanthi Easwari Sriskandha,
Mississauga (CA); Robert Claridge,
Kitchener (CA); **Carolyn Patricia
Moorlag**, Mississauga (CA)

(73) Assignee: Xerox Corporation, Norwalk, CT (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/637,112

(22) Filed: Apr. 16, 2024

(65) Prior Publication Data

US 2024/0279465 A1 Aug. 22, 2024

Related U.S. Application Data

(62) Division of application No. 16/946,622, filed on Jun.
30, 2020, now abandoned.

(60) Provisional application No. 62/897,534, filed on Sep.
9, 2019.

(51) Int. Cl.
| | |
|---|---|
| *C08L 77/06* | (2006.01) |
| *C08L 23/12* | (2006.01) |
| *C08L 67/03* | (2006.01) |
| *C08L 75/08* | (2006.01) |
| *C08L 83/04* | (2006.01) |

(52) U.S. Cl.
CPC .............. *C08L 77/06* (2013.01); *C08L 23/12*
(2013.01); *C08L 67/03* (2013.01); *C08L 75/08*
(2013.01); *C08L 83/04* (2013.01); C08L
2205/14 (2013.01); C08L 2207/02 (2013.01);
C08L 2207/04 (2013.01)

(58) Field of Classification Search
CPC ....... B29C 64/153; B33Y 10/00; B33Y 70/00;
C08G 69/14; C08G 77/04; C08J 2375/04;
C08J 2377/02; C08J 3/124; C08J 3/128;
C08K 3/36; C08L 2205/14; C08L
2207/02; C08L 2207/04; C08L 23/12;
C08L 67/03; C08L 75/00; C08L 75/08;
C08L 77/00; C08L 77/02; C08L 77/06;
C08L 83/04
See application file for complete search history.

(56) References Cited

FOREIGN PATENT DOCUMENTS

| | | | | |
|---|---|---|---|---|
| CN | 104194326 A | * | 12/2014 | ............. C08J 3/095 |
| WO | WO-2018141071 A1 | * | 8/2018 | .............. B09C 1/00 |

OTHER PUBLICATIONS

CN-104194326-A machine translation (Dec. 10, 2014).*

* cited by examiner

*Primary Examiner* — Ana L. Woodward
(74) *Attorney, Agent, or Firm* — Vorys, Sater, Seymour
and Pease LLP

(57) ABSTRACT

Thermoplastic polymer particles can be produced that com-
prise a thermoplastic polymer and an emulsion stabilizer
(e.g., nanoparticles and/or surfactant) associated with an
outer surface of the particles. The nanoparticles may be
embedded in the outer surface of the particles. Melt emul-
sification can be used to produce said particles. For example,
a method may include: mixing a mixture comprising a
thermoplastic polymer, an carrier fluid that is immiscible
with the thermoplastic polymer, and the emulsion stabilizer
at a temperature greater than a melting point or softening
temperature of the thermoplastic polymer and at a shear rate
sufficiently high to disperse the thermoplastic polymer in the
carrier fluid; cooling the mixture to below the melting point
or softening temperature of the thermoplastic polymer to
form the thermoplastic polymer particles; and separating the
thermoplastic polymer particles from the carrier fluid.

19 Claims, 52 Drawing Sheets

5.0kV 7.6mm x100 LM(UL)                                              500μm 5.0kV 7.6mm x100 LM(UL)                                              500μm 5.0kV 7.8mm x100 LM(UL)                    500μm 5.0kV 7.6mm x100 LM(UL)                    500μm 5.0kV 7.7mm x100 LM(UL) 500μm 5.0kV 7.7mm x100 LM(UL) 500μm 5.0kV 7.3mm x50 LM(UL)                              1.00mm 5.0kV 7.6mm x50 LM(UL)                              1.00mm 5.0kV 7.7mm x1.00k SE(UL)                    50.0μm 5.0kV 7.7mm x5.00k SE(UL)                    10.0μm 2.0kV 7.6mm x5.00k SE(UL)                    10.0μm 2.0kV 8.9mm x150 LM(UL)    300μm 2.0kV 8.5mm x5.00k SE(UL)       10.0μm 2.0kV 7.5mm x500 SE(UL)                                   100μm 5.0kV 7.8mm x200 LM(UL) 200µm 5.0kV 7.7mm x1.00k SE(U)       50.0μm 5.0kV 7.7mm x5.00k SE(U)       10.0μm

THERMOPLASTIC POLYMER PARTICLES AND METHODS OF PRODUCTION AND USES THEREOF

TECHNICAL FIELD

The present disclosure relates to thermoplastic polymer particles and methods of making such particles. Such particles, especially the highly spherical thermoplastic polymer particles, may be useful, among other things, as starting material for additive manufacturing.

BACKGROUND

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS). Incomplete interlayer fusion may result in structural weak points, which may be problematic for printing objects having exacting structural and mechanical tolerances.

Powder particulates usable in 3-D printing include thermoplastic polymers, including thermoplastic elastomers, metals and other solidifiable substances. Although a wide array of thermoplastic polymers are known, there are relatively few having properties suitable for use in 3-D printing, particularly when using powder bed fusion (PBF). Additive manufacturing methods using powdered materials include PBF, selective laser sintering (SLS), selective heat sintering (SHM), selective laser melting (SLM), electron beam melting (EBM), binder jetting, and multi jet fusion (MJF). In the SLS printing method, the particles are fused together by the energy from a high-powered laser. Typical thermoplastic polymers suitable for use in 3-D printing include those having sharp melting points and recrystallization points about 20° C. to 50° C. below the melting point. This difference may allow more effective coalescence between adjacent polymer layers to take place, thereby promoting improved structural and mechanical integrity.

For good printing performance to be realized using powder particulates, particularly polymer powder particulates, the powder particulates need to maintain good flow properties in the solid state. Flow properties may be evaluated, for example, by measuring the fraction of powder particulates from a sample that are able to pass through a standard sieve of a specified size and/or measuring of the angle of repose. High fractions of sievable powder particulates may be indicative of the particulates existing as non-agglomerated, substantially individual particulates, which may be characteristic of ready powder flow. Lower values of the angle of repose, in contrast, may be characteristic of ready powder flow. A relatively narrow particle size distribution and regularity of the particulate shape in a sample may also aid in promoting good powder flow performance.

Commercial powder particulates are oftentimes obtained by cryogenic grinding or precipitation processes, which may result in irregular particulate shapes and wide particle size distributions. Irregular particulate shapes may result in poor powder flow performance during 3-D printing processes. In addition, powder particulates having shape irregularity, especially those obtained from current commercial processes, may afford poor packing efficiency following deposition and consolidation, thereby resulting in extensive void formation in a printed object due to the powder particulates not packing closely together during deposition. Wide particle size distributions may be similarly problematic in this regard. Although poor powder flow performance may be addressed to some degree through dry blending with fillers and flow aids, these techniques may have limited effectiveness with softer polymer materials, such as elastomers, due to particulate aggregation.

SUMMARY OF THE INVENTION

The present disclosure relates to thermoplastic polymer particles and methods of making such particles. Such particles, especially the highly spherical thermoplastic polymer particles, may be useful, among other things, as starting material for additive manufacturing.

Described herein is a composition comprising: particles comprising a thermoplastic polymer and an emulsion stabilizer (e.g., nanoparticles and/or surfactant) associated with an outer surface of the particles.

Described herein is a method comprising: mixing a mixture comprising a thermoplastic polymer, an carrier fluid that is immiscible with the thermoplastic polymer, and emulsion stabilizer (e.g., nanoparticles and/or surfactant) at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising the thermoplastic polymer and the emulsion stabilizer associated with an outer surface of the solidified particles; and separating the solidified particles from the carrier fluid.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 50 shows an illustrative optical microscopy image at 100× magnification of thermoplastic polyurethane particulates obtained in.

DETAILED DESCRIPTION

Figure 1:
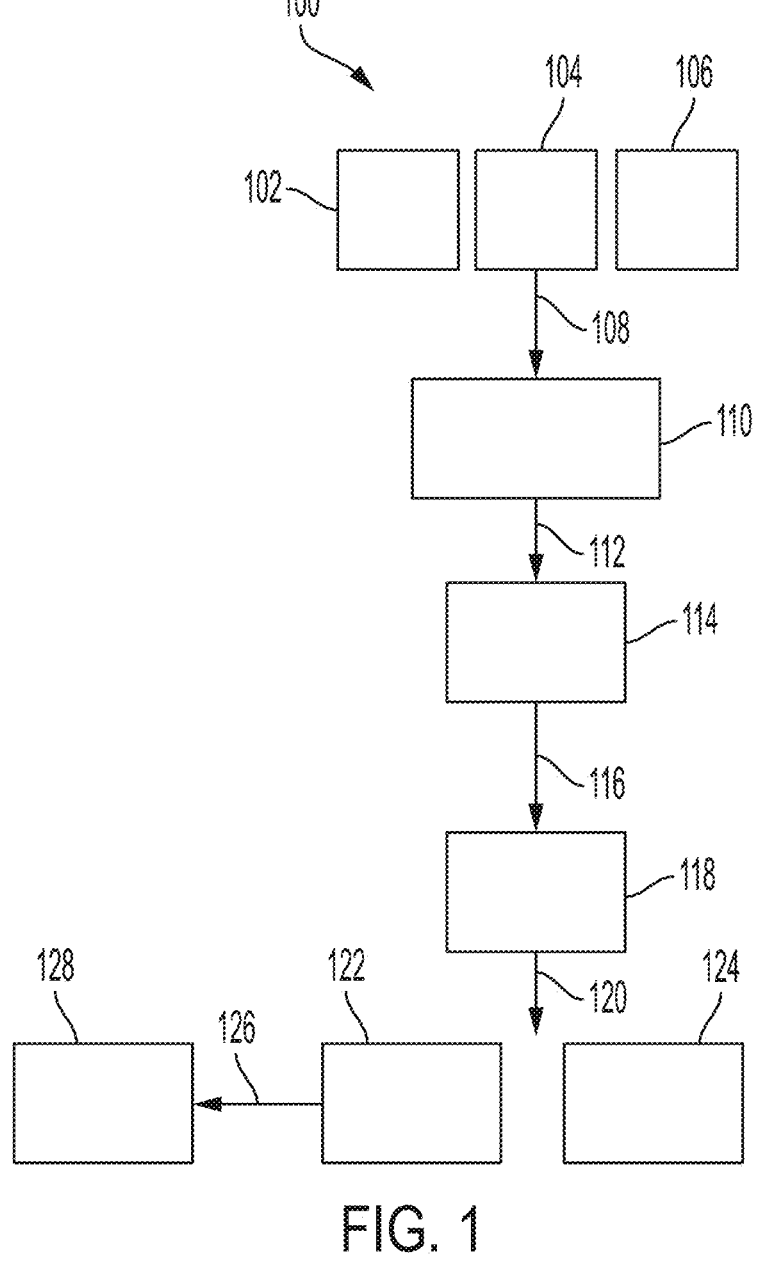
FIG. 1 is a flow chart of a nonlimiting example method 100 of the present disclosure.

The present disclosure relates to thermoplastic polymer particles and methods of making such particles. Such particles, especially the highly spherical thermoplastic polymer particles, may be useful, among other things, as starting material for additive manufacturing.

More specifically, the thermoplastic polymer particles described herein are produced by melt emulsification methods where a thermoplastic polymer is dispersed as a melt in a carrier fluid that is immiscible with the thermoplastic polymer. A sufficient amount of shear is used to cause the thermoplastic polymer melt to form droplets in the carrier fluid. Emulsion stabilizers (e.g., nanoparticles and/or surfactants, including one or more members of each type in some cases) effect the surface tension at the phase interface between the carrier fluid and the thermoplastic polymer melt. Once the melt emulsification process is complete, the dispersion is cooled, which solidifies the polymer into thermoplastic polymer particles.

Without being limited by theory, during the melt emulsification process, the emulsion stabilizers primarily reside at the interface between the polymer melt and the carrier fluid. As a result, when the mixture is cooled, the emulsion stabilizers remain at said interface. Advantageously, the emulsion stabilizers at a surface of the resultant particles may assist with the flow properties of the resultant particles.

As described previously, traditional methods of forming thermoplastic polymer particles with good flowability include at least two steps including first forming (e.g., by cryogenic grinding or precipitation processes) and purifying the particles and second coating the particles to some degree with a flow enhancing agent like nanoparticle silica, carbon black, or PTFE particles. The methods described herein advantageously produce thermoplastic polymer particles with a coating that enhances flowability of the particles in one process.

Further, without limitation by theory, the methods of the present disclosure appear to produce particles with a more homogeneous coverage of emulsion stabilizers, which may further improve flowability. Enhanced flowability is especially advantageous in additive manufacturing applications like 3-D printing.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherences via hydrogen bonding and/or other mechanisms. However, chemical bonding may be occurring to some degree.

As used herein, the term "embed" relative to nanoparticles and a surface of a polymer particle refers to the nanoparticle being at least partially extending into the surface such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter at with 10% of the sample (on a volume basis unless otherwise specified) is comprised of particles having a diameter less than said diameter value. As used herein, the term "D50" refers to a diameter at with 50% of the sample (on a volume basis unless otherwise specified) is comprised of particles having a diameter less than said diameter value. As used herein, the term "D90" refers to a diameter at with 90% of the sample (on a volume basis unless otherwise specified) is comprised of particles having a diameter less than said diameter value.

As used herein, the terms "diameter span" and "span" and "span size" when referring to diameter provides an indication of the breadth of the particle size distribution and is calculated as (D90–D10)/D50 (again each D-value is based on volume, unless otherwise specified).

Particle size can be determined by light scattering techniques using a Malvern MASTERSIZER™ 3000 or analysis of optical digital micrographs. Unless otherwise specified, light scattering techniques are used for analyzing particle size.

For light scattering techniques, the control samples were glass beads with a diameter within the range of 15 μm to 150 μm under the tradename Quality Audit Standards QAS4002™ obtained from Malvern Analytical Ltd. Samples were analyzed as dry powders, unless otherwise indicated. The particles analyzed were dispersed in air and analyzed using the AERO S dry powder dispersion module with the MASTERSIZER™ 3000. The particle sizes were derived using instruments software from a plot of volume density as a function of size.

Particle size measurement and diameter span can also be determined by optical digital microscopy. The optical images are obtained using a Keyence VHX-2000 digital microscope using version 2.3.5.1 software for particle size analysis (system version 1.93).

As used herein, when referring to sieving, pore/screen sizes are described per U.S.A. Standard Sieve (ASTM E11-17).

As used herein, the terms "circularity" and "sphericity" relative to the particles refer to how close the particle is to a perfect sphere. To determine circularity, optical microscopy images are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is CEA/P, where CEA is the circumference of a circle having the area equivalent to the area (A) of the actual particle.

As used herein, the term "sintering window" refers to the difference between the melting temperature (Tm) onset and the crystallization temperature (Tc) onset, or (Tm–Tc) onset. Tm, Tm (onset), Tc, and Tc (onset) are determined by differential scanning calorimetry per ASTM E794-06(2018) with a 10° C./min ramp rate and a 10° C./min cool rate.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, the term "embed" relative to nanoparticles and a surface of a polymer particle refers to the nanoparticle being at least partially extending into the surface such that polymer is in contact with the nanoparticle to a greater degree than would be if the nanoparticle were simply laid on the surface of the polymer particle.

As used herein, viscosity of carrier fluids are the kinematic viscosity at 25° C., unless otherwise specified, measured per ASTM D445-19. For commercially procured carrier fluids (e.g., PDMS oil), the kinematic viscosity data cited herein was provided by the manufacturer, whether measured according to the foregoing ASTM or another standard measurement technique.

Thermoplastic Polymer Particles and Methods of Making

FIG. 1 is a flow chart of a nonlimiting example method 100 of the present disclosure. The thermoplastic polymer 102, carrier fluid 104, and emulsion stabilizer 106 are combined 108 to produce a mixture 110. The components 102, 104, and 106 can be added in any order and include mixing and/or heating during the process of combining 108 the components 102, 104, and 106.

The mixture 110 is then processed 112 by applying sufficiently high shear to the mixture 110 at a temperature greater than the melting point or softening temperature of the thermoplastic polymer 102 to form a melt emulsion 114. Because the temperature is above the melting point or softening temperature of the thermoplastic polymer 102, the thermoplastic polymer 102 becomes a polymer melt. The shear rate should be sufficient enough to disperse the polymer melt in the carrier fluid 104 as droplets (i.e., the polymer emulsion 114). Without being limited by theory, it is believed that, all other factors being the same, increasing shear should decrease the size of the droplets of the polymer melt in the carrier fluid 104. However, at some point there may be diminishing returns on increasing shear and decreasing droplet size or may be disruptions to the droplet contents that decrease the quality of particles produced therefrom.

The melt emulsion 114 inside and/or outside the mixing vessel is then cooled 116 to solidify the polymer droplets into thermoplastic polymer particles (also referred to as solidified thermoplastic polymer particles). The cooled mixture 118 can then be treated 120 to isolate the thermoplastic polymer particles 122 from other components 124 (e.g., the carrier fluid 104, excess emulsion stabilizer 106, and the like) and wash or otherwise purify the thermoplastic polymer particles 122. The thermoplastic polymer particles 122 comprise the thermoplastic polymer 102 and at least a portion of the emulsion stabilizer 106 coating the outer surface of the thermoplastic polymer particles 122. Emulsion stabilizers 106, or a portion thereof, may be deposited as a uniform coating on the thermoplastic polymer particles 122. In some instances, which may be dependent upon non-limiting factors such as the temperature (including cooling rate), the type of thermoplastic polymer 102, and the types and sizes of emulsion stabilizers 106, the nanoparticles of emulsion stabilizers 106 may become at least partially embedded within the outer surface of thermoplastic polymer particles 122 in the course of becoming associated therewith. Even without embedment taking place, at least the nanoparticles within emulsion stabilizers 106 may remain robustly associated with thermoplastic polymer particles 122 to facilitate their further use. In contrast, dry blending already formed thermoplastic polymer particulates (e.g., formed by cryogenic grinding or precipitation processes) with a flow aid like silica nanoparticles does not result in a robust, uniform coating of the flow aid upon the thermoplastic polymer particulates.

Advantageously, carrier fluids and washing solvents of the systems and methods described herein (e.g., method 101) can be recycled and reused. One skilled in the art will recognize any necessary cleaning of used carrier fluid and solvent necessary in the recycling process.

The thermoplastic polymer 102 and carrier fluid 104 should be chosen such that at the various processing temperatures (e.g., from room temperature to process temperature) the thermoplastic polymer 102 and carrier fluid 104 are immiscible. An additional factor that may be considered is the differences in (e.g., a difference or a ratio of) viscosity at process temperature between the molten polyamide 102 and the carrier fluid 104. The differences in viscosity may affect droplet breakup and particle size distribution. Without being limited by theory, it is believed that when the viscosities of the molten polyamide 102 and the carrier fluid 104 are too similar, the circularity of the product as a whole may be reduced where the particles are more ovular and more elongated structures are observed.

Examples of thermoplastic polymers 102 include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems of the present disclosure.

The thermoplastic polymers 102 in the compositions and methods of the present disclosure may be elastomeric or non-elastomeric. Some of the foregoing examples of thermoplastic polymers 102 may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, poly amide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10,36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—(CH$_2$)$_6$—NH—CO—(CH$_2$)$_8$—CO]$_n$. A polyamide followed by number(s) backslash number(s) are a copolymer of the polyamides indicated by the numbers before and after the backslash.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis (phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Compatibilizers may optionally be used to improve the blending efficiency and efficacy thermoplastic polyester with one or more thermoplastic polymers. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

The thermoplastic polymers 102 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The thermoplastic polymers 102 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymers 102 may optionally comprise an additive. Typically, the additive would be present before addition of the thermoplastic polymers 102 to the mixture 110. Therefore, in the thermoplastic polymer melt droplets and resultant thermoplastic polymer particles, the additive is dispersed throughout the thermoplastic polymer. Accordingly, for clarity, this additive is referred to herein as an "internal additive." The internal additive may be blended with the thermoplastic polymer just prior to making the mixture 110 or well in advance.

When describing component amounts in the compositions described herein (e.g., the mixture 110 and thermoplastic polymer particles 122), a weight percent based on the thermoplastic polymer 102 not inclusive of the internal additive. For example, a composition comprising 1 wt % of emulsion stabilizer by weight of 100 g of a thermoplastic polymer 102 comprising 10 wt % internal additive and 90 wt % thermoplastic polymer is a composition comprising 0.9 g of emulsion stabilizer, 90 g of thermoplastic polymer, and 10 g of internal additive.

The internal additive may be present in the thermoplastic polymer 102 at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer 102. For example, the thermoplastic polymer 102 may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof.

The thermoplastic polymer 102 may be present in the mixture 110 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the thermoplastic polymer 102 and carrier fluid 104 combined.

Suitable carrier fluids 104 have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt).

Examples of carrier fluids 104 include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. The carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid 104. In another example, a carrier fluid 104 comprising a silicone oil and an alkyl-terminal polyethylene glycol may form a two-phase carrier fluid 104.

The carrier fluid 104 may be present in the mixture 110 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the thermoplastic polymer 102 and carrier fluid 104 combined.

In some instances, the carrier fluid 104 may have a density of about 0.6 g/cm³ to about 1.5 g/cm³, and the thermoplastic polymer 102 has a density of about 0.7 g/cm³ to about 1.7 g/cm³, wherein the thermoplastic polymer has a density similar, lower, or higher than the density of the carrier fluid.

The emulsion stabilizers used in the methods and compositions of the present disclosure may comprise nanoparticles (e.g. oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 $m^2$/g), AEROSIL® RX50 (about 40 nm average diameter silica nanoparticles having a hydrophobically modified surface and a BET surface area of 35±10 $m^2$/g), AEROSIL® 380 (silica nanoparticles having a hydrophilically modified surface and a BET surface area of 380±30 $m^2$/g)), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 $m^2$/g to about 500 $m^2$/g (or about 10 $m^2$/g to about 150 $m^2$/g, or about 25 $m^2$/g to about 100 $m^2$/g, or about 100 $m^2$/g to about 250 $m^2$/g, or about 250 $m^2$/g to about 500 $m^2$/g).

Nanoparticles may be included in the mixture 110 at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the thermoplastic polymer 102.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture 110 at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the polyamide 102. Alternatively, the mixture 110 may comprise no (or be absent of) surfactant.

A weight ratio of nanoparticles to surfactant may be about 1:10 to about 10:1 (or about 1:10 to about 1:1, or about 1:5 to about 5:1, or about 1:1 to about 10:1).

As described above, the components 102, 104, and 106 can be added in any order and include mixing and/or heating during the process of combining 108 the components 102, 104, and 106. For example, the emulsion stabilizer 106 may first be dispersed in the carrier fluid 104, optionally with heating said dispersion, before adding the thermoplastic polymer 102. In another nonlimiting example, the thermoplastic polymer 102 may be heated to produce a polymer melt to which the carrier fluid 104 and emulsion stabilizer 106 are added together or in either order. In yet another nonlimiting example, the thermoplastic polymer 102 and carrier fluid 104 can be mixed at an a temperature greater than the melting point or softening temperature of the thermoplastic polymer 102 and at a shear rate sufficient enough to disperse the thermoplastic polymer melt in the carrier fluid 104. Then, the emulsion stabilizer 106 can be added to form the mixture 110 and maintained at suitable process conditions for a set period of time.

Combining 108 the components 102, 104, and 106 in any combination can occur in a mixing apparatus used for the processing 112 and/or another suitable vessel. By way of nonlimiting example, the thermoplastic polymer 102 may be heated to a temperature greater than the melting point or softening temperature of the thermoplastic polymer 102 in the mixing apparatus used for the processing 112, and the emulsion stabilizer 106 may be dispersed in the carrier fluid 104 in another vessel. Then, said dispersion may be added to the melt of the thermoplastic polymer 102 in the mixing apparatus used for the processing 112.

The mixing apparatuses used for the processing 112 to produce the melt emulsion 114 should be capable of maintaining the melt emulsion 114 at a temperature greater than the melting point or softening temperature of the thermoplastic polymer 102 and applying a shear rate sufficient to disperse the polymer melt in the carrier fluid 104 as droplets.

Examples of mixing apparatuses used for the processing 112 to produce the melt emulsion 114 include, but are not limited to, extruders (e.g., continuous extruders, batch extruders, and the like), stirred reactors, blenders, reactors with inline homogenizer systems, and the like, and apparatuses derived therefrom.

Processing 112 and forming the melt emulsion 114 at suitable process conditions (e.g., temperature, shear rate, and the like) for a set period of time.

The temperature of processing 112 and forming the melt emulsion 114 should be a temperature greater than the melting point or softening temperature of the thermoplastic polymer 102 and less than the decomposition temperature of any components 102, 104, and 106 in the mixture 110. For example, the temperature of processing 112 and forming the melt emulsion 114 may be about 1° C. to about 50° C. (or about 1° C. to about 25° C., or about 5° C. to about 30° C., or about 20° C. to about 50° C.) greater than the melting point or softening temperature of the thermoplastic polymer 102 provided the temperature of processing 112 and forming the melt emulsion 114 is less than the decomposition temperature of any components 102, 104, and 106 in the mixture 110.

The shear rate of processing 112 and forming the melt emulsion 114 should be sufficiently high to disperse the polymer melt in the carrier fluid 104 as droplets. Said droplets should comprise droplets having a diameter of about 1000 μm or less (or about 1 μm to about 1000 μm, or about 1 μm to about 50 μm, or about 10 μm to about 100 μm, or about 10 μm to about 250 μm, or about 50 μm to about 500 μm, or about 250 μm to about 750 μm, or about 500 μm to about 1000 μm).

The time for maintaining said temperature and shear rate for processing 112 and forming the melt emulsion 114 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing 112 can be stopped. That time may depend on, among other things, temperature, shear rate, thermoplastic polymer 102 composition, the carrier fluid 104 composition, and the emulsion stabilizer 106 composition.

The melt emulsion 114 may then be cooled 116. Cooling 116 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 114. In some instances, the shear applied during heating may be applied during cooling.

The cooled mixture 118 resulting from cooling 116 the melt emulsion 114 comprises solidified thermoplastic polymer particles 122 (or simply thermoplastic polymer particles) and other components 124 (e.g., the carrier fluid 104, excess emulsion stabilizer 106, and the like). The thermoplastic polymer particles may be dispersed in the carrier fluid or settled in the carrier fluid.

The cooled mixture 118 may then be treated 120 to separate thermoplastic polymer particles 122 (or simply thermoplastic polymer particles 122) from the other components 124. Suitable treatments include, but are not limited to, washing, filtering, centrifuging, decanting, and the like, and any combination thereof.

Solvents used for washing the thermoplastic polymer particles 122 should generally be (a) miscible with the carrier fluid 104 and (b) nonreactive (e.g., non-swelling and non-dissolving) with the thermoplastic polymer 102. The choice of solvent will depend on, among other things, the composition of the carrier fluid and the composition of the thermoplastic polymer 102.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the thermoplastic polymer particles 122 by drying using an appropriate method such as air-drying, heat-drying, reduced pressure drying, freeze drying, or a hybrid thereof. The heating may be performed preferably at a temperature lower than the glass transition point of the thermoplastic polymer (e.g., about 50° C. to about 150° C.).

The thermoplastic polymer particles 122 after separation from the other components 124 may optionally be further classified to produce purified thermoplastic polymer particles 128. For example, to narrow the particle size distribution (or reduce the diameter span), the thermoplastic polymer particles 122 can be passed through a sieve having a pore size of about 10 μm to about 250 μm (or about 10 μm to about 100 μm, or about 50 μm to about 200 μm, or about 150 μm to about 250 μm).

In another example purification technique, the thermoplastic polymer particles 122 may be washed with water to remove surfactant while maintaining substantially all of the nanoparticles associated with the surface of the thermoplastic polymer particles 122. In yet another example purification technique, the thermoplastic polymer particles 122 may be blended with additives to achieve a desired final product. For clarity, because such additives are blended with the thermoplastic particles 122 or other particles resultant from the methods described herein after the particles are solidified, such additives are referred to herein as "external additives." Examples of external additives include flow aids, other polymer particles, fillers, and the like, and any combination thereof.

In some instances, a surfactant used in making the thermoplastic polymer particles 122 may be unwanted in downstream applications. Accordingly, yet another example purification technique may include at least substantial removal of the surfactant from the thermoplastic polymer particles 122 (e.g., by washing and/or pyrolysis).

The thermoplastic polymer particles 122 and/or purified thermoplastic polymer particles 128 (referred to as particles 122/128) may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the particles 122/128 is, in general, includes emulsion stabilizers (a) dispersed on an outer surface of the particles 122/128 and/or (b) embedded in an outer portion (e.g., outer 1 vol %) of the particles 122/128.

Further, where voids form inside the polymer melt droplets, emulsion stabilizers 106 should generally be at (and/or embedded in) the interface between the interior of the void and the thermoplastic polymer. The voids generally do not contain the thermoplastic polymer. Rather, the voids may contain, for example, carrier fluid, air, or be void. The particles 122/128 may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the particles 122/128.

The thermoplastic polymer 102 may be present in the particles 122/128 at about 90 wt % to about 99.5 wt % (or about 90 wt % to about 95 wt %, or about 92 wt % to about 97 wt %, or about 95 wt % to about 99.5 wt %) of the particles 122/128.

The emulsion stabilizers 106 may be present in the particles 122/128 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the particles 122/128. When purified to at least substantially remove surfactant or another emulsion stabilizer, the emulsion stabilizers 106 may be present in the particles 128 at less than 0.01 wt % (or 0 wt % to about 0.01 wt %, or 0 wt % to 0.001 wt %).

Upon forming thermoplastic particulates according to the disclosure herein, at least a portion of the nanoparticles, such as silica nanoparticles, may be disposed as a coating upon the outer surface of the thermoplastic particulates. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the SEM micrographs. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.10% to about 5%, or about 0.10% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the SEM micrographs The particles 122/128 may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D90. The particles 122/128 may also have a diameter span of about 0.2 to about 10 (or about 0.2 to about 0.5, or about 0.4 to about 0.8, or about 0.5 to about 1.0, or about 1 to about 3, or about 2 to about 5, or about 5 to about 10). Without limitation, diameter span values of 1.0 or greater are considered broad, and diameter spans values of 0.75 or less are considered narrow. Without limitation, diameter span values of 1.0 or greater are considered broad, and diameter spans values of 0.75 or less are considered narrow.

In a first nonlimiting example, the particles 122/128 may have a D10 of about 0.1 μm to about 10 μm, a D50 of about 0.5 μm to about 25 μm, and a D90 of about 3 μm to about 50 μm, wherein D10<D50<D90. Said particles 122/128 may have a diameter span of about 0.2 to about 2.

In a second nonlimiting example, the particles 122/128 may have a D10 of about 5 μm to about 30 μm, a D50 of about 30 μm to about 70 μm, and a D90 of about 70 μm to about 120 μm, wherein D10<D50<D90. Said particles 122/128 may have a diameter span of about 1.0 to about 2.5.

In a third nonlimiting example, the particles 122/128 may have a D10 of about 25 μm to about 60 μm, a D50 of about 60 μm to about 110 μm, and a D90 of about 110 μm to about 175 μm, wherein D10<D50<D90. Said particles 122/128 may have a diameter span of about 0.6 to about 1.5.

In a fourth nonlimiting example, the particles 122/128 may have a D10 of about 75 μm to about 125 μm, a D50 of about 100 μm to about 200 μm, and a D90 of about 125 μm to about 300 μm, wherein D10<D50<D90. Said particles 122/128 may have a diameter span of about 0.2 to about 1.2.

In a fifth nonlimiting example, the particles 122/128 may have a D10 of about 1 μm to about 50 μm (or about 5 μm to about 30 μm, or about 1 μm to about 25 μm, or about 25 μm to about 50 μm), a D50 of about 25 μm to about 100 μm (or about 30 μm to about 100 μm, or about 30 μm to about 70 μm, or about 25 μm to about 50 μm, or about 50 μm to about 100 μm), and a D90 of about 60 μm to about 300 μm (or about 70 μm to about 200 μm, or about 60 μm to about 150 μm, or about 150 μm to about 300 μm), wherein D10<D50<D90. The particles 122/128 may also have a diameter span of about 0.4 to about 3 (or about 0.6 to about 2, or about 0.4 to about 1.5, or about 1 to about 3).

The particles 122/128 may have a circularity of about 0.7 or greater (or about 0.7 to about 0.95, or about 0.9 to about 1.0, or about 0.93 to about 0.99, or about 0.95 to about 0.99, or about 0.97 to about 0.99, or about 0.98 to 1.0).

The particles 122/128 may have an angle of repose of about 200 to about 450 (or about 250 to about 35°, or about 300 to about 40°, or about 350 to about 45°).

The particles 122/128 may have a Hausner ratio of about 1.0 to about 1.5 (or about 1.0 to about 1.2, or about 1.1 to about 1.3, or about 1.2 to about 1.35, or about 1.3 to about 1.5).

The particles 122/128 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

Depending on the temperature and shear rate of processing 112 and the composition and relative concentrations of the components 102, 104, and 106, different shapes of the structures that compose the particles 122/128 have been observed. Typically, the particles 122/128 comprise substantially spherical particles (having a circularity of about 0.97 or greater). However, other structures included disc and elongated structures have been observed in the particles 122/128. Therefore, the particles 122/128 may comprise one or more of (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The particles 122/128 may have a sintering window that is within 10° C., preferably within 5° C., of the sintering window of the thermoplastic polymer 102 (comprising one or more PP-polyamides and optionally one or more other thermoplastic polymers).

Applications of Thermoplastic Polymer Particles

The thermoplastic polymer particles described herein may be utilized in 3-D print processes, particularly those employing selective laser sintering to promote particulate consolidation. The thermoplastic polymer particles of the present disclosure may exhibit advantageous properties over polymer particulates having irregular shapes or wider particulate distributions, such as those available commercially. In nonlimiting examples, the thermoplastic polymer particles of the present disclosure may undergo consolidation at lower laser powers and afford a decreased extent of void formation in an object produced by 3-D printing.

3-D printing processes of the present disclosure may comprise: depositing thermoplastic polymer particles of the present disclosure upon a surface in a specified shape, and once deposited, heating at least a portion of the thermoplastic polymer particles to promote consolidation thereof and form a consolidated body (object), such that the consolidated body has a void percentage of about 1% or less after being consolidated. For example, heating and consolidation of the thermoplastic polymer particles may take place in a 3-D printing apparatus employing a laser, such that heating and consolidation take place by selective laser sintering.

Any of the thermoplastic polymer particles disclosed herein may be formulated in a composition suitable for 3-D printing. Choice of the composition and type of elastomeric particulate may be based upon various factors such as, but not limited to, the laser power used for selective laser sinter, the type of object being produced, and the intended use conditions for the object.

Examples of objects that may be 3-D printed using the thermoplastic polymer particles of the present disclosure include, but are not limited to, containers (e.g., for food, beverages, cosmetics, personal care compositions, medicine, and the like), shoe soles, toys, furniture parts and decorative home goods, plastic gears, screws, nuts, bolts, cable ties, automotive parts, medical items, prosthetics, orthopedic implants, aerospace/aircraft-related parts, production of artifacts that aid learning in education, 3D anatomy models to aid in surgeries, robotics, biomedical devices (orthotics), home appliances, dentistry, electronics, sporting goods, and the like.

Other applications for the thermoplastic particulates of the present disclosure may include, but are not limited to, use as a filler in paints and powder coatings, inkjet materials and electrophotographic toners, and the like. In some instances, the thermoplastic particulates may have other preferred characteristics like diameter and span to be useful in said other applications.

NONLIMITING EXAMPLE EMBODIMENTS

A first nonlimiting embodiment of the present disclosure is a composition comprising: particles comprising a thermoplastic polymer (e.g., thermoplastic elastomer) and an emulsion stabilizer (e.g., nanoparticles and/or surfactant) associated with an outer surface of the particles. The first nonlimiting embodiment may include one or more of the following: Element 1: wherein the emulsion stabilizer comprises nanoparticles and at least some of the nanoparticles are embedded in the outer surface of the particles; Element 2: wherein the thermoplastic polymer is present at 90 wt % to 99.5 wt % of the particle; Element 3: wherein at least some of the particles have a void comprising the emulsion stabilizer at a void/thermoplastic polymer interface; Element 4: Element 3 and wherein the emulsion stabilizer comprises nanoparticles and the nanoparticles are embedded in the void/thermoplastic polymer interface; Element 5: Element 3 and wherein the void contains a carrier fluid having a viscosity at 25° C. of 1,000 cSt to 150,000 cSt; Element 6: wherein the particles further comprises elongated structures on the surface of the particles, wherein the elongated structures comprises the thermoplastic polymer with the emulsion stabilizer associated with an outer surface of the elongated structures; Element 7: wherein the emulsion stabilizer forms a coating that covers less than 5% of the surface of the particles; Element 8: wherein the emulsion stabilizer forms a coating that covers at least 5% of the surface of the particles; Element 9: wherein the emulsion stabilizer forms a coating that covers at least 25% of the surface of the particles; Element 10: wherein the emulsion stabilizer forms a coating that covers at least 50% of the surface of the particles; Element 11: wherein the particles further comprise a carrier fluid having a viscosity at 25° C. of 1,000 cSt to 150,000 cSt; Element 12: wherein the carrier fluid is present at about 5 wt % or less of the particles; Element 13: wherein the nanoparticles have an average diameter of 1 nm to 500 nm; Element 14: wherein the nanoparticles have a BET surface area of 10 m$^2$/g to 500 m$^2$/g; Element 15: wherein the thermoplastic polymer is selected from the group consisting of: polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof; Element 16: wherein a melting point or softening temperature of the thermoplastic polymer is 50° C. to 450° C.; Element 17: wherein the particles have a D10 of about 0.5 μm to about 125 μm, a D50 of about 1 μm to about 200 μm, and a D90 of about 70 μm to about 300 μm, wherein D10<D50<D90; Element 18: wherein the particles have a diameter span of about 0.2 to about 10; Element 19: wherein the particles have a D10 of about 5 μm to about 30 μm, a D50 of about 30 μm to about 70 μm, and a D90 of about 70 μm to about 120 μm, wherein D10<D50<D90; Element 20: Element 19 and wherein the particles have a diameter span of about 1.0 to about 2.5; Element 21: wherein the particles have a D10 of about 25 μm to about 60 μm, a D50 of about 60 μm to about 110 μm, and a D90 of about 110 μm to about 175 μm, wherein D10<D50<D90; Element 22: Element 21 and wherein the particles have a diameter span of about 0.6 to about 1.5; Element 23: wherein the particles have a D10 of about 75 μm to about 125 μm, a D50 of about 100 μm to about 200 μm, and a D90 of about 125 μm to about 300 μm, wherein D10<D50<D90; Element 24: Element 23 and wherein the solidified particles have a diameter span of about 0.2 to about 1; Element 25: wherein the particles have a circularity of about 0.90 to about 1.0; and Element 26: wherein the particles have a Hausner ratio of about 1.0 to about 1.5. Examples of combinations include, but are not limited to, Element 1 in combination with one or more of Elements 2-26; Element 3 (optionally in combination with Element 4 and/or Element 5) in combination with one or more of Elements 2 and 4-26; and two or more of Elements 1-15 in combination.

A second nonlimiting embodiment of the present disclosure is a method comprising: mixing a mixture comprising a thermoplastic polymer, an carrier fluid that is immiscible with the thermoplastic polymer (e.g., thermoplastic elastomer), and emulsion stabilizer (e.g., nanoparticles and/or surfactant) at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising the thermoplastic polymer and the emulsion stabilizer associated with an outer surface of the solidified particles; and separating the solidified particles from the carrier fluid. The first nonlimiting embodiment may include one or more of the following: Element 1; Element 2; Element 3; Element 4; Element 5; Element 6; Element 7; Element 8; Element 9; Element 10; Element 11; Element 12; Element 13; Element 14; Element 15; Element 16; Element 17; Element 18; Element 19; Element 20; Element 21; Element 22; Element 23; Element 24; Element 25; Element 26; Element 27: wherein the thermoplastic polymer is present in the mixture at 5 wt % to 60 wt % of the mixture; Element 28: wherein the emulsion stabilizer is present in the mixture at 0.05 wt % to 5 wt % by weight of the thermoplastic polymer; Element 29: wherein the carrier fluid is selected from the group consisting of: silicone oil, fluorinated silicone oils, perfluorinated silicone oils, polyethylene glycols, alkyl-terminal polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof; Element 30: Element 29 and wherein the silicone oil is selected from the group consisting of polydimethylsiloxane, methylphenylpolysiloxane, an alkyl modified poly dimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof; Element 31: wherein the carrier fluid has a density of 0.6 g/cm³ to 1.5 g/cm³, wherein the thermoplastic polymer has a density of 0.7 g/cm³ to 1.7 g/cm³; Element 32: wherein mixing occurs in an extrude; Element 33: wherein mixing occurs in a stirred reactor; and Element 33: wherein the mixture further comprises a surfactant. Example of combinations include, but are not limited to: those described relative to the first nonlimiting embodiment; Element 1 in combination with one or more of Elements 27-33; Element 3 (and optionally Element 4 and/or Element 5) in combination with one or more of Elements 27-33; two or more of Elements 27-33 in combination; and one or more of Elements 27-33 in combination with one or more of Elements 1-26.

Clauses

Clause 1. A composition comprising: particles comprising a thermoplastic polymer (e.g., thermoplastic elastomer) and an emulsion stabilizer (e.g., nanoparticles and/or surfactant) associated with an outer surface of the particles.

Clause 2. The composition of Clause 1, wherein the emulsion stabilizer comprises nanoparticles and at least some of the nanoparticles are embedded in the outer surface of the particles.

Clause 3. The composition of Clause 1, wherein the thermoplastic polymer is present at 90 wt % to 99.5 wt % of the particle.

Clause 4. The composition of Clause 1, wherein at least some of the particles have a void comprising the emulsion stabilizer at a void/thermoplastic polymer interface.

Clause 5. The composition of Clause 4, wherein the emulsion stabilizer comprises nanoparticles and the nanoparticles are embedded in the void/thermoplastic polymer interface.

Clause 6. The composition of Clause 4, wherein the void contains a carrier fluid having a viscosity at 25° C. of 1,000 cSt to 150,000 cSt Clause 7. The composition of Clause 1, wherein the particles further comprises elongated structures on the surface of the particles, wherein the elongated structures comprises the thermoplastic polymer with the emulsion stabilizer associated with an outer surface of the elongated structures.

Clause 8. The composition of Clause 1, wherein the emulsion stabilizer forms a coating that covers less than 5% of the surface of the particles.

Clause 9. The composition of Clause 1, wherein the emulsion stabilizer forms a coating that covers at least 5% of the surface of the particles.

Clause 10. The composition of Clause 1, wherein the emulsion stabilizer forms a coating that covers at least 25% of the surface of the particles.

Clause 11. The composition of Clause 1, wherein the emulsion stabilizer forms a coating that covers at least 50% of the surface of the particles.

Clause 12. The composition of Clause 1, wherein the particles further comprise a carrier fluid having a viscosity at 25° C. of 1,000 cSt to 150,000 cSt.

Clause 13. The composition of Clause 12, wherein the carrier fluid is present at about 5 wt % or less of the particles.

Clause 14. The composition of Clause 1, wherein the nanoparticles have an average diameter of 1 nm to 500 nm.

Clause 15. The method of Clause 1, wherein the nanoparticles have a BET surface area of 10 $m^2/g$ to 500 $m^2/g$.

Clause 16. The composition of Clause 1, wherein the thermoplastic polymer is selected from the group consisting of: polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly (methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof.

Clause 17. The composition of Clause 1, wherein a melting point or softening temperature of the thermoplastic polymer is 50° C. to 450° C.

Clause 18. The composition of Clause 1, wherein the particles have a D10 of about 0.5 μm to about 125 μm, a D50 of about 1 μm to about 200 μm, and a D90 of about 70 μm to about 300 μm, wherein D10<D50<D90.

Clause 19. The composition of Clause 1, wherein the particles have a diameter span of about 0.2 to about 10.

Clause 20. The composition of Clause 1, wherein the particles have a D10 of about 5 μm to about 30 μm, a D50 of about 30 μm to about 70 μm, and a D90 of about 70 μm to about 120 μm, wherein D10<D50<D90.

Clause 21. The composition of Clause 20, wherein the particles have a diameter span of about 1.0 to about 2.5.

Clause 22. The composition of Clause 1, wherein the particles have a D10 of about 25 μm to about 60 μm, a D50 of about 60 μm to about 110 μm, and a D90 of about 110 μm to about 175 μm, wherein D10<D50<D90.

Clause 23. The composition of Clause 22, wherein the particles have a diameter span of about 0.6 to about 1.5.

Clause 24. The composition of Clause 1, wherein the particles have a D10 of about 75 μm to about 125 μm, a D50 of about 100 μm to about 200 μm, and a D90 of about 125 μm to about 300 μm, wherein D10<D50<D90.

Clause 25. The composition of Clause 24, wherein the solidified particles have a diameter span of about 0.2 to about 1.2.

Clause 26. The composition of Clause 1, wherein the particles have a circularity of about 0.90 to about 1.0.

Clause 27. The composition of Clause 1, wherein the particles have a Hausner ratio of about 1.0 to about 1.5.

Clause 28. The composition of Clause 1, wherein the nanoparticles comprise oxide nanoparticles.

Clause 29. The composition of Clause 1, wherein the nanoparticles comprise carbon black.

Clause 30. The composition of Clause 1, wherein the nanoparticles comprise polymer nanoparticles.

Clause 31. The composition of Clause 1, wherein the thermoplastic polymer comprises a thermoplastic elastomer.

Clause 32. The composition of Clause 1, wherein the thermoplastic polymer is a thermoplastic elastomer.

Clause 33. A method comprising: mixing a mixture comprising a thermoplastic polymer (e.g., thermoplastic elastomer), an carrier fluid that is immiscible with the thermoplastic polymer, and an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising the thermoplastic polymer and the emulsion stabilizer associated with an outer surface of the solidified particles; and separating the solidified particles from the carrier fluid.

Clause 34. The method of Clause 33, wherein the emulsion stabilizer comprises nanoparticles at least some of the nanoparticles are embedded in the outer surface of the solidified particles.

Clause 35. The method of Clause 33, wherein at least some of the solidified particles have a void comprising the emulsion stabilizer at a void/thermoplastic polymer interface.

Clause 36. The method of Clause 35, wherein the emulsion stabilizer comprises nanoparticles and the nanoparticles are embedded in the void/thermoplastic polymer interface.

Clause 37. The method of claim Clause 35, wherein the void contains the carrier fluid.

Clause 38. The composition of Clause 33, wherein the solidified particles further comprises elongated structures on the surface of the solidified particles, wherein the elongated structures comprises the thermoplastic polymer with the emulsion stabilizer associated with an outer surface of the elongated structures.

Clause 39. The composition of Clause 33, wherein the emulsion stabilizer forms a coating that covers less than 5% of the surface of the solidified particles.

Clause 40. The composition of Clause 33, wherein the emulsion stabilizer forms a coating that covers at least 5% of the surface of the solidified particles.

Clause 41. The composition of Clause 33, wherein the emulsion stabilizer forms a coating that covers at least 25% of the surface of the solidified particles.

Clause 42. The composition of Clause 33, wherein the emulsion stabilizer forms a coating that covers at least 50% of the surface of the solidified particles.

Clause 43. The method of Clause 33, wherein the thermoplastic polymer is present in the mixture at 5 wt % to 60 wt % of the mixture.

Clause 44. The method of Clause 33, wherein the emulsion stabilizer is present in the mixture at 0.05 wt % to 5 wt % by weight of the thermoplastic polymer.

Clause 45. The method of Clause 33, wherein the nanoparticles have an average diameter of 1 nm to 500 nm.

Clause 46. The method of Clause 33, wherein the thermoplastic polymer is selected from the group consisting of polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or non-functionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly (methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof.

Clause 47. The method of Clause 33, wherein the melting point or softening temperature of the thermoplastic polymer is 50° C. to 450° C.

Clause 48. The method of Clause 33, wherein the carrier fluid is selected from the group consisting of: silicone oil, fluorinated silicone oils, perfluorinated silicone oils, polyethylene glycols, alkyl-terminal polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

Clause 49. The method of Clause 48, wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof.

Clause 50. The method of Clause 33, wherein the carrier fluid has a viscosity at 25° C. of 1,000 cSt to 150,000 cSt.

Clause 51. The method of Clause 33, wherein the carrier fluid has a density of 0.6 g/cm$^3$ to 1.5 g/cm$^3$, wherein the thermoplastic polymer has a density of 0.7 g/cm$^3$ to 1.7 g/cm$^3$.

Clause 52. The method of Clause 33, wherein mixing occurs in an extruder.

Clause 53. The method of Clause 33, wherein mixing occurs in a stirred reactor.

Clause 54. The method of Clause 33, wherein the mixture further comprises a surfactant.

Clause 55. The method of Clause 33, wherein the solidified particles have a D10 of about 0.5 μm to about 125 μm, a D50 of about 1 μm to about 200 μm, and a D90 of about 70 μm to about 300 μm, wherein D10<D50<D90.

Clause 56. The method of Clause 33, wherein the solidified particles have a diameter span of about 0.2 to about 10.

Clause 57. The method of Clause 33, wherein the solidified particles have a D10 of about 5 μm to about 30 μm, a D50 of about 30 μm to about 70 μm, and a D90 of about 70 μm to about 120 μm, wherein D10<D50<D90.

Clause 58. The method of Clause 57, wherein the solidified particles have a diameter span of about 1.0 to about 2.5.

Clause 59. The method of Clause 33, wherein the solidified particles have a D10 of about 25 μm to about 60 μm, a D50 of about 60 μm to about 110 μm, and a D90 of about 110 μm to about 175 μm, wherein D10<D50<D90.

Clause 60. The method of Clause 59, wherein the solidified particles have a diameter span of about 0.6 to about 1.5.

Clause 61. The method of Clause 33, wherein the solidified particles have a D10 of about 75 μm to about 125 μm, a D50 of about 100 μm to about 200 μm, and a D90 of about 125 μm to about 300 μm, wherein D10<D50<D90.

Clause 62. The method of Clause 61, wherein the solidified particles have a diameter span of about 0.2 to about 1.2.

Clause 63. The method of Clause 33, wherein the solidified particles have a circularity of about 0.90 to about 1.0.

Clause 74. The method of Clause 33, wherein the solidified particles have a Hausner ratio of about 1.0 to about 1.5.

Clause 65. The method of Clause 33, wherein the nanoparticles comprise oxide nanoparticles.

Clause 66. The method of Clause 33, wherein the nanoparticles comprise carbon black.

Clause 67. The method of Clause 33, wherein the nanoparticles comprise polymer nanoparticles.

Clause 68. The method of Clause 33, wherein the thermoplastic polymer comprises a thermoplastic elastomer.

Clause 69. The method of Clause 33, wherein the thermoplastic polymer is a thermoplastic elastomer.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a belier understanding of the embodiments of the present invention, the following examples of preferred or representative embodiments are given. In no way should the following examples be read to limit, or to define, the scope of the invention.

Examples

Example 1. Polyamide 6 microparticles were produced in a Haake small-scale double screw extruder with high shear rotors. The carrier fluid was PDMS oil of either 30,000 cSt or 60,000 cSt viscosity at room temperature. The concentrations of components in the final mixture in the extruder are provided in Table 1. The order of addition of components to the extruder were either (a) the carrier fluid was added to the extruder, brought to temperature, and then room temperature polymer pellets added to the heated carrier fluid in the extruder or (b) where the polymer pellets were added to the extruder, brought to temperature, and then room temperature carrier fluid added to the molten polymer in the extruder. At temperature (see Table 1), the extruder was operated at 200 rpm for 30 minutes. Then, the mixture was discharged from the extruder onto a cold surface to provide rapid quench cooling. During heating, at temperature, and cooling, the torque of the extruder system was measured with no significant torque detected.

TABLE 1

| Sample | 1-1 | 1-2 | 1-3 | 1-4 | 1-5 | 1-6 | 1-7 | 1-8 | 1-9 |
|---|---|---|---|---|---|---|---|---|---|
| wt % polymer | 20 | 20 | 20 | 20 | 35 | 35 | 35 | 35 | 50 |
| carrier fluid visc. (cSt) | 30,000 | 30,000 | 60,000 | 60,000 | 60,000 | 30,000 | 30,000 | 60,000 | 30,000 |
| wt % carrier fluid | 80 | 80 | 80 | 80 | 65 | 65 | 65 | 65 | 50 |
| set temp. (° C.) | 220 | 230 | 220 | 230 | 230 | 230 | 220 | 220 | 225 |
| actual temp. (° C.) | 227 | 236 | 227 | 236 | 236 | 236 | 227 | 227 | 232 |
| order of addition | (a) | (a) | (a) | (a) | (a) | (a) | (a) | (a) | (b) |

The resultant mixture was then filtered through a 90 mm WHATMAN® #1 paper filter (available from SigmaAldrich) to separate the polyamide 6 particles from the carrier fluid. The particles were washed three times with 300 mL of ethyl acetate. The particles were then allowed to air dry overnight in an aluminum pan in a fume hood.

The polyamide 6 particles were then characterized for size with a Malvern MASTERSIZER™ 3000 and morphology with SEM micrographs.

TABLE 2

Figure 2:
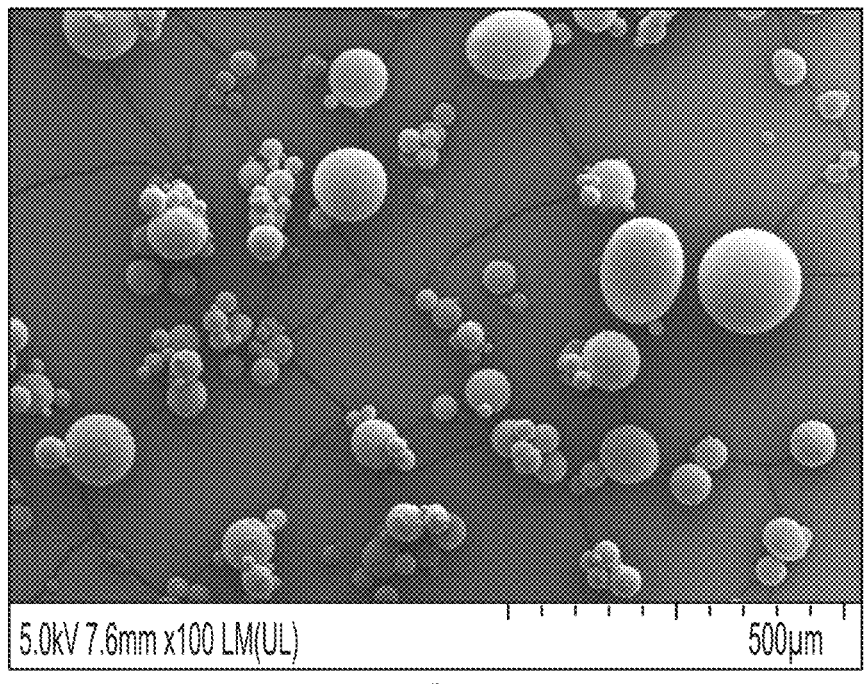
FIG. 2 is a scanning electron micrograph of polyamide particles.
Figure 3:
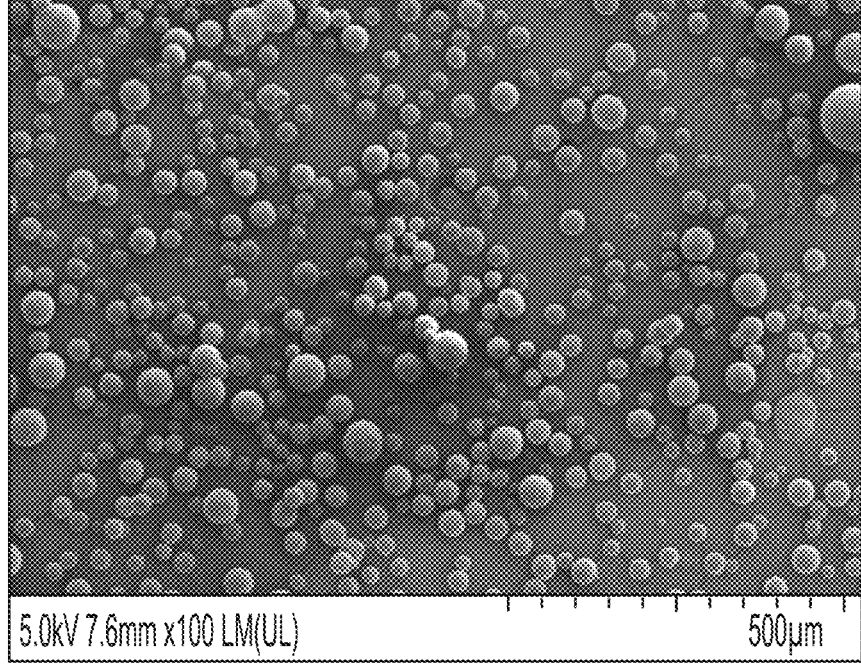
FIG. 3 is a scanning electron micrograph of polyamide particles.
Figure 4:
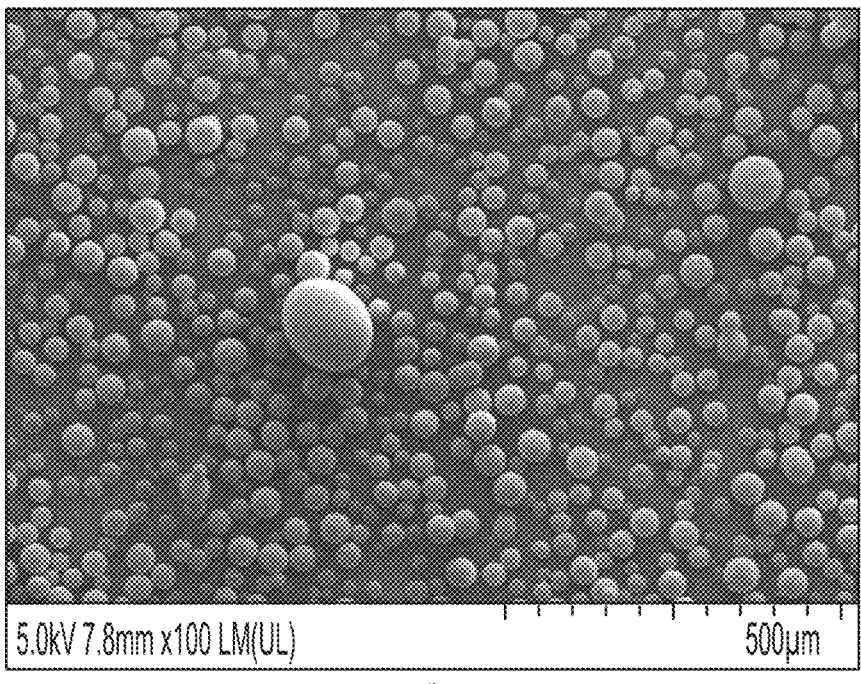
FIG. 4 is a scanning electron micrograph of polyamide particles.
Figure 5:
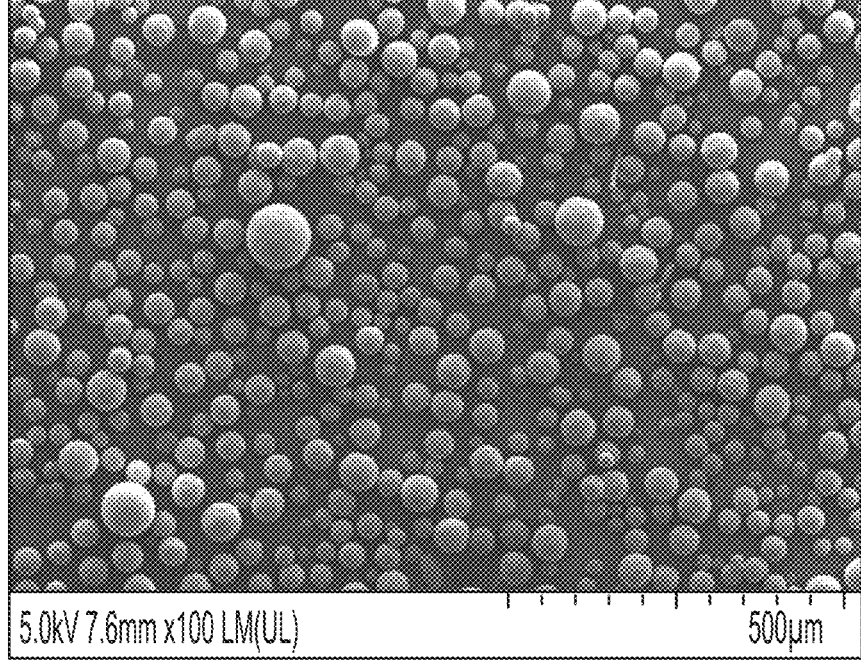
FIG. 5 is a scanning electron micrograph of polyamide particles.
Figure 6:
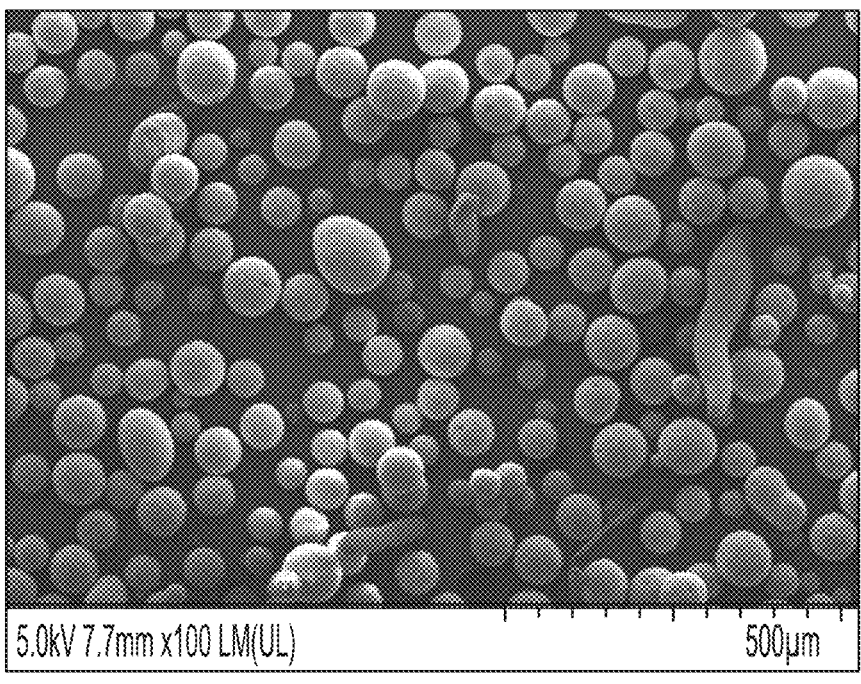
FIG. 6 is a scanning electron micrograph of polyamide particles.
Figure 7:
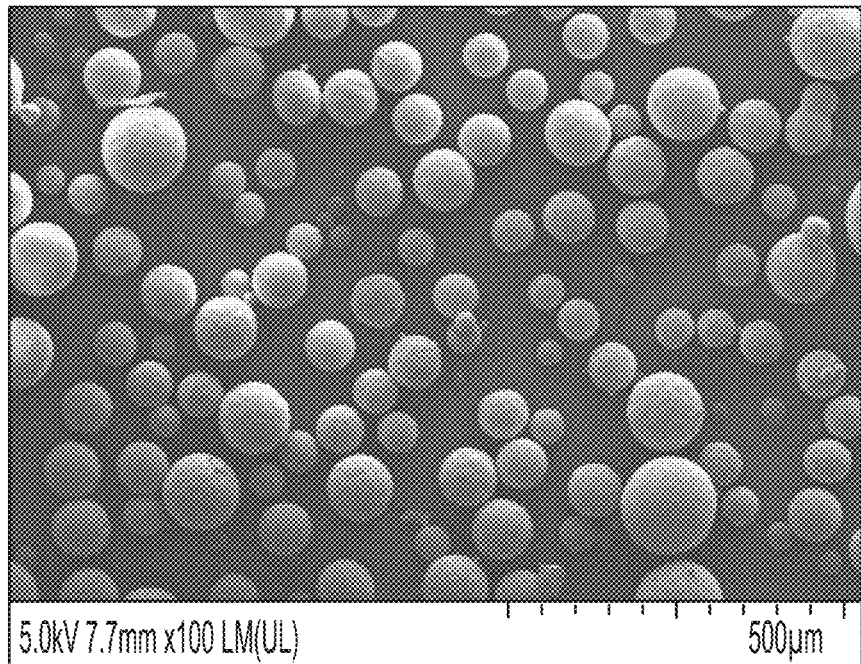
FIG. 7 is a scanning electron micrograph of polyamide particles.
Figure 8:
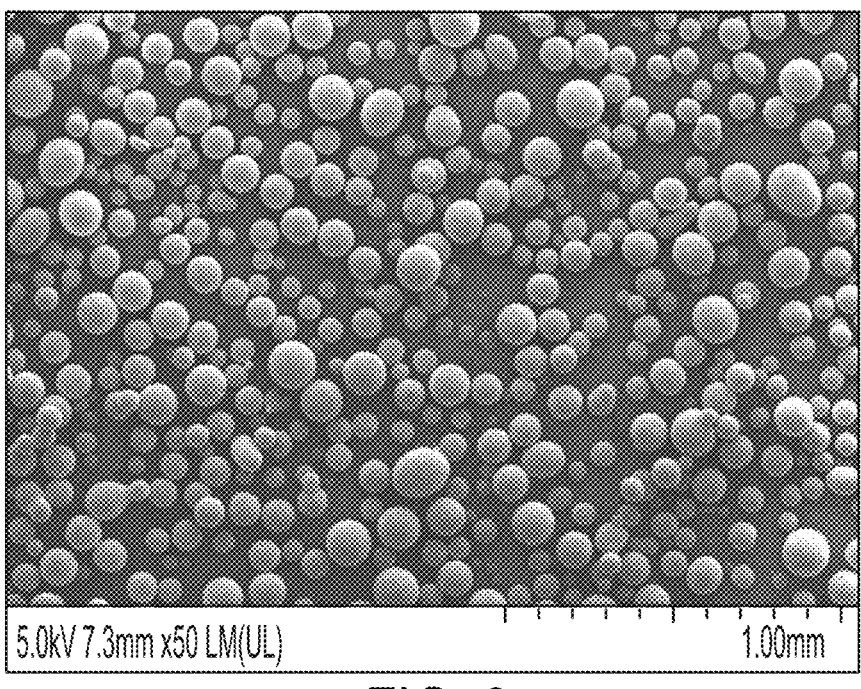
FIG. 8 is a scanning electron micrograph of polyamide particles.
Figure 9:
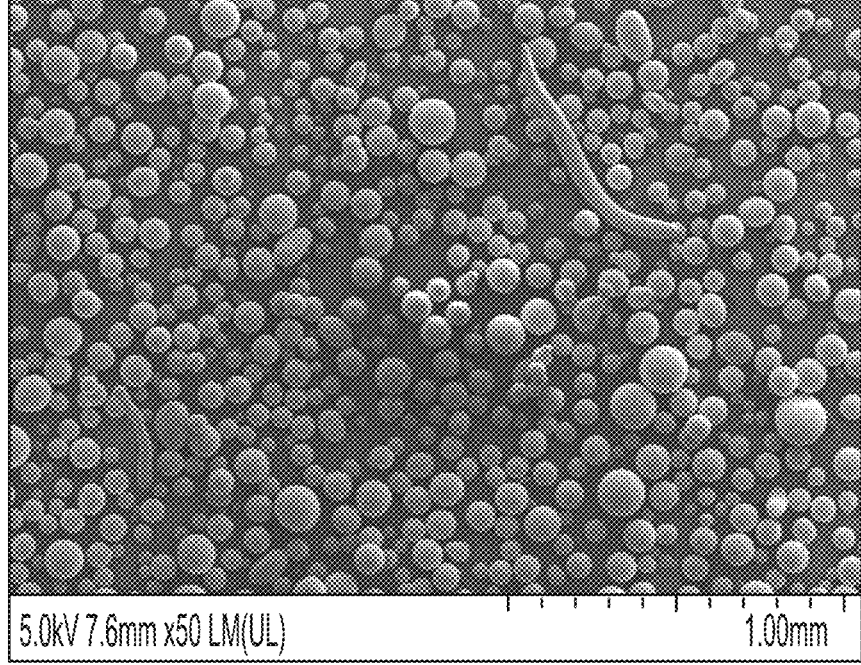
FIG. 9 is a scanning electron micrograph of polyamide particles.
Figure 10:
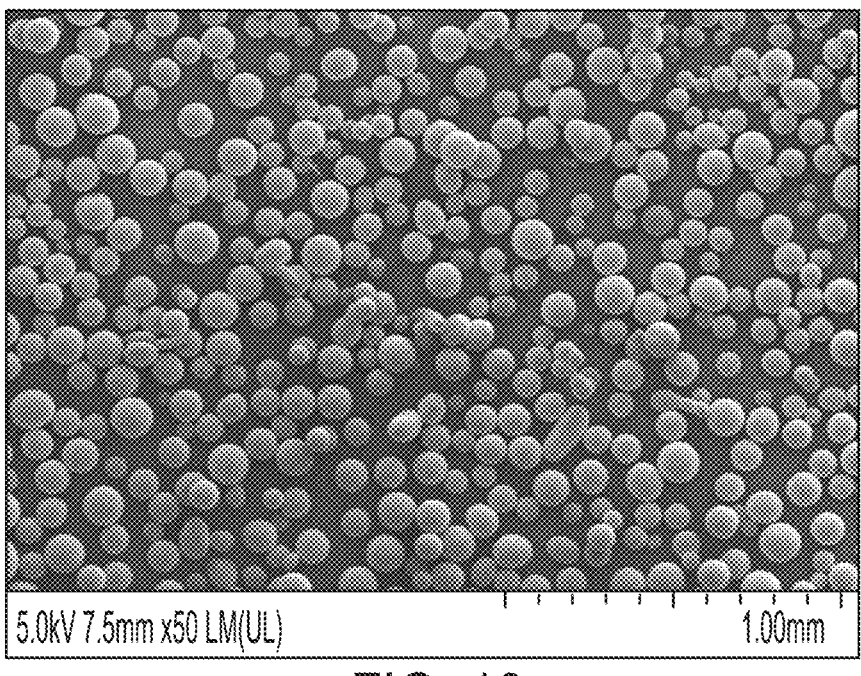
FIG. 10 is a scanning electron micrograph of polyamide particles.

| Sample | D50 (μm) | Diameter Span | SEM Micrograph |
|---|---|---|---|
| 1-1 | 64 | 1.35 | FIG. 2 |
| 1-2 | 35 | 1.33 | FIG. 3 |
| 1-3 | 38 | 0.92 | FIG. 4 |
| 1-4 | 43 | 0.82 | FIG. 5 |
| 1-5 | 76 | 0.65 | FIG. 6 |
| 1-6 | 98 | 0.79 | FIG. 7 |
| 1-7 | 104 | 0.75 | FIG. 8 |
| 1-8 | 96 | 0.83 | FIG. 9 |
| 1-9 | 100 | 0.60 | FIG. 10 |

This example illustrated general trends of (a) increasing oil viscosity decreases the particle size and the diameter span (e.g., comparing 1-1 to 1-3 and comparing 1-6 to 1-5), (b) increasing polymer loading increases the particle size and decreases the diameter span (e.g., comparing 1-4 to 1-5 and comparing 1-1 to 1-7), and (c) increasing processing temperature decreases the particle size and the diameter span (e.g., comparing 1-8 to 1-5 and comparing 1-1 to 1-2).

Additionally, inductively coupled plasma was performed on the particles having been digested in $HNO_3/HF/H_2O_2$ mixture using a closed-vessel microwave or oven for digestion to determine the silica content, which relates to the residual PDMS found in the nine samples. The amount of silica found in the nine samples ranged from about 234 ppm to about 374 ppm. For the sample with about 234 ppm of silica, it is estimated that there is only about 0.62 g of PDMS present per 1000 g of particles. Without being limited by theory, it is believed that said PDMS is present primarily on the surface of the particles.

Example 2. Polyamide 12 microparticles were produced in a 25 mm twin-screw extruder (Werner & Pfleiderer ZSK-25). The carrier fluid was PDMS oil with 10,000 cSt viscosity at room temperature. The concentrations of components in the final mixture in the extruder are provided in Table 3. The polymer pellets were added to the extruder, brought to temperature, and then preheated carrier fluid having AEROSIL® R812S silica nanoparticles dispersed therein added to the molten polymer in the extruder. Other operational parameters are provided in Table 3. Then the mixture was discharged into a container and allowed to cool to room temperature over several hours. The light scattering particle size data is also provided in Table 3.

TABLE 3

| Sample | 2-1 | 2-2 | 2-3 | 2-4 | 2-5 | 2-6 |
|---|---|---|---|---|---|---|
| Screw RPM | 900 | 1100 | 1100 | 900 | 900 | 1100 |
| wt % polyamide 12* | 47 | 47 | 47 | 47 | 38 | 38 |

TABLE 3-continued

| Sample | 2-1 | 2-2 | 2-3 | 2-4 | 2-5 | 2-6 |
|---|---|---|---|---|---|---|
| wt % silica** | 1.1 | 1.1 | 1.1 | 1.1 | 1.1 | 1.1 |
| Temp. (° C.) | 230 | 230 | 250 | 250 | 230 | 230 |
| D10 (μm) | 30.5 | 31.2 | 26.2 | 25.4 | 35.6 | 54.2 |
| D50 (μm) | 57.8 | 50.3 | 38.1 | 38.5 | 72.8 | 111 |
| D90 (μm) | 101 | 80.1 | 55.3 | 57.9 | 131 | 220 |

*relative total combined weight of PDMS oil and polyamide
**relative to polyamide Example 3. ELASTOLLAN® 1190A10 thermoplastic polyurethane (TPU) added to the 25 mm twin-screw extruder (Werner & Pfleiderer ZSK-25), brought to temperature, and then preheated 10,000 cSt PDSM oil having AEROSIL® RX50 silica nanoparticles dispersed therein added to the molten polymer in the extruder. The extruder conditions and results are presented in Table 4.

TABLE 4

| Sample | Screw RPM | Extruder Temp (° C.) | wt % TPU* | wt % silica** | Silica | D10 (μm) | D50 (μm) | D90 (μm) |
|---|---|---|---|---|---|---|---|---|
| 3-1 | 1100 | 240 | 53 | 1.3 | RX50 | 54.2 | 69.0 | 86.6 |
| 3-2 | 900 | 240 | 53 | 1.3 | RX50 | 59.2 | 74.5 | 94.8 |
| 3-3 | 1100 | 240 | 53 | 1.3 | RX50 | 57.6 | 75.3 | 97.8 |
| 3-4 | 1100 | 240 | 53 | 1.3 | RX50 | 49.5 | 65.1 | 85.0 |
| 3-5 | 1100 | 240 | 42 | 2.1 | RX50 | 26.3 | 41.9 | 65.1 |
| 3-6 | 1100 | 240 | 42 | 2.1 | RX50 | 28.9 | 42.0 | 60.2 |
| 3-7 | 1100 | 240 | 50 | 1.00 | RX50 | 56.5 | 76.3 | 103.0 |
| 3-8 | 1100 | 240 | 46 | 1.17 | RX50 | 44.6 | 61.7 | 84.7 |
| 3-9 | 1100 | 260 | 46 | 1.17 | RX50 | 38.2 | 46.5 | 56.5 |
| 3-10 | 1100 | 260 | 51 | 0.96 | RX50 | 53.5 | 64.0 | 75.7 |
| 3-11 | 1100 | 260 | 53 | 0.59 | R812S | 21.3 | 26.1 | 32.3 |
| 3-12 | 1100 | 260 | 51 | 0.64 | R812S | 19.5 | 24.0 | 29.7 |
| 3-13 | 1100 | 240 | 48 | 0.72 | R812S | 15.2 | 25.0 | 38.8 |
| 3-14 | 1100 | 240 | 52 | 0.62 | R812S | 20.8 | 35.1 | 57.5 |
| 3-15 | 1100 | 240 | 53 | 0.39 | R812S | 44.3 | 59.8 | 80.5 |
| 3-16 | 1100 | 240 | 47 | 0.50 | R812S | 21 | 34.8 | 54.8 |
| 3-17 | 1100 | 260 | 54 | 0.37 | R812S | 35.6 | 43.0 | 51.7 |

*relative to total combined weight of PDMS oil and TPU
**relative to TPU

Figure 11:
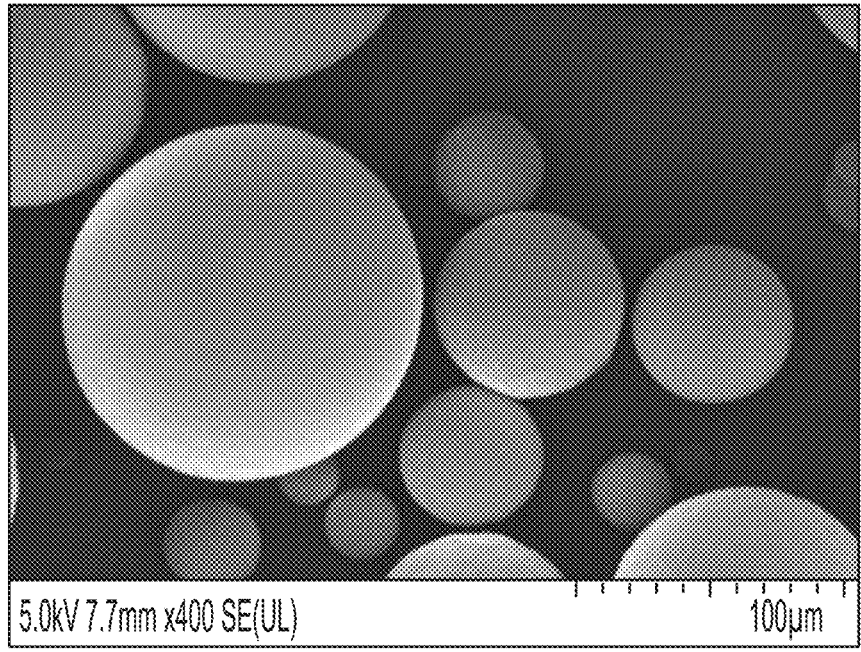
FIG. 11 is a scanning electron micrograph of polyamide particles.

Example 4. A 1 L stirred reactor from Parr Instruments was used to prepare polyamide 6 particles by melt emulsification. The reactor was loaded with 20 wt % polyamide 6 and 80 wt % 10,000 cSt PDMS oil. The mixture was then heated to 225° C. while stirring at 1000 rpm using a dual 4-blade propeller. After about 60 minutes, the mixture was discharged from the reactor onto dry ice to quench the mixture. The mixture was then filtered and washed to recover the polymer particles. The resultant polymer particles were passed through a 150-μm sieve. Approximately, 40 wt % of the polyamide 6 loaded into the reactor passed through the 150-μm sieve. FIG. 11 is an SEM micrograph of the particles after sieving, which illustrates the range of particle sizes as large.

Example 5. A 2 L glass reactor from Buchi AG was used to prepare polyamide 12 particles by melt emulsification. The reactor was loaded with 1 wt % AEROSIL® R812S silica nanoparticles (by weight of the polyamide 12 in the final mixture) in 10,000 cSt PDMS oil. The mixture was heated to 200° C. before adding 23 wt % polyamide 12 pellets relative to the combined weight of the PDMS oil and polyamide 12. The reactor was mixed at 500 rpm for 30 minutes. The resultant mixture was discharged and cooled to ambient temperate at a rate of about 1° C. to about 3° C. per minute. The mixture was then washed with heptane and filtered through a 90 mm WHATMAN® #1 paper filter to recover the polymer particles. The resultant polymer particles were air dried overnight in a fume hood. The dried particles have a D50 of about 227 μm, and the dried particles passed through a 150-μm sieve have a D50 of about 124 μm.

Example 6. Polyamide 12 particles (Examples 6-1 to 6-44) were prepared by melt emulsification in a 1 L glass kettle reactor. 10,000 cSt PDMS oil, 23% polyamide 12 (from RTP, EMX-Grivory, or from Arkema) relative to the combined weight of the PDMS oil and polyamide 12, and a desired amount of silica nanoparticles (AEROSIL® R812S or AEROSIL® RX50) by weight of polyamide 12 were added to the glass kettle. The order of addition was either (c) PDMS oil and silica nanoparticles mixed to a good dispersion then polyamide added or (d) PDMS oil, polyamide, and silica nanoparticles added before mixing. The nitrogen headspace purge was then turned on, and the mixture heated to a desired temperature (e.g., 200° C., 210° C., or 220° C.) over 90 minutes at 260 rpm. Once at temperature, the rotor speed was increased to a desired rpm. Samples were taken at various times. Once complete, heating and stirring were turned off, and the reactor was allowed to cool to room temperature before discharging the mixture. The resultant mixture was filtered and washed with heptane. The resultant particles were allowed to air dry overnight in a fume hood. Optionally, the dried particles were screened (scr) through a 150-μm sieve. Table 5 lists the experimental details and resultant particle properties.

For Samples 6-45 to 6-47, a 2 L stainless reactor from Buchi AG was used to prepare polyamide 12 particles by melt emulsification. The reactor was loaded with 0.67 wt % AEROSIL® R812S silica nanoparticles (by weight of the polyamide 12 in the final mixture) in 60,000 cSt PDMS oil and was sealed without N2 purge. The mixture was heated to 250° C. at ramping rate of 3.68° C./min before adding 30 wt % polyamide 12 pellets relative to the combined weight of the PDMS oil and polyamide 12. When the reactor temperature reached 245° C., slowly opened vent valve and purged reactor with N2 at flow rate of 2-3 scfh. The reactor was mixed at 650 rpm for 60 minutes. The resultant mixture was cooled down with gentle stirring at 50 rpm to less than 60° C. and discharged. The process samples taken 40 min, 60 min and final room temp. were then washed with heptane and filtered through a 90 mm WHATMAN® #1 paper filter to recover the polymer particles. The resultant polymer particles were air dried overnight in a fume hood. The dried particles have a D50 of about 21.3 μm, and the final dried particles passed through a 150-μm sieve have a D50 of about 21.5 μm.

For Samples 6-48 to 6-50, a 2 L stainless reactor from Buchi AG was used to prepare polyamide 12 particles by melt emulsification. The reactor was loaded with 0.67 wt % AEROSIL® R812S silica nanoparticles (by weight of the polyamide 12 in the final mixture) in 60,000 cSt PDMS oil and was purged with N2 at flow rate of 2-3 scfh. The mixture was heated to 250° C. at ramping rate of 3.68° C./min before adding 30 wt % polyamide 12 pellets relative to the combined weight of the PDMS oil and polyamide 12. The reactor was mixed at 650 rpm for 60 minutes. The resultant mixture was cooled down with gentle stirring at 50 rpm to less than 60° C. and discharged. The process samples taken 50 min, 60 min time point and at room temp. were then washed with heptane and filtered through a 90 mm WHATMAN® #1 paper filter to recover the polymer particles. The final room temp. sample was aggregated and the particle size was not measured. The resultant polymer particles taken at 60 min were air dried overnight in a fume hood. The dried particles have a D50 of about 25.8 µm, and the dried particles passed through a 150-µm sieve have a D50 of about 26.4 µm.

For Samples 6-51 to 6-53, a 2 L stainless reactor from Buchi AG was used to prepare polyamide 12 particles by melt emulsification. The reactor was loaded with 0.67 wt % AEROSIL® R812S silica nanoparticles (by weight of the polyamide 12 in the final mixture) in 60,000 cSt PDMS oil and was purged with N2 at 2-3 flow rate of scfh. The mixture was heated to 250° C. at ramping rate of 5.68° C./min before adding 30 wt % polyamide 12 pellets relative to the combined weight of the PDMS oil and polyamide 12. The reactor was mixed at 650 rpm for 60 minutes. The resultant mixture was cooled down with gentle stirring at 50 rpm to less than 60° C. and discharged. The process samples taken at 60 min time point and at room temp. were then washed with heptane and filtered through a 90 mm WHATMAN® #1 paper filter to recover the polymer particles. The final room temp. sample was aggregated and the particle size was not measured. The resultant polymer particles taken at 60 min were air dried overnight in a fume hood. The dried particles have a D50 of about 33.8 µm, and the dried particles passed through a 150-µm sieve have a D50 of about 34.9 µm.

TABLE 5

| Sample | Set Temp (°C.) | RPM | Time (min) | Order of Add. | PA-12 | Silica (wt % and type) | Screened Particle Size (µm or unitless) | | | | Not Screened Particle Size (µm or unitless) | | | | Yield (wt %) Scr | Not Scr |
|---|---|---|---|---|---|---|---|---|---|---|---|---|---|---|---|---|
| | | | | | | | D10 | D50 | D90 | Span | D10 | D50 | D90 | Span | | |
| 6-1 | 220 | 600 | 10 | (c) | EMS-Griv. | 1% R812S | 46.5 | 87.1 | 146 | 1.14 | | | | | 77.5 | 72.7 |
| 6-2 | | | 26 | | | | 57.2 | 90.6 | 137 | 0.89 | | | | | 83.8 | 68.8 |
| 6-3 | | | 30 | | | | 48.4 | 78.7 | 124 | 0.96 | | | | | 92.0 | 67.7 |
| 6-4 | | | 50 | | | | 53.4 | 84.7 | 128 | 0.89 | | | | | 93.9 | 57.6 |
| 6-5 | 220 | 600 | 15 | (c) | EMS-Griv. | 1% R812S | 34.9 | 76.3 | 131 | 1.99 | | | | | 90.8 | 74.3 |
| 6-6 | 220 | 1250 | 10 | (c) | EMS-Griv. | 1% R812S | 16.2 | 43.8 | 103 | 1.98 | | | | | 92.7 | 71.4 |
| 6-7 | | | 20 | | | | 19.3 | 44 | 95.5 | 1.73 | | | | | 94.3 | 69.6 |
| 6-8 | | | 30 | | | | 20 | 44.4 | 97.2 | 1.74 | | | | | 96.4 | 71.9 |
| 6-9 | | | 40 | | | | 21 | 43.8 | 92.7 | 1.64 | | | | | 87.2 | 80 |
| 6-10 | | | RT | | | | 21.1 | 44.4 | 91.7 | 1.59 | | | | | 99.2 | 72.1 |
| 6-11 | 220 | 1250 | 40 | (c) | EMS-Griv. | 1% R812S | 16.7 | 49.5 | 108 | 1.85 | | | | | 95.7 | 82.1 |
| 6-12 | | | 100 | | | | 21.5 | 50.9 | 106 | 1.65 | | | | | 94.9 | 84.6 |
| 6-13 | | | 160 | | | | 23.1 | 51.4 | 106 | 1.61 | | | | | 92.6 | 89.3 |
| 6-14 | | | 220 | | | | 21.9 | 49.8 | 104 | 1.64 | | | | | 92.6 | 90.6 |
| 6-15 | | | RT | | | | 22.9 | 52 | 108 | 1.64 | | | | | 94.3 | 91.1 |
| 6-16 | 220 | 1250 | 15 | (c) | RTP | 1% R812S | 12 | 46 | 104 | 1.41 | | | | | | |
| 6-17 | 220 | 1250 | 40 | (d) | RTP | 0.33% R812S | 46.7 | 8.35 | 139 | 1.02 | | | | | 97.3 | 77.4 |
| 6-18 | | | 90 | | | | 53.1 | 89.5 | 144 | 1.02 | | | | | 95.4 | 78.7 |
| 6-19 | 210 | 1250 | 15 | (d) | RTP | 0.33% R812S | 44.2 | 70.7 | 112 | 0.96 | | | | | 94.7 | 80.8 |
| 6-20 | | | 40 | | | | 46.1 | 71.7 | 111 | 0.90 | | | | | 92.6 | 8.6 |
| 6-21 | | | 90 | | | | 49.8 | 78.9 | 124 | 0.94 | | | | | 88.7 | 90.6 |
| 6-22 | | | RT | | | | 50.2 | 78.9 | 123 | 0.93 | | | | | 93.5 | 88.3 |
| 6-23 | 200 | 1250 | 15 | (d) | RTP | 0.33% R812S | 56.6 | 84.4 | 125 | 0.81 | 49.7 | 85.5 | 169 | 1.40 | 93.3 | 89.2 |
| 6-24 | | | 40 | | | | 58 | 84.8 | 124 | 0.77 | 52.4 | 86.2 | 154 | 1.18 | 91.5 | 95.5 |
| 6-25 | | | 90 | | | | 61.1 | 86.7 | 123 | 0.71 | 53.3 | 84.9 | 142 | 1.05 | 92.1 | 89.7 |
| 6-26 | | | RT | | | | 59.4 | 84.6 | 121 | 0.73 | 54 | 89.4 | 166 | 1.25 | 93.3 | 91.8 |
| 6-27 | 220 | 1250 | 15 | (d) | RTP | 1% R812S | 16.2 | 43.9 | 95 | 1.79 | 17.8 | 54.8 | 300 | 5.15 | 96.0 | 83.3 |
| 6-28 | | | 40 | | | | 19.8 | 46.3 | 96.7 | 1.66 | 19.7 | 53.3 | 263 | 4.57 | 95.4 | 97.9 |
| 6-29 | | | 90 | | | | 21.1 | 47.7 | 106 | 1.79 | 21 | 49 | 220 | 4.05 | 96.4 | 84.8 |
| 6-30 | | | RT | | | | 20.5 | 45.1 | 96.9 | 1.69 | 20.8 | 49.7 | 210 | 3.85 | 96.7 | 91.5 |
| 6-31 | 220 | 1250 | 15 | (d) | RTP | 1% RX50 | 37.2 | 66.1 | 116 | 1.17 | 35.4 | 71.2 | 252 | 3.04 | 98.2 | 85.5 |
| 6-32 | | | 40 | | | | 37.6 | 67.7 | 118 | 1.87 | | | | | 93.8 | 84.8 |
| 6-33 | | | 90 | | | | 39.4 | 67.4 | 115 | 1.12 | 36.7 | 72.1 | 239 | 2.81 | 95.2 | 84.8 |
| 6-34 | | | RT | | | | 36.4 | 65 | 113 | 1.18 | 36 | 73.2 | 254 | 2.98 | 96.1 | 88.5 |
| 6-35 | 220 | 1250 | 15 | (d) | RTP | 0.33% RX50 | 101 | 125 | 135 | 0.94 | 101 | 125 | 135 | 0.43 | 94.7 | 29.7 |
| 6-35 | | | 40 | | | | 99.5 | 128 | 164 | 0.51 | 108 | 172 | 271 | 0.95 | 94.7 | 25.5 |
| 6-36 | | | 90 | | | | 102 | 129 | 162 | 0.46 | 116 | 175 | 265 | 0.85 | 94.7 | 21.2 |
| 6-37 | | | RT | | | | 98.7 | 121 | 151 | 0.43 | 113 | 170 | 255 | 0.83 | 84.2 | 15.2 |
| 6-38 | 220 | 1250 | 40 | (d) | EMS-Griv. | 0.33% R812S | 56.6 | 79.9 | 112 | 0.688 | 51.4 | 87.6 | 216 | 1.884 | 90.2 | 81.8 |
| 6-39 | | | 90 | | | | 60.7 | 87.1 | 124 | 0.729 | 56.5 | 95.5 | 218 | 1.688 | 90.5 | 77.6 |
| 6-40 | | | RT | | | | 66.7 | 93.8 | 132 | 0.702 | 60.9 | 100 | 196 | 1.35 | 92.1 | 80.1 |
| 6-41 | 220 | 1250 | 15 | (d) | Ark. | 1% R812S | | | | | | | | | | |
| 6-42 | | | 40 | | | | 52.4 | 79.4 | 121 | 0.864 | 50 | 83.8 | 159 | 1.302 | 93.4 | 89.4 |
| 6-43 | | | 90 | | | | 55.5 | 82.6 | 122 | 0.81 | 49.3 | 80 | 138 | 1.103 | 92.4 | 83.2 |
| 6-44 | | | RT | | | | | | | | | | | | | |
| 6-45 | 250 | 650 | 40 | | RTP | 0.67% R812S | 14.5 | 20.3 | 28.5 | 0.69 | 14.1 | 20.1 | 28.5 | 0.72 | 98.42 | 96.6 |
| 6-46 | | | 60 | | | | 12.6 | 20.0 | 31.1 | 0.93 | 12.1 | 19.8 | 32.4 | 1.02 | 96.97 | 94.2 |
| 6-47 | | | RT | | | | 15.4 | 21.5 | 29.8 | 0.67 | 15.1 | 21.3 | 29.8 | 0.69 | 97.48 | 96.9 |
| 6-48 | 250 | 250 | 50 | | RTP | 0.67% R812S | 14.9 | 25.3 | 40.5 | 1.01 | 13.4 | 24.8 | 41.6 | 1.14 | 97.45 | 96.0 |
| 6-49 | | | 60 | | | | 14.3 | 26.4 | 45.0 | 1.17 | 13.4 | 25.8 | 46.4 | 1.28 | 98.05 | 93.6 |
| 6-50 | | | RT | | | | | | | | | | | | | |
| 6-51 | 250 | 650 | 40 | | RTP | 0.67% R812S | | | | | | | | | | |
| 6-52 | | | 60 | | | | 19.2 | 34.9 | 59.1 | 1.15 | 17.8 | 33.8 | 58.7 | 1.21 | 97.86 | 91.3 |
| 6-53 | | | RT | | | | | | | | | | | | | |

"RT" refers to once the mixture has cooled to reach room temperature.
Blank cells indicated values not measured.

Figure 12:
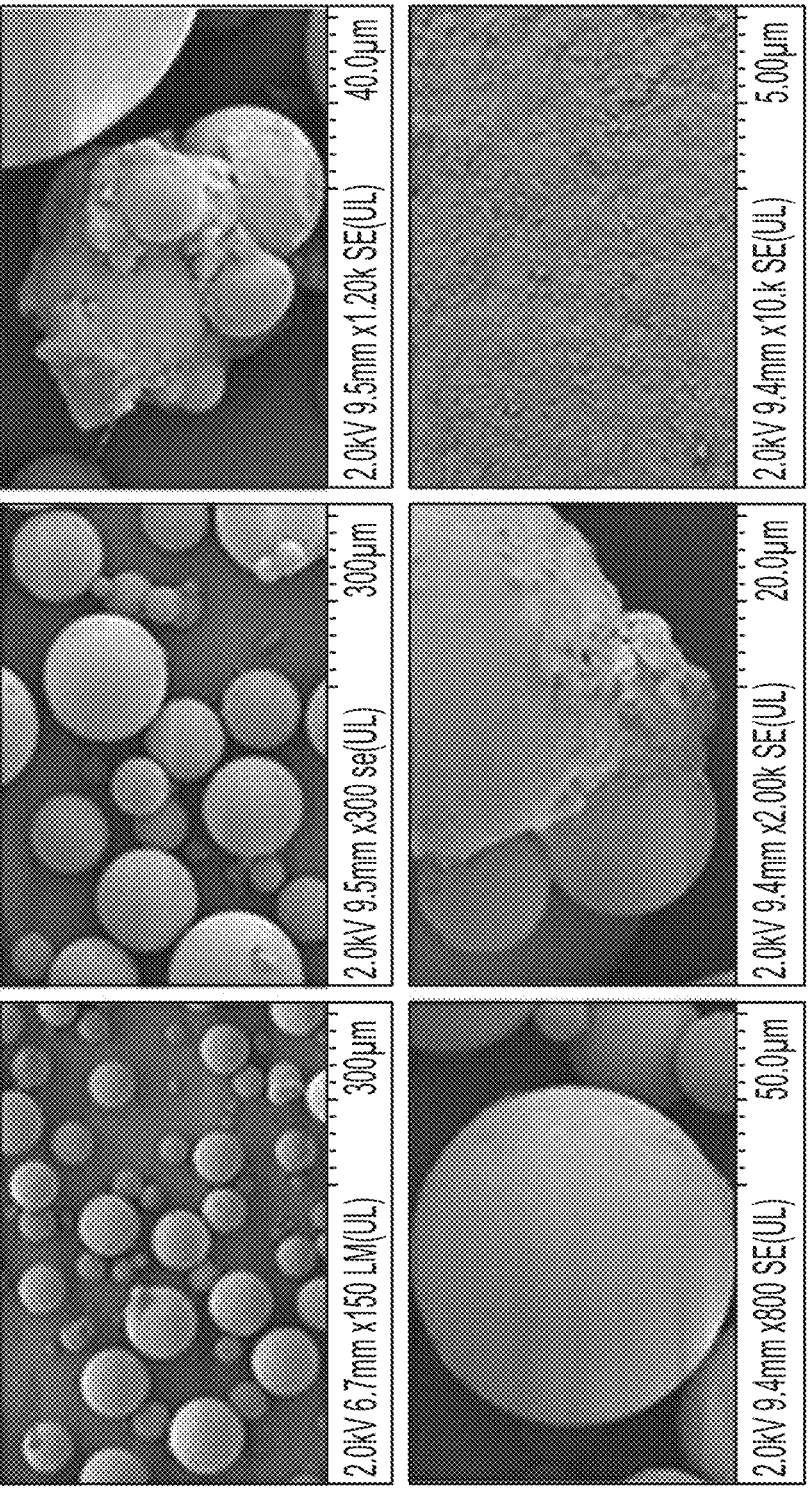
FIG. 12 is a scanning electron micrograph of polyamide particles.
Figure 13:
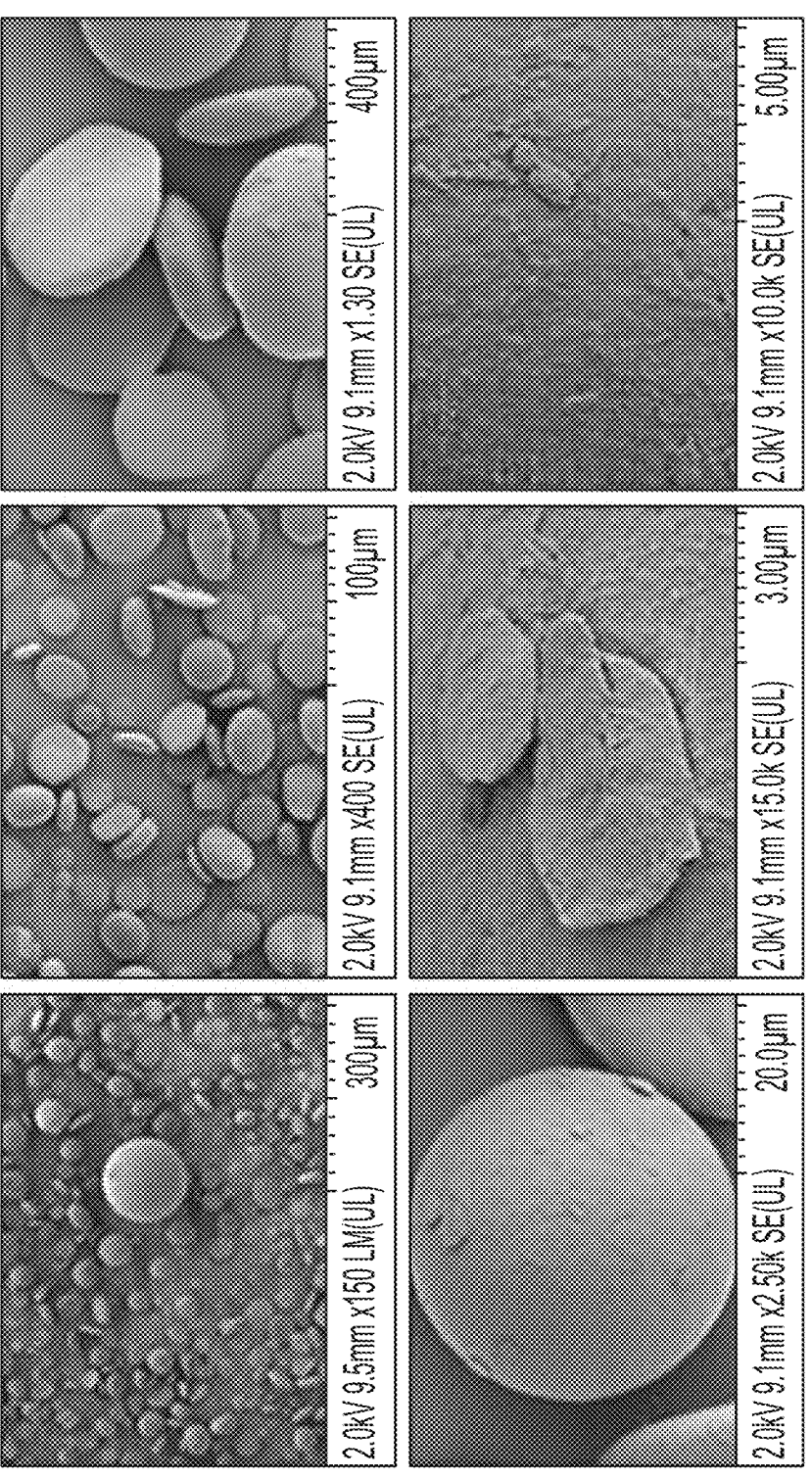
FIG. 13 is a scanning electron micrograph of polyamide particles.
Figure 14:
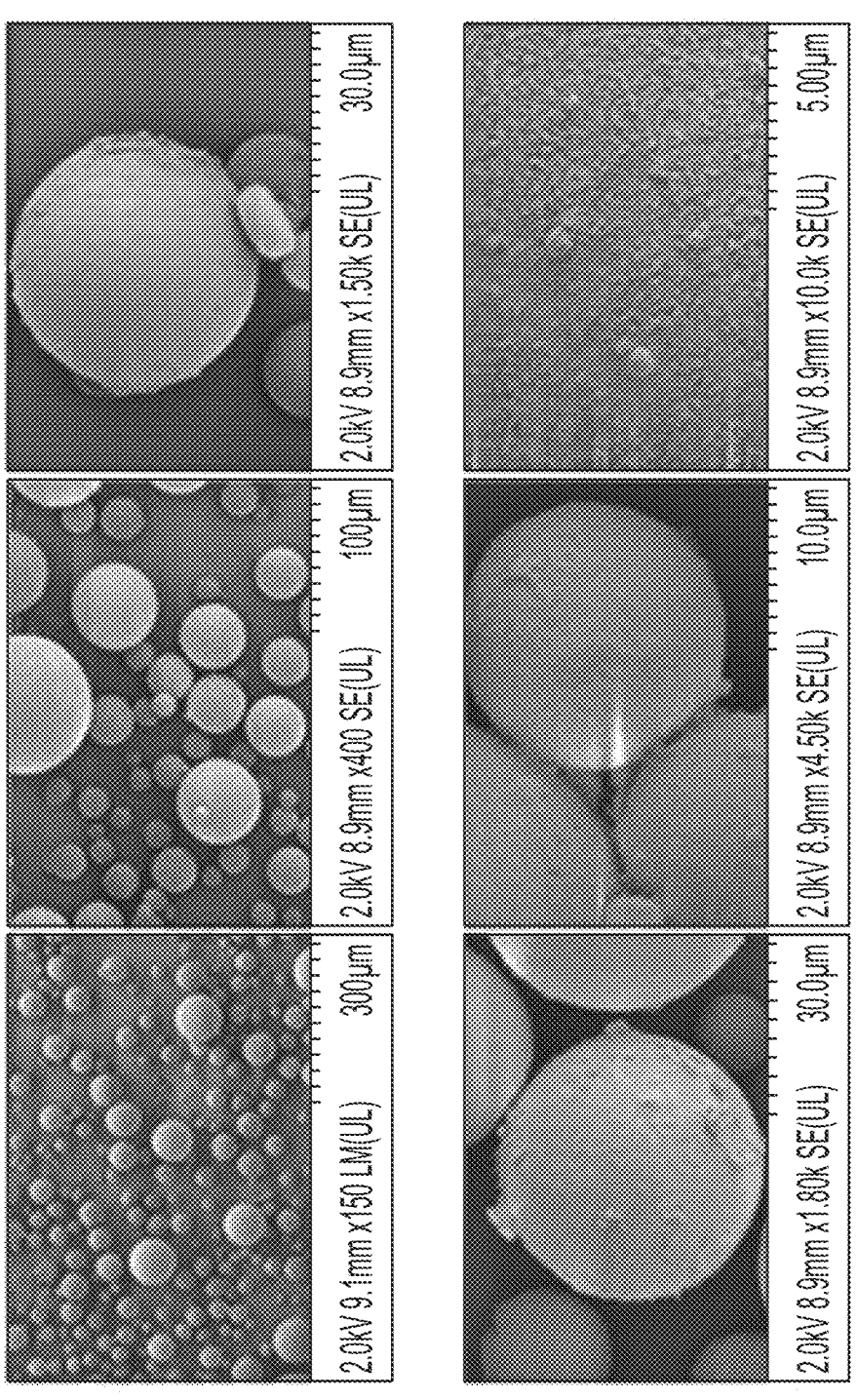
FIG. 14 is a scanning electron micrograph of polyamide particles.
Figure 15:
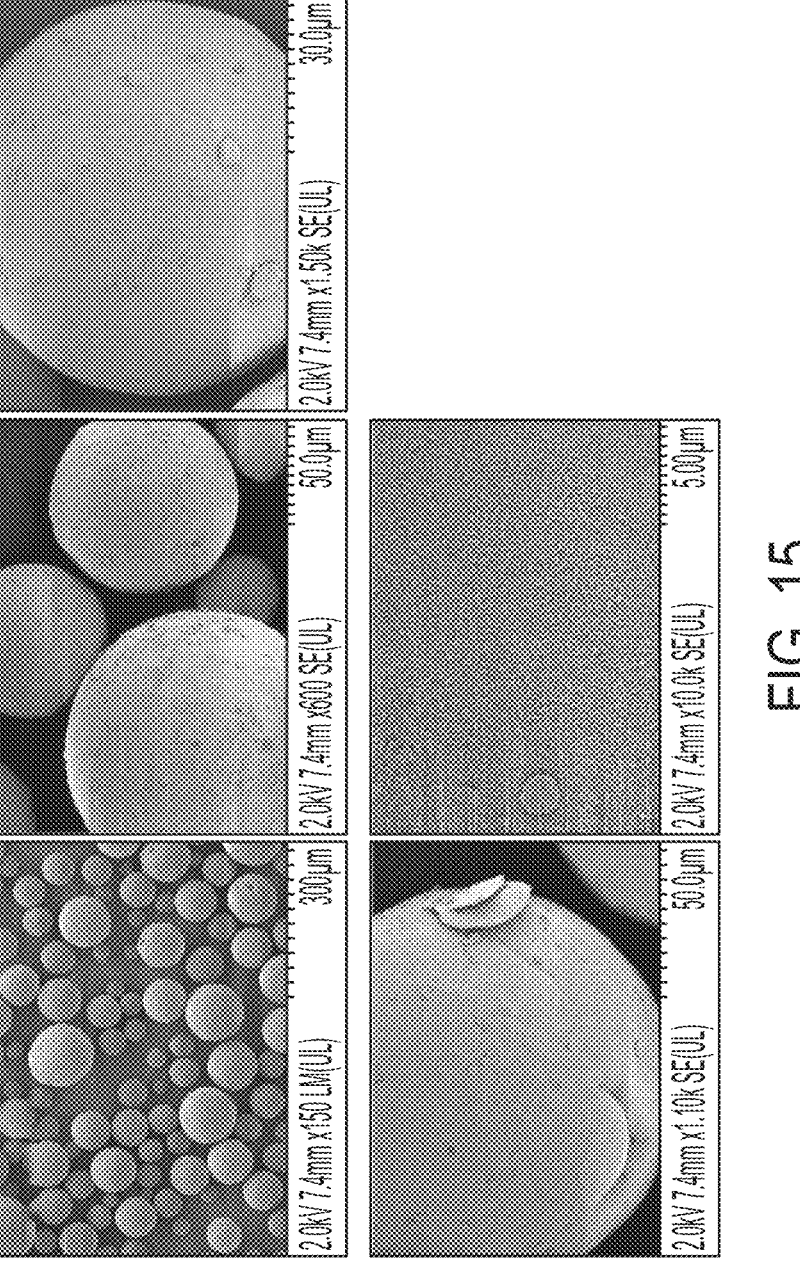
FIG. 15 is a scanning electron micrograph of polyamide particles.
Figure 16:
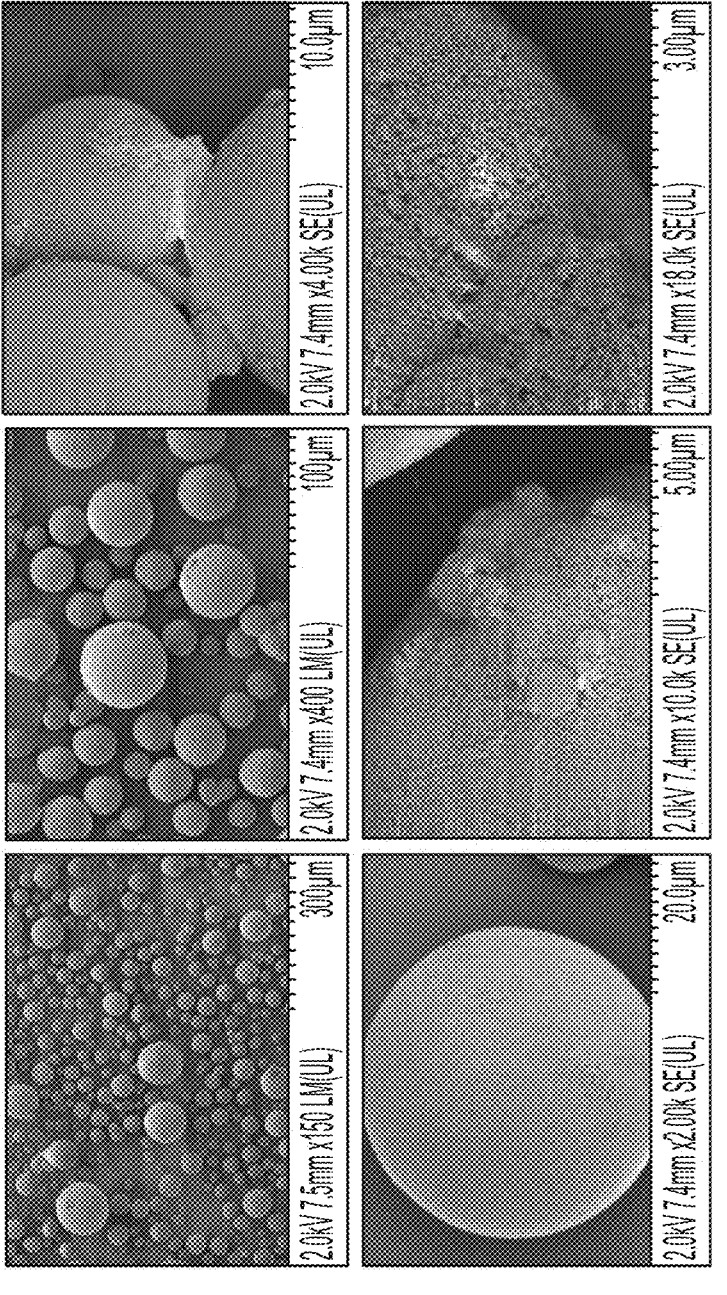
FIG. 16 is a scanning electron micrograph of polyamide particles.
Figure 17:
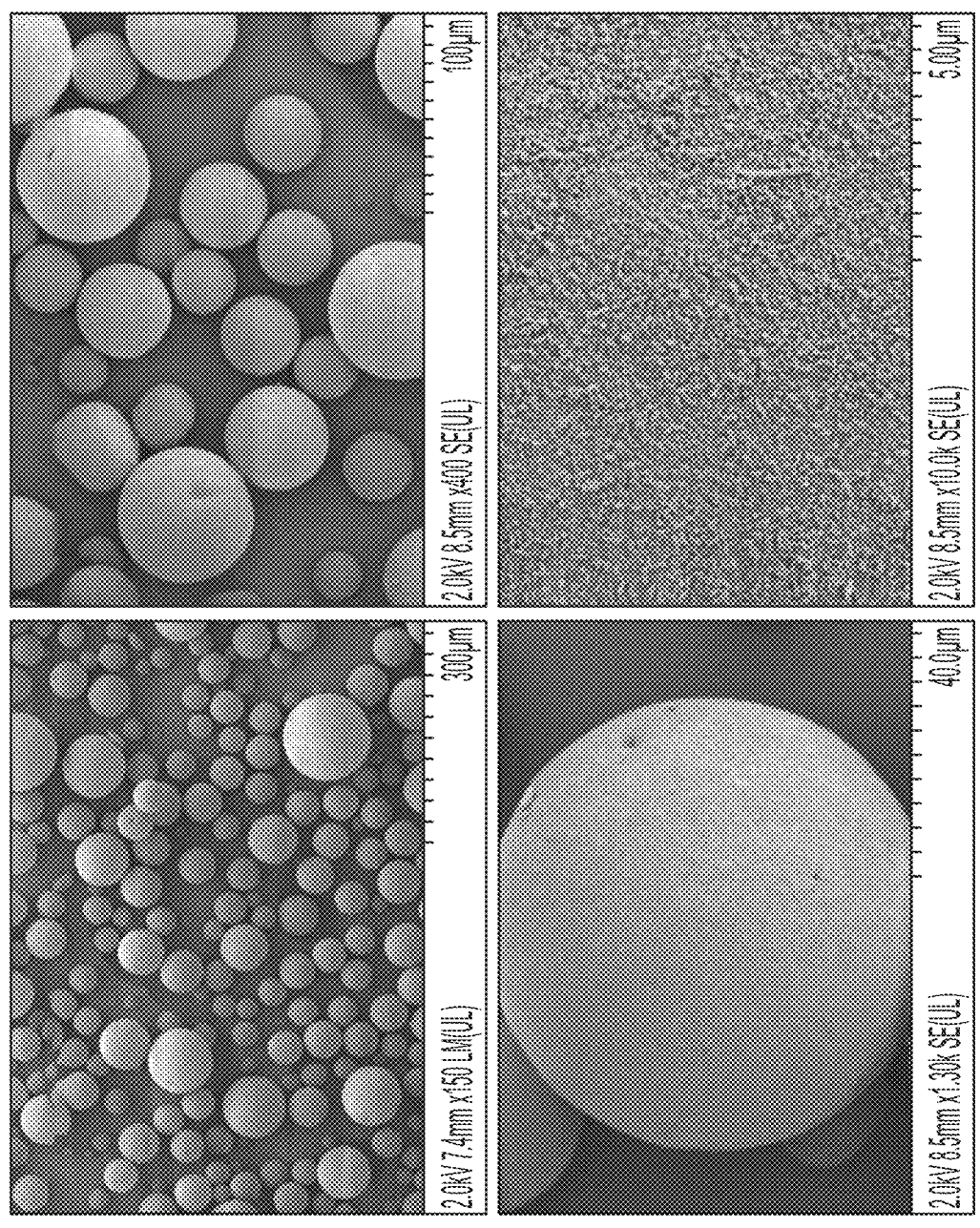
FIG. 17 is a scanning electron micrograph of polyamide particles.
Figure 18:
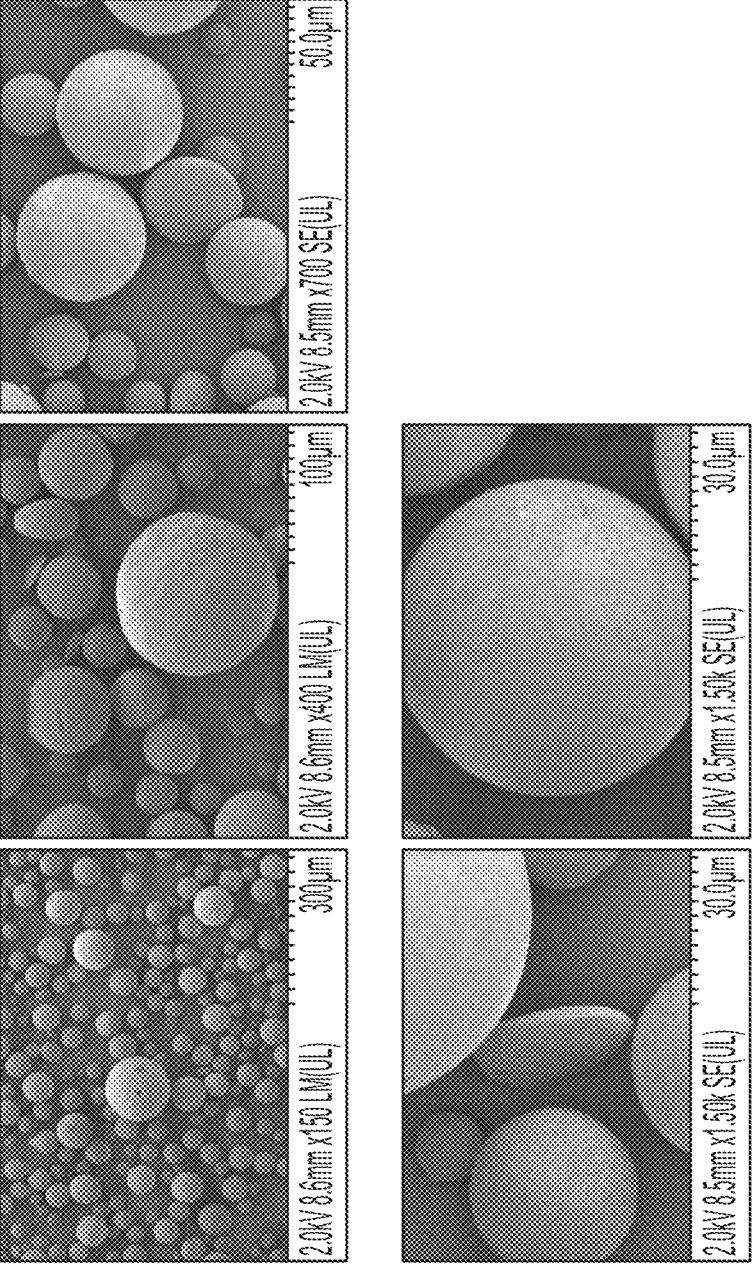
FIG. 18 is a scanning electron micrograph of polyamide particles.
Figure 19:
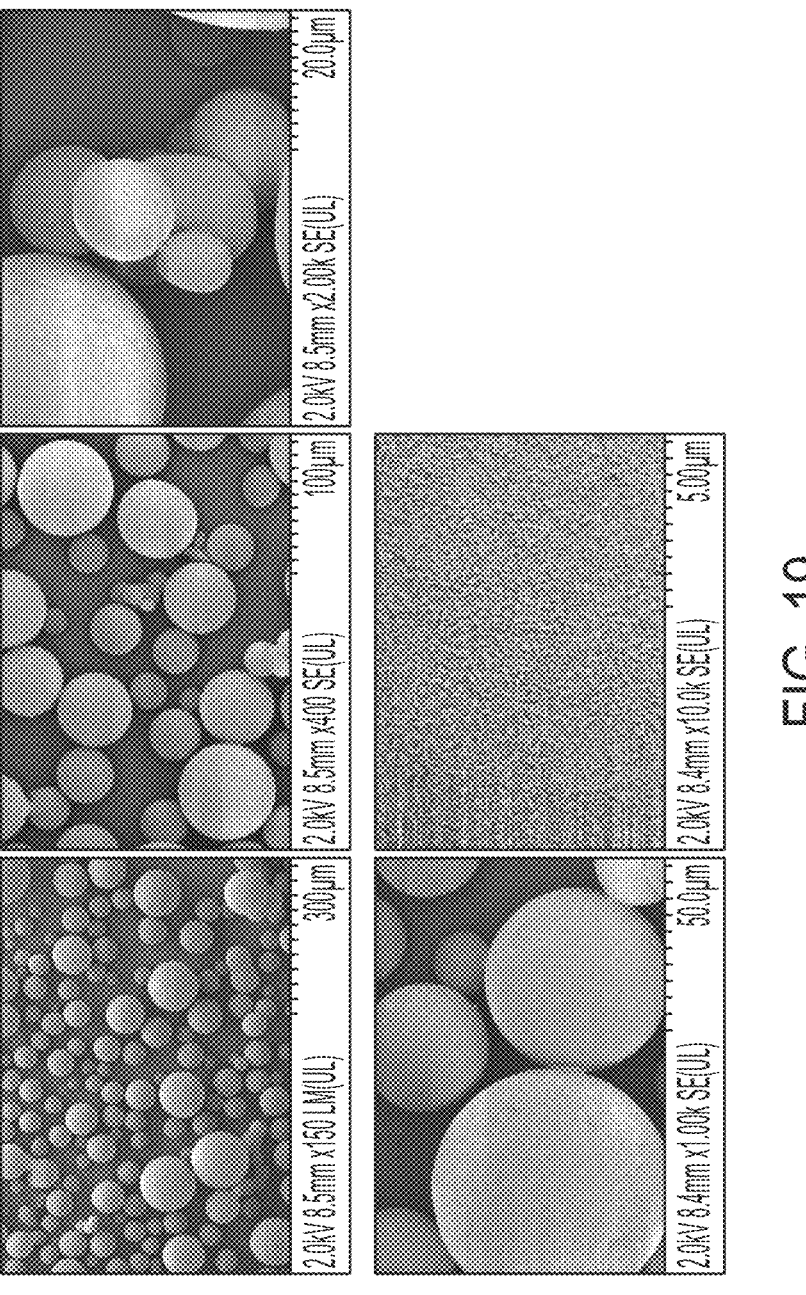
FIG. 19 is a scanning electron micrograph of polyamide particles.
Figure 20:
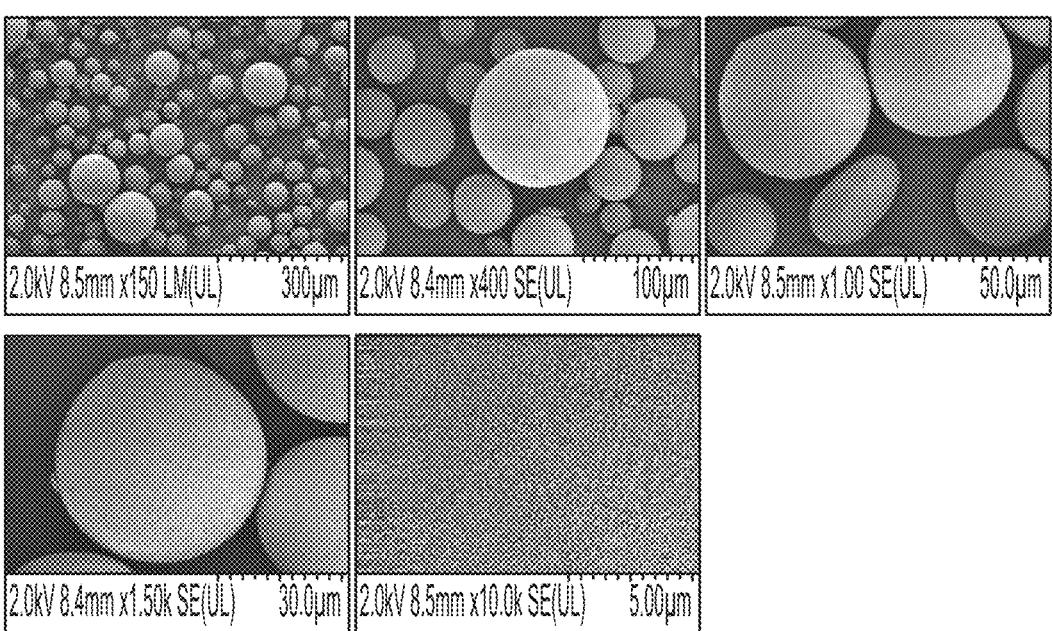
FIG. 20 is a scanning electron micrograph of polyamide particles.
Figure 20:
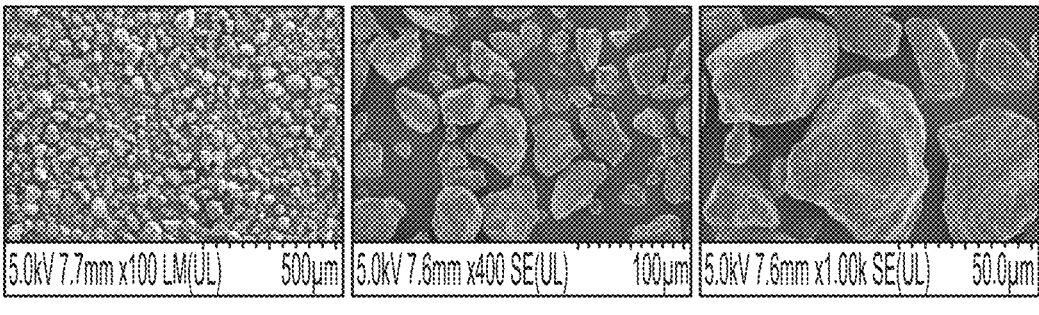

FIG. 12 illustrates SEM micrographs for sample 6-4. FIG. 13 illustrates SEM micrographs for sample 6-10. FIG. 14 illustrates SEM micrographs for sample 6-15. FIG. 15 illustrates SEM micrographs for sample 6-26. FIG. 16 illustrates SEM micrographs for sample 6-30. FIGS. 17-20 illustrate SEM micrographs for samples 6-31, 6-32, 6-33, and 6-34.

This example illustrates that decreasing the concentration of silica nanoparticles in the mixture increases the particle size but decreases the diameter span (e.g., comparing 6-17 through 6-18 to 6-28 through 6-29). Further, increasing the temperature decrease the particle size but increase the diameter span (e.g., comparing 6-17 through 6-18, 6-20 through 6-21, and 6-24 through 6-25). It also appears that the time of mixing beyond about 10 minutes has minimal effect on the particle size and diameter span.

Example 7. SEM micrographs were taken of commercially available polyamide particulate material used for 3D printing, see Table 6.

TABLE 6

Figure 21:
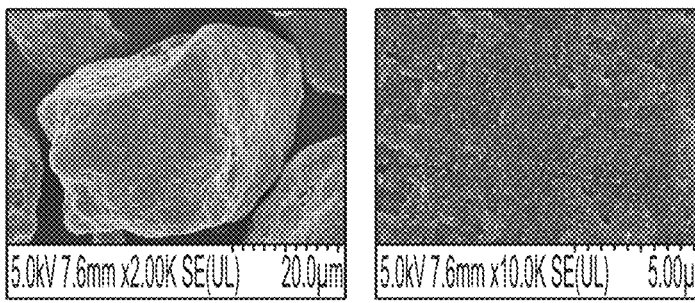
FIG. 21 is a scanning electron micrograph of polyamide particles.
Figure 22:
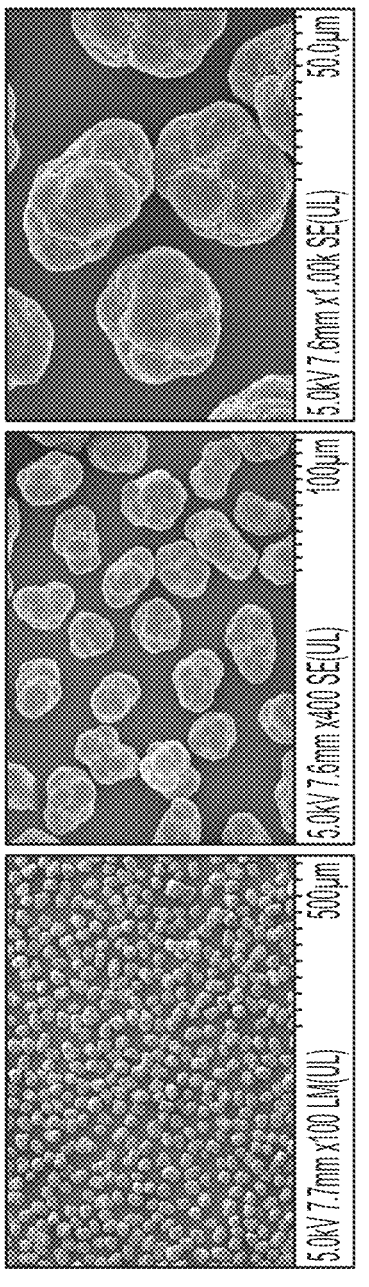
FIG. 22 is a scanning electron micrograph of polyamide particles.
Figure 22:
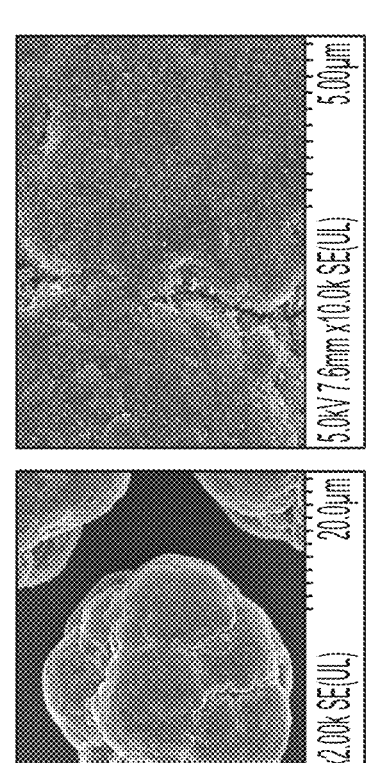
Figure 23A:
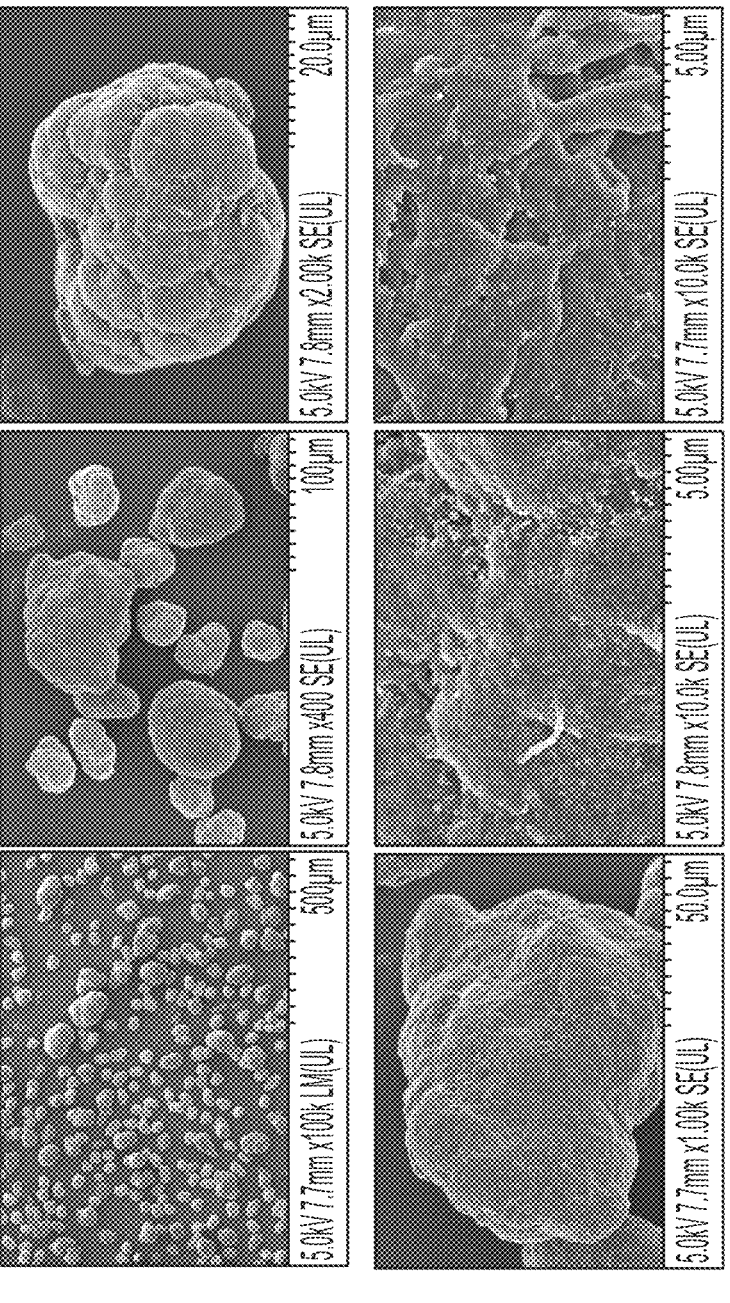
FIGS. 23A and 23B are scanning electron micrographs of polyamide particles.
Figure 23B:
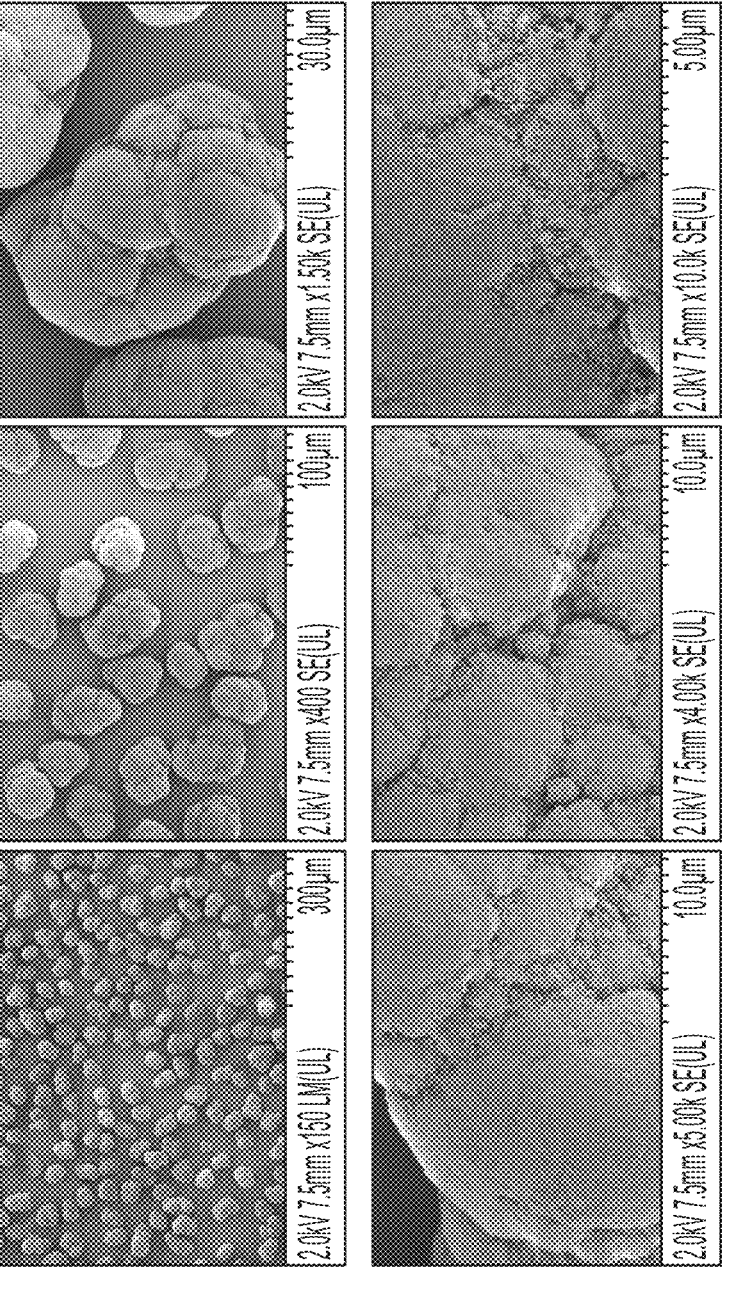
Figure 24:
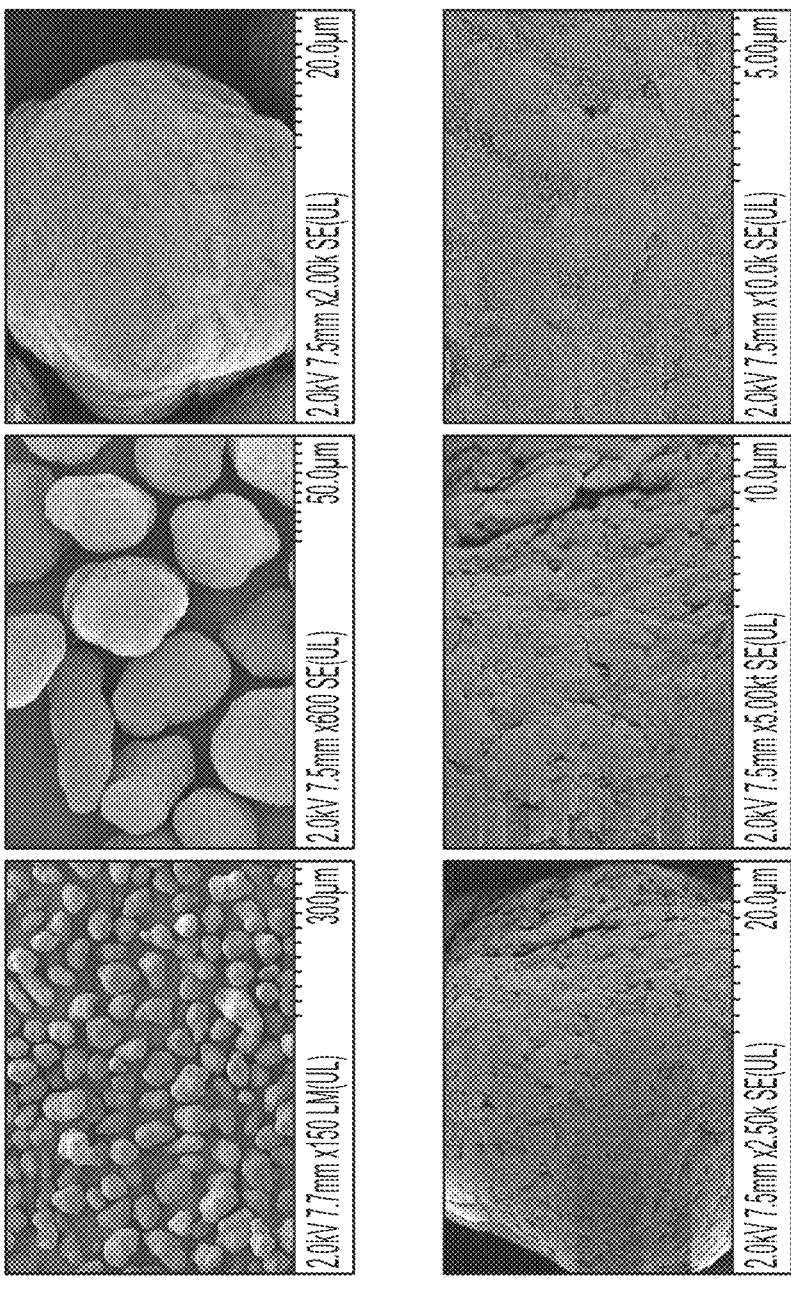
FIG. 24 is a scanning electron micrograph of polyamide particles.

| Sample | SEM Micrographs |
|---|---|
| ADSINT ™ PA11 | FIG. 21 |
| ADSINT ™ PA12L | FIG. 22 |
| ADSINT ™ PA12 | FIGS. 23A and 23B |
| SINTRATEC ™ PA12 | FIG. 24 |

Comparing the SEM micrographs for the commercially available samples to those of samples 6-4, 6-10, 6-15, 6-26, 6-30, 6-31, 6-32, 6-33, and 6-34 of Example 4, the particles produced by the methods described herein have a greater circularity and higher silica nanoparticle coverage on the surface of the polyamide particles.

Example 8. Three sets of samples were prepared with polyamide 12 from RTP. 10,000 cSt PDMS, 23 wt % polyamide 12 relative to the weight of PDMS and polyamide combined, 1 wt % AEROSIL® R812S silica nanoparticles relative to the weight of the polyamide, and optionally surfactant (wt % relative to the weight of the polyamide) were placed in a glass kettle reactor. The headspace was purged with argon and the reactor was maintained under positive argon pressure. The components were heated to over 220° C. over about 60 minutes with 300 rpm stirring. At temperature, the rpm was increased to 1250 rpm. The process was stopped after 90 minutes and allowed to cool to room temperature while stirring. The resultant mixture was filtered and washed with heptane. A portion of the resultant particles was screened (scr) through a 150-μm sieve. Table 7 includes the additional components of the mixture and properties of the resultant particles.

Figure 25:
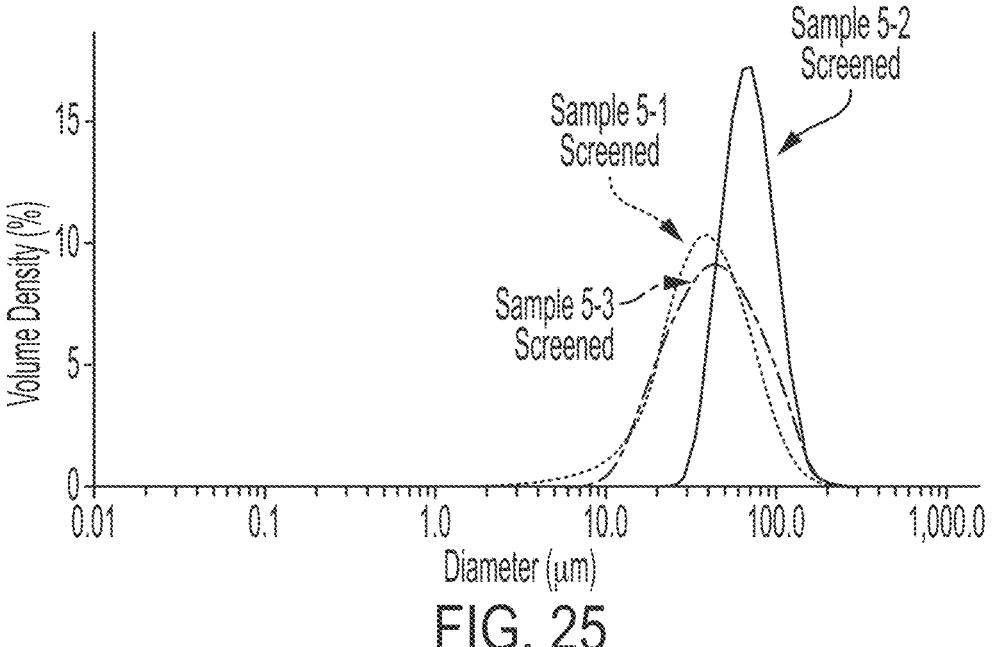
FIGS. 25 and 26 are the volume density particle size distribution for the particles screened and not screened, respectively.
Figure 26:
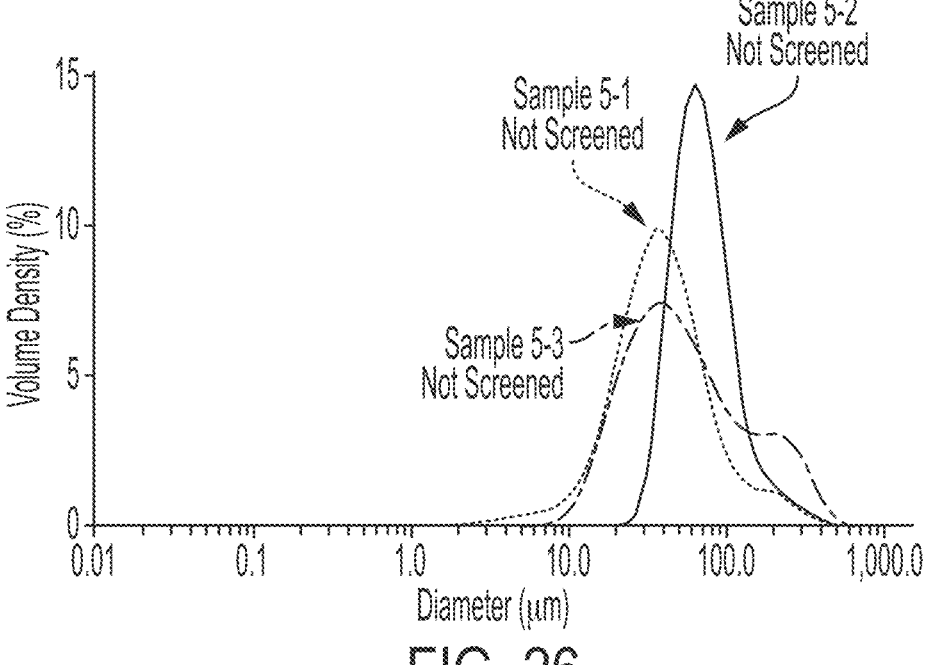

FIGS. 25 and 26 are the volume density particle size distribution for the particles screened and not screened, respectively.

Example 9. This example illustrates that the inclusion of surfactant and the composition of said surfactant can be another tool used to tailor the particle characteristics.

In this example, powder flow of polyurethane particulates was characterized through sieving and angle of repose measurements. The sieved yield of the polyurethane particulates was determined by exposing a quantity of polyurethane particulates to a 150 μm U.S.A. Standard Sieve (ASTM E11) and determining the fraction by mass of particulates passing through the sieve relative to the total quantity of polyurethane particulates. The sieve was used manually without particular conditions of duration of force. Angle of repose measurements were performed using a Hosokawa Micron Powder Characteristics Tester PT-R using ASTM D6393-14 "Standard Test Method for Bulk Solids" Characterized by Carr Indices."

In this example, average particle size measurements and particle size distributions were determined by optical digital microscopy. The optical images were obtained using a Keyence VHX-2000 digital microscope using version 2.3.5.1 software for particle size analysis (system version 1.93). In some instances, $D_{10}$, $D_{50}$ and $D_{90}$ measurements were made using a Malvern MASTERSIZER™ 3000 Aero S particle size analyzer, which uses light scattering techniques for particle size measurement.

For light scattering techniques, glass bead control samples with a diameter within the range of 15 μm to 150 μm under the tradename Quality Audit Standards QAS4002™ obtained from Malvern Analytical Ltd. may be used. Samples may be analyzed as dry powders dispersed in air using the dry powder dispersion module of the MASTERSIZER™ 3000 Aero S. Particle sizes may be derived using the instrument software from a plot of volume density as a function of size.

Comparative Example 9-1. To a 500 mL glass reactor, 160 g polydimethylsiloxane (PSF-30000, Clearco) was added. The reactor was set to a stirring rate of 200 rpm, and the temperature was raised to 190° C. under an atmosphere of nitrogen gas. Further heating to 200° C. was performed, at which point, 40 g thermoplastic polyurethane pellets were added to the stirring polydimethylsiloxane. The thermoplastic polyurethane was poly[4,4'-methylenebis(phenyl isocyanate)-alt-1,4-butanediol/di(propylene glycol)/polycaprolactone] with hardness Shore A 84 (Sigma-Aldrich). Once the thermoplastic polyurethane pellets were fully combined with the polydimethylsiloxane, the stirring rate was increased to 500 rpm and the temperature was maintained at 200° C. for 60 minutes. Thereafter, stirring was discontinued and the resulting slurry was allowed to cool to room tem-

TABLE 7

| Sample | Surfactant | Max Reactor Temp. (° C.) | Screened Particle Size (μm or unitless) D10 | D50 | D90 | Span | Not Screened Particle Size (μm or unitless) D10 | D50 | D90 | Span |
|---|---|---|---|---|---|---|---|---|---|---|
| 8-1 | none | 223 | 16.7 | 37.4 | 77.3 | 1.62 | 16.9 | 38.7 | 122 | 2.72 |
| 8-2 | 2.5% CALFAX ® DB-45 | 226 | 44.2 | 67.7 | 105 | 0.90 | 41.4 | 68.1 | 131 | 1.32 |
| 8-3 | 1% docusate sodium | 226 | 19.2 | 43.3 | 95.8 | 1.77 | 19.4 | 48.8 | 207 | 3.84 | perature. The slurry was washed twice with hexane, and thermoplastic polyurethane particulates were obtained following vacuum filtration.

Figure 27:
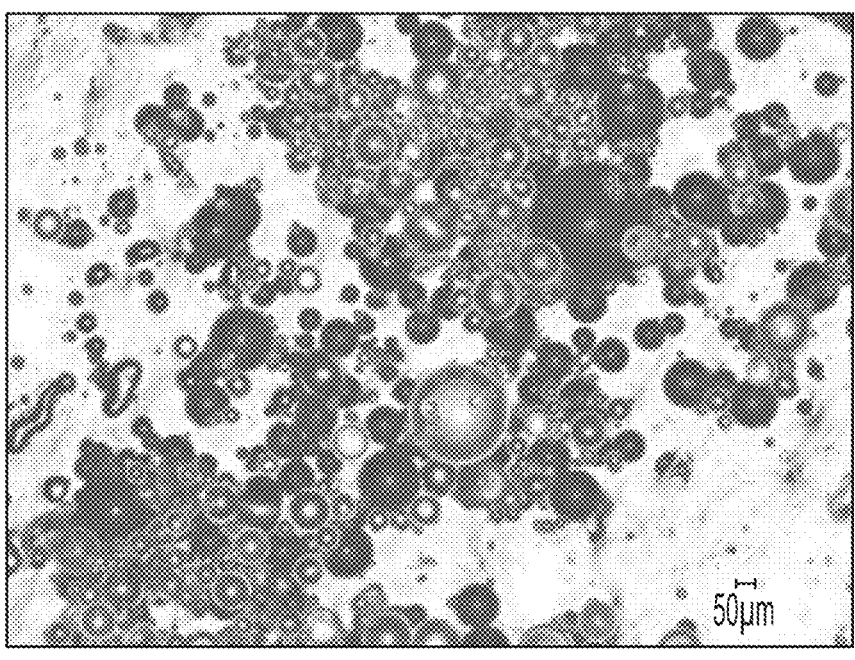
FIG. 27 shows an illustrative optical microscopy image at 150× magnification of thermoplastic polyurethane particulates.

The thermoplastic polyurethane particulates were then passed through a 150 μm sieve, and particulates passing through the sieve were characterized by optical imaging. FIG. 27 shows an illustrative optical microscopy image at 150× magnification of thermoplastic polyurethane particulates obtained in Comparative Example 9-1. The average particle size was approximately 100 μm and a wide distribution of particle sizes was obtained.

Comparative Example 9-2. The thermoplastic polyurethane particulates from Comparative Example 9-1 were collected after filtration but before sieving and combined with 0.25 wt. % fumed silica particulates functionalized with hexamethyldisilazane (AEROSIL® RX50). The thermoplastic polyurethane particulates were then dry blended with the fumed silica particulates using an SKM Mill for 30 seconds at a blending rate of 170 rpm.

Figure 28:
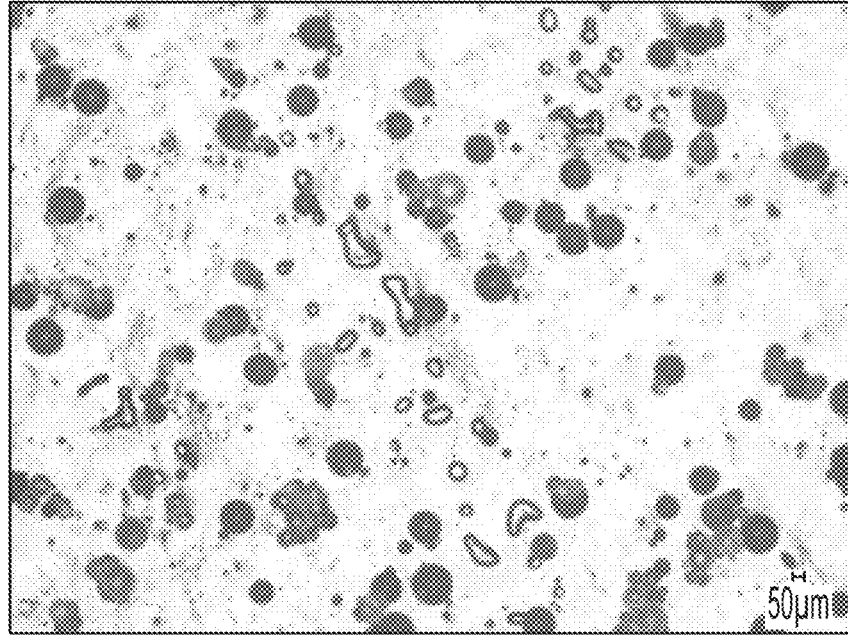
FIG. 28 shows an illustrative optical microscopy image of thermoplastic polyurethane particulates.
Figure 29A:
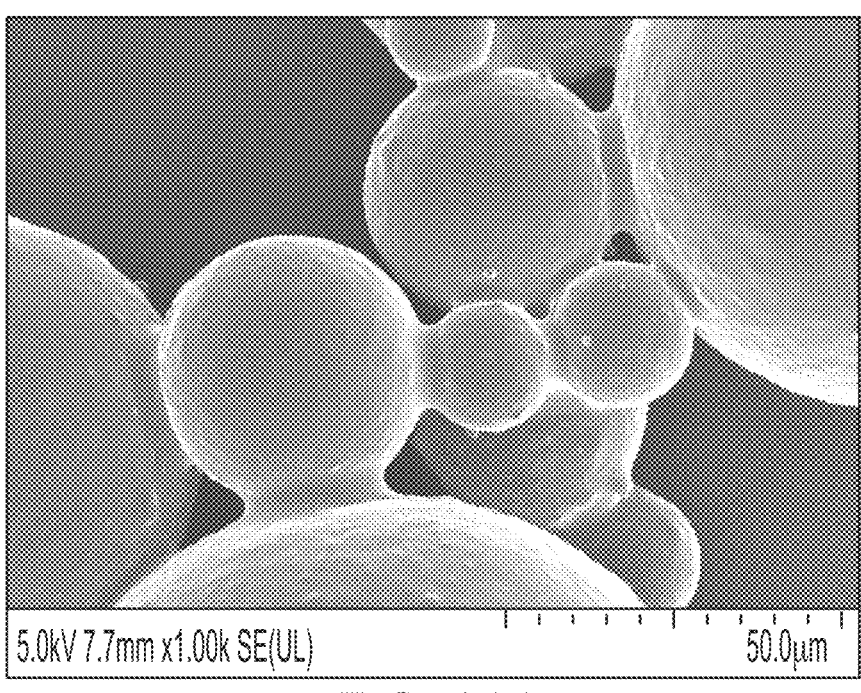
FIGS. 29A and 29B show illustrative SEM images of thermoplastic polyurethane particulates obtained in Comparative Example 2 at various magnifications.
Figure 29B:
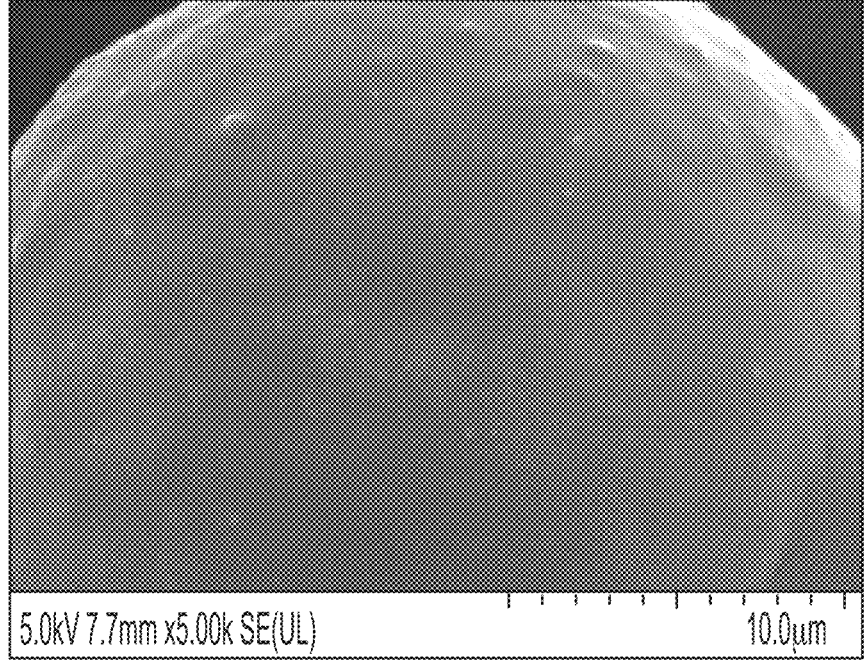

The dry-blended particulates were then passed through a 150 μm sieve and characterized by optical imaging and SEM. FIG. 28 shows an illustrative optical microscopy image of thermoplastic polyurethane particulates obtained in Comparative Example 9-2. FIGS. 29A and 29B show illustrative SEM images of thermoplastic polyurethane particulates obtained in Comparative Example 9-2 at various magnifications. The average particle size was approximately 100 μm and a wide distribution of particle sizes was obtained, similar to that of Comparative Example 9-1. There was no evidence of silica particle embedment upon the surface of the thermoplastic polyurethane particulates. Moreover, there was no apparent formation of a uniform silica coating upon the polyurethane particulates Example 9-1. Comparative Example 9-1 was repeated, except 0.25 wt. % of fumed silica particulates functionalized with hexamethyldisilazane (AEROSIL® R812S) was combined with the poly dimethylsiloxane prior to heating the reactor to temperature and adding the thermoplastic polyurethane particulates.

Figures 30, 31:
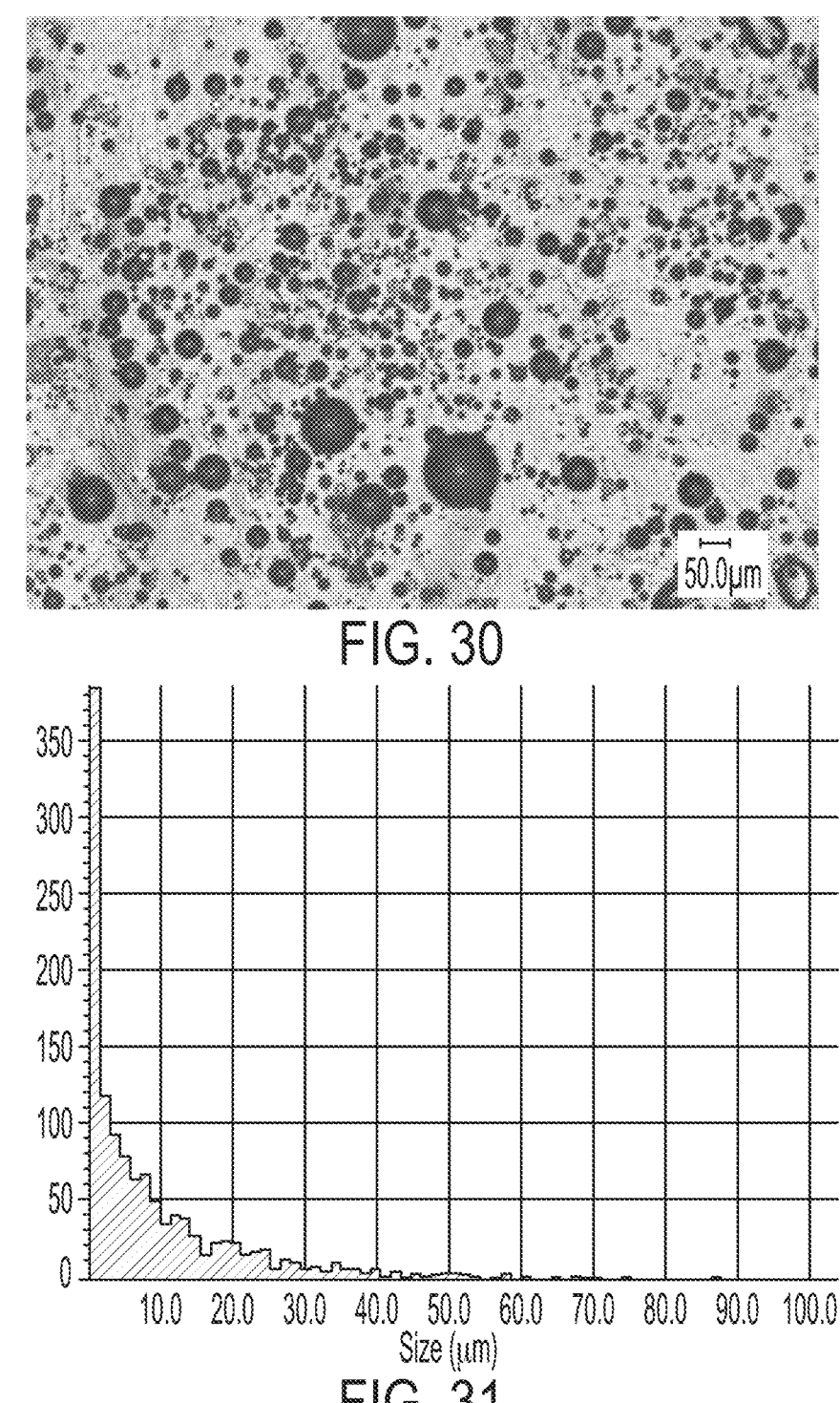
FIG. 30 shows an illustrative optical microscopy image of thermoplastic polyurethane particulates.
FIG. 31 shows an illustrative histogram of the particle sizes of thermoplastic polyurethane particulates.

The thermoplastic polyurethane particulates were then passed through a 150 μm sieve, and particulates passing through the sieve were characterized by optical imaging. FIG. 30 shows an illustrative optical microscopy image of thermoplastic polyurethane particulates obtained in Example 9-1. The average particle size was approximately 12±16 μm. FIG. 31 shows an illustrative histogram of the particle sizes of thermoplastic polyurethane particulates obtained in Example 9-1.

Example 9-2. Example 9-1 was repeated, except 1.00 wt. % of the same fused silica particulates was used. In addition, the slurry was washed three times with hexanes instead of twice.

Figure 32:
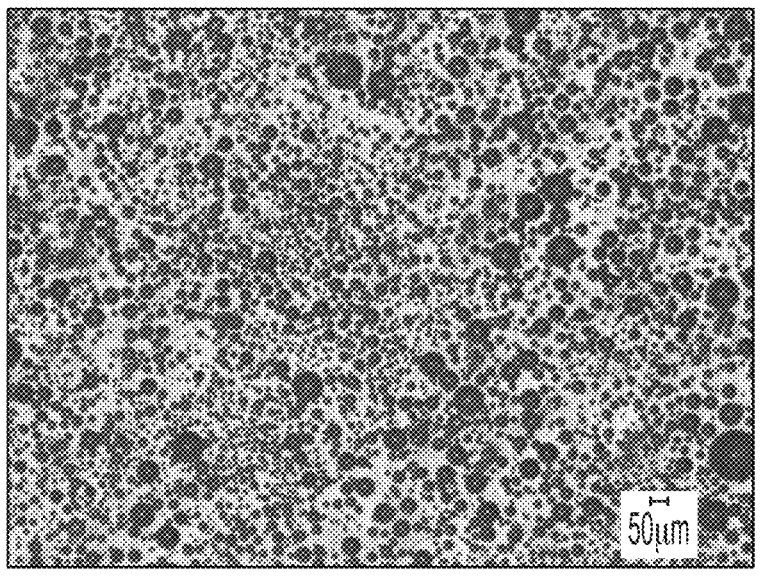
FIG. 32 shows an illustrative optical microscopy image of thermoplastic polyurethane particulates.
Figure 33:
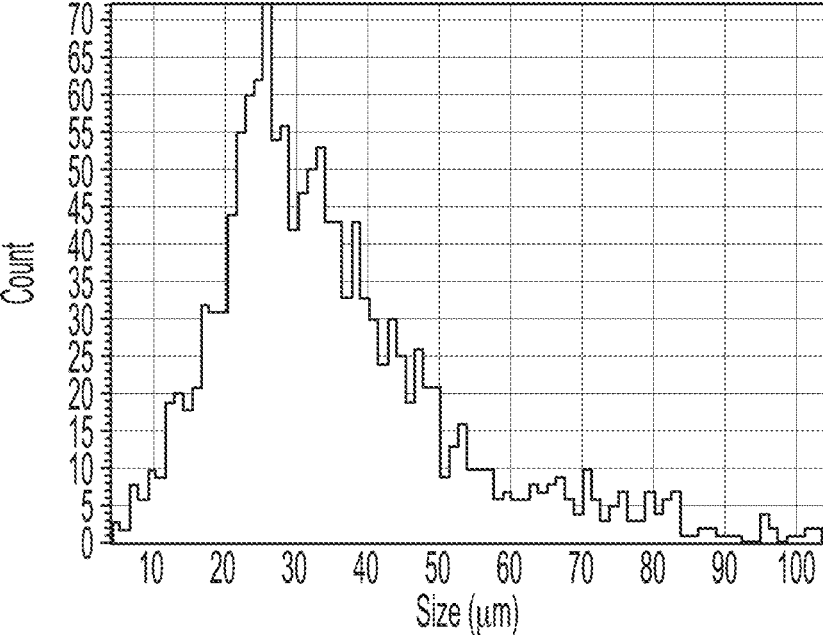
FIG. 33 shows an illustrative histogram of the particle sizes of thermoplastic polyurethane particulates.

The thermoplastic polyurethane particulates were then passed through a 150 μm sieve, and particulates passing through the sieve were characterized by optical imaging. FIG. 32 shows an illustrative optical microscopy image of thermoplastic polyurethane particulates obtained in Example 9-2. The average particle size was approximately 34±19 μm. FIG. 33 shows an illustrative histogram of the particle sizes of thermoplastic polyurethane particulates obtained in Example 9-2.

Example 9-3. Example 9-1 was repeated, except the type of fumed silica particulates was changed to AEROSIL® RX50. In addition, the slurry was washed four times with heptane instead of twice with hexanes.

Figure 34:
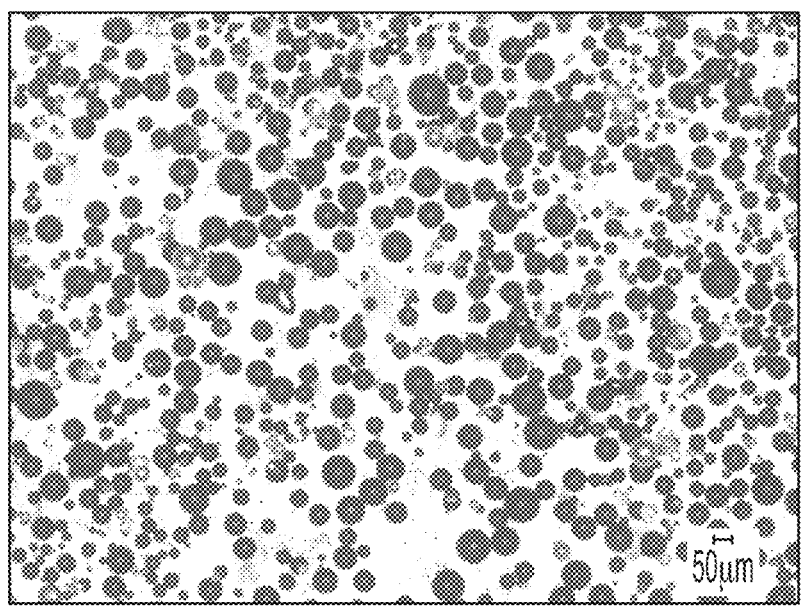
FIG. 34 shows an illustrative optical microscopy image of thermoplastic polyurethane particulates.
Figure 35A:
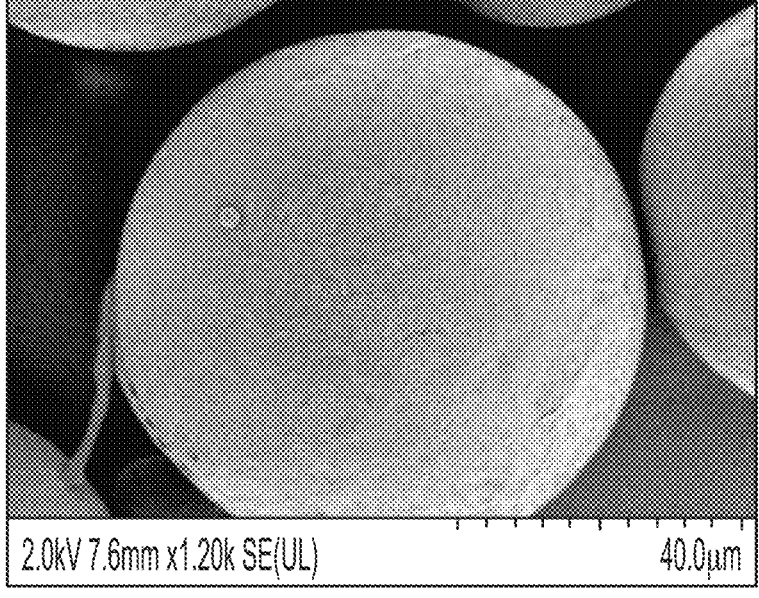
FIGS. 35A and 35B show illustrative SEM images of thermoplastic polyurethane particulates at various magnifications.
Figure 35B:
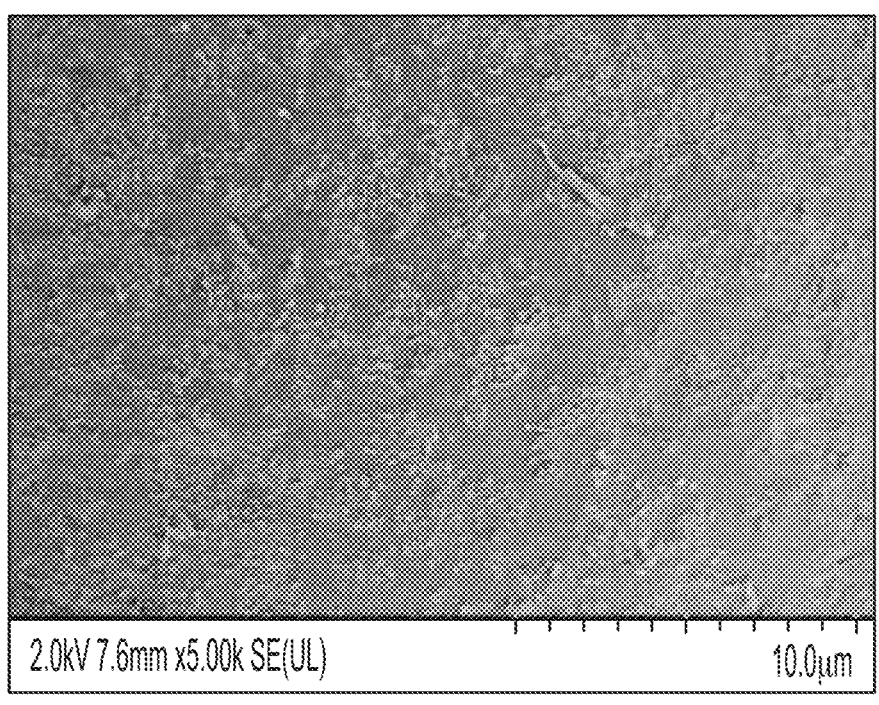
Figure 36:
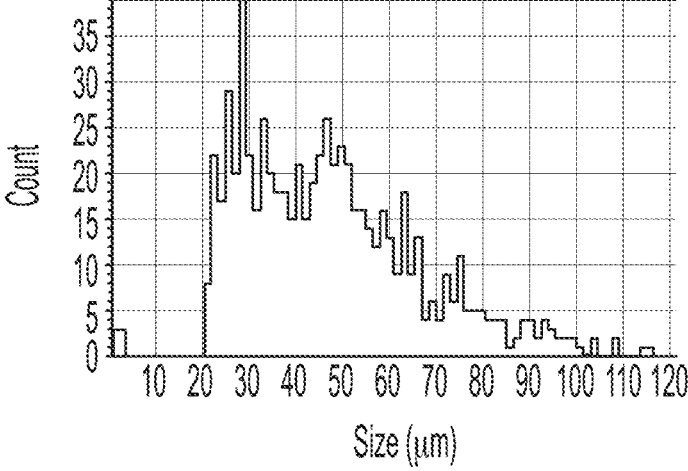
FIG. 36 shows an illustrative histogram of the particle sizes of thermoplastic polyurethane particulates.

The thermoplastic polyurethane particulates were then passed through a 150 μm sieve, and particulates passing through the sieve were characterized by optical imaging and SEM. FIG. 34 shows an illustrative optical microscopy image of thermoplastic polyurethane particulates obtained in Example 9-3. FIGS. 35A and 35B show illustrative SEM images of thermoplastic polyurethane particulates obtained in Example 9-3 at various magnifications. The average particle size by optical imaging was approximately 48±20 μm, and the angle of repose was 32.0°. FIG. 36 shows an illustrative histogram of the particle sizes of thermoplastic polyurethane particulates obtained in Example 9-3.

The particle size distribution determined by the Malvern Mastersizer particle size analyzer provided $D_{10}$, $D_{50}$ and $D_{90}$ values of 40.7 μm, 68.2 μm and 109 μm, respectively, thereby affording a span of 1.001.

Example 9-4. Example 9-1 was repeated, except the type of thermoplastic polyurethane pellets was changed to ELASTOLLAN® 1190A obtained from BASF. ELASTOLLAN® 1190A is a polyether polyurethane elastomer with a hardness Shore A 90.

Figure 37:
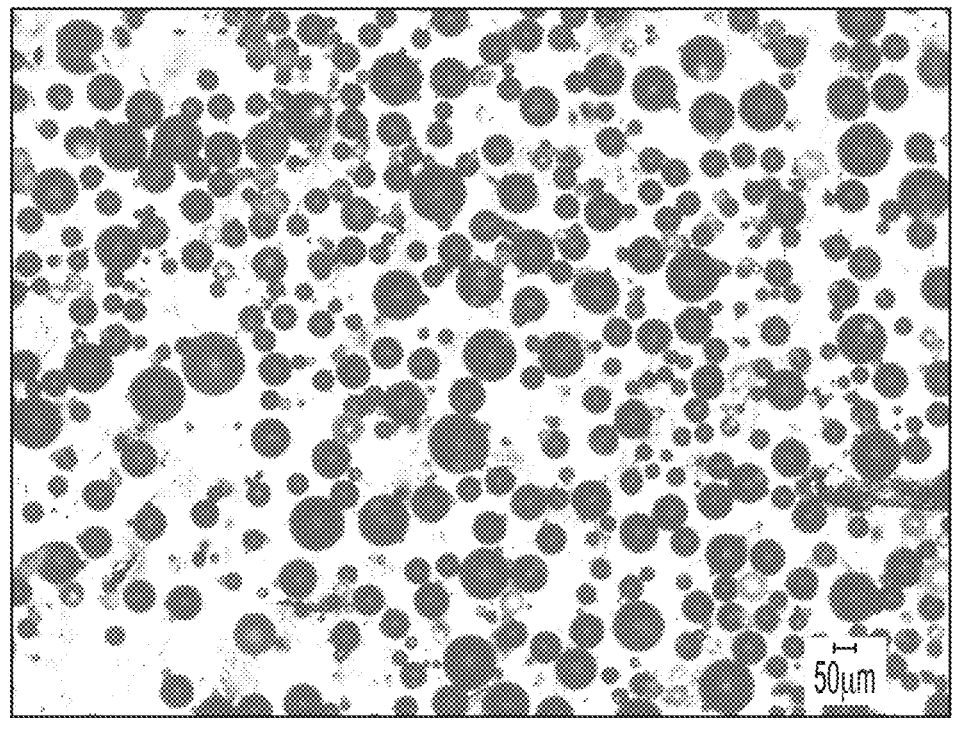
FIG. 37 shows an illustrative optical microscopy image of thermoplastic polyurethane particulates.
Figure 38A:
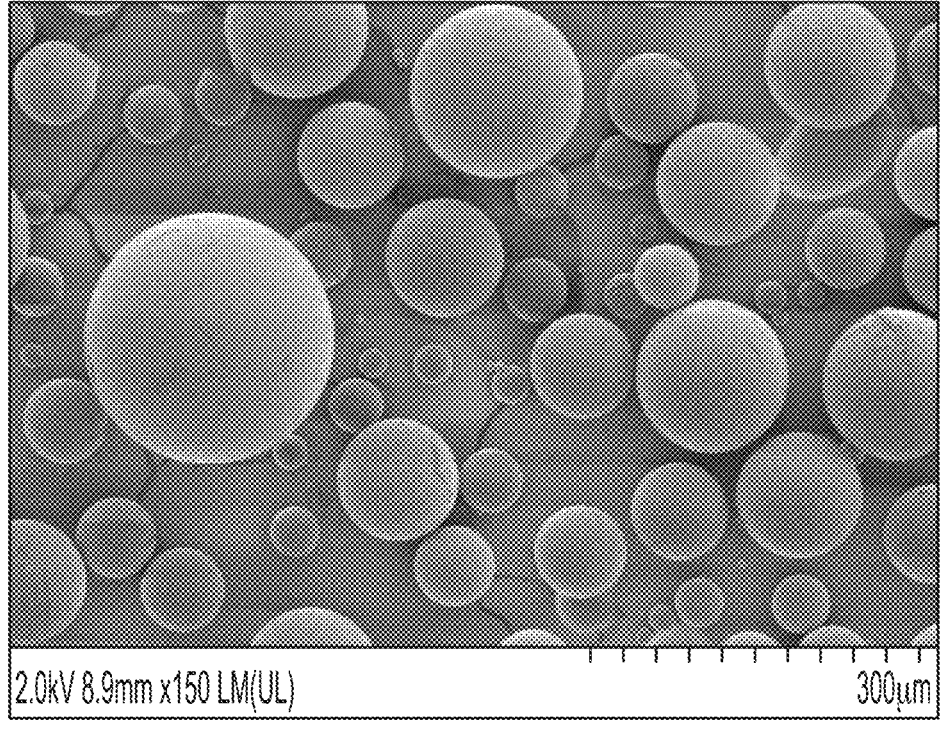
FIGS. 38A-38D show illustrative SEM images of thermoplastic polyurethane particulates at various magnifications.
Figure 38B:
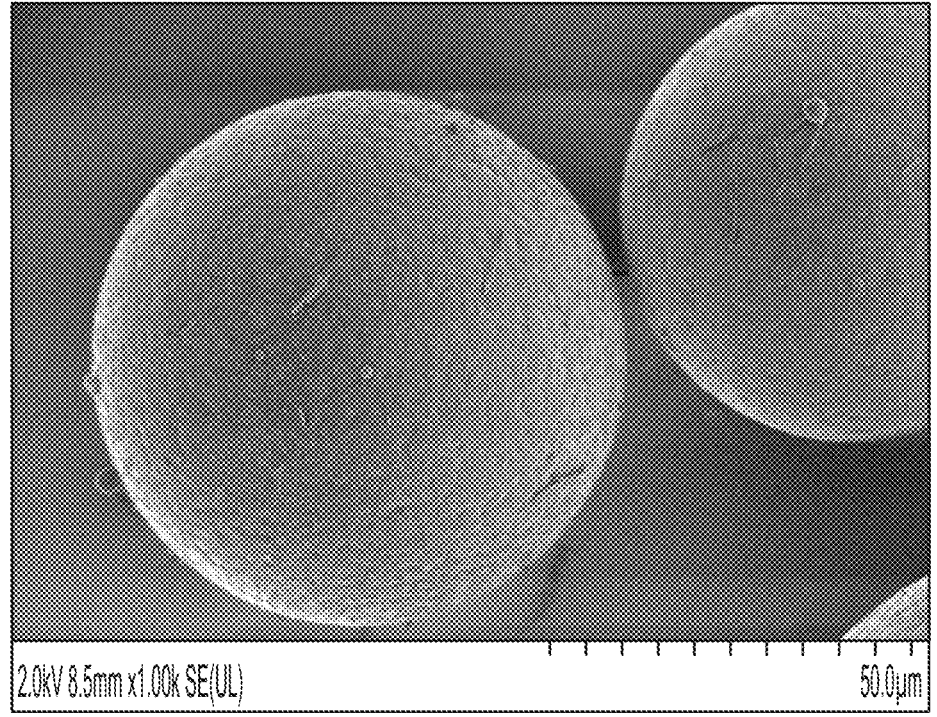
Figure 38C:
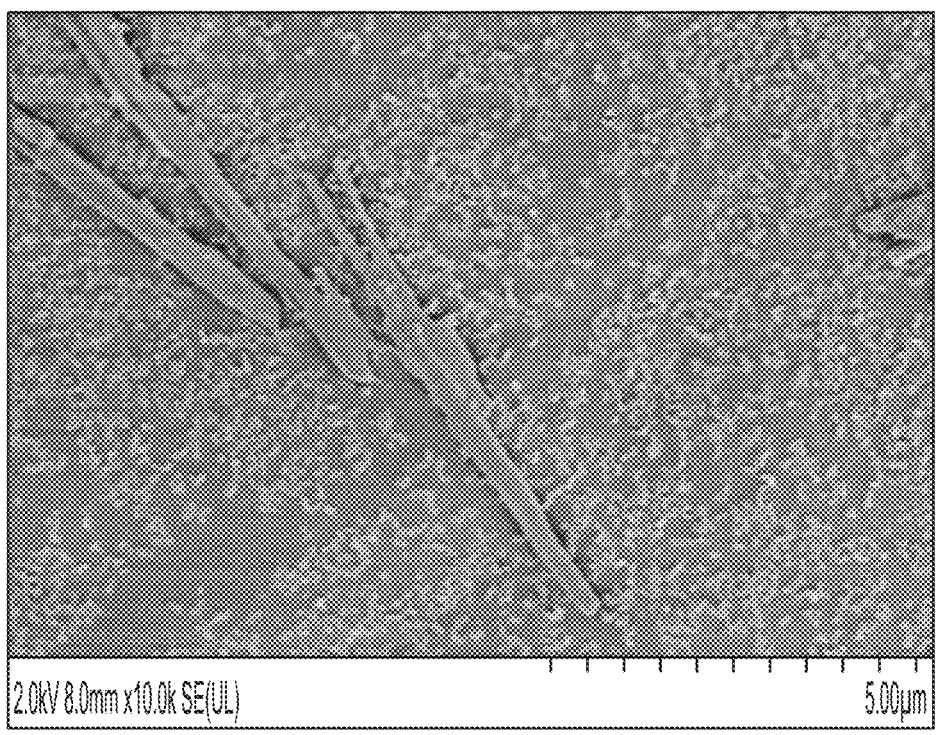
Figure 38D:
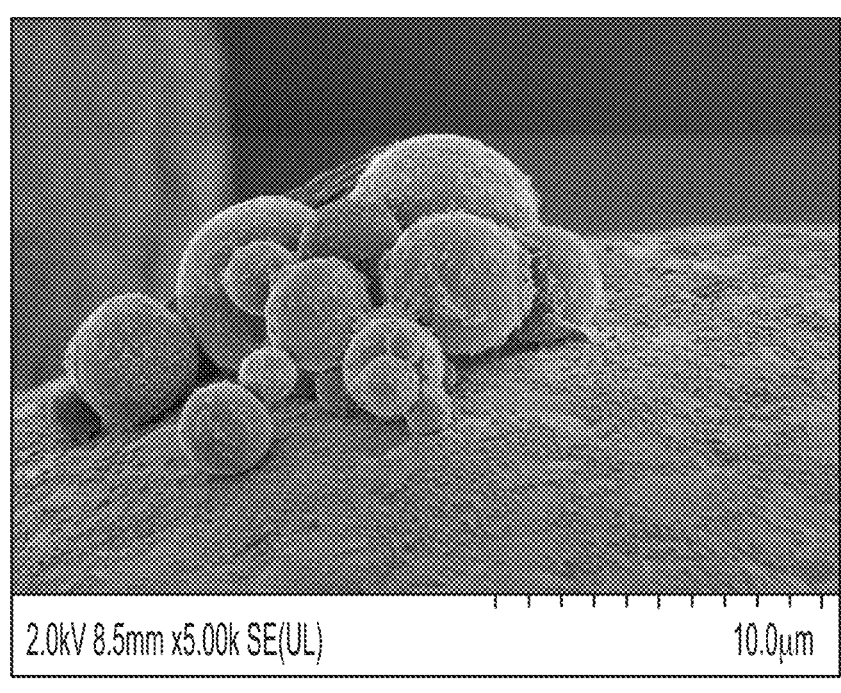
Figure 39:
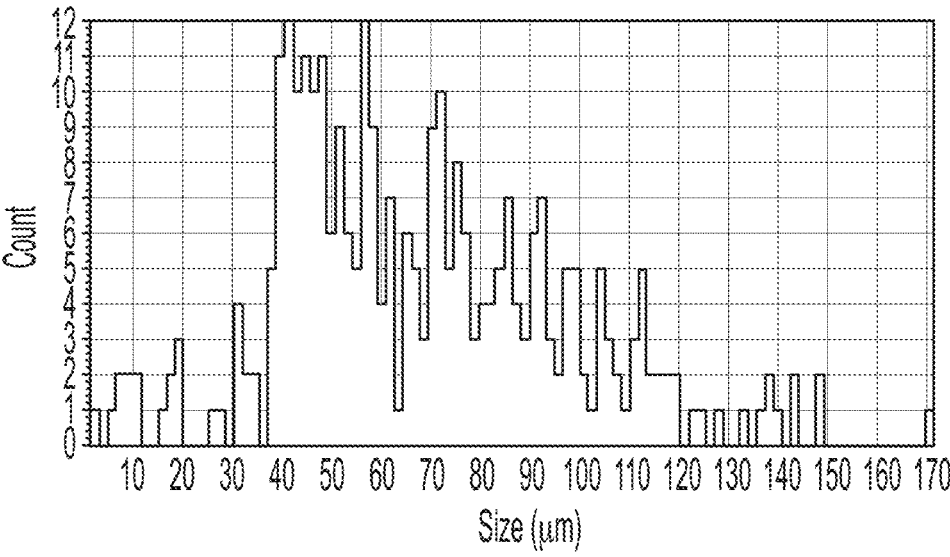
FIG. 39 shows an illustrative histogram of the particle sizes of thermoplastic polyurethane particulates.

The thermoplastic polyurethane particulates were then passed through a 150 μm sieve, and particulates passing through the sieve were characterized by optical imaging and SEM. FIG. 37 shows an illustrative optical microscopy image of thermoplastic polyurethane particulates obtained in Example 9-4. FIGS. 38A-D show illustrative SEM images of thermoplastic polyurethane particulates obtained in Example 9-4 at various magnifications. The average particle size by optical imaging was approximately 68±29 μm, and the angle of repose was 29.9°. FIG. 39 shows an illustrative histogram of the particle sizes of thermoplastic polyurethane particulates obtained in Example 9-4.

The particle size distribution determined by the Malvern Mastersizer particle size analyzer provided $D_{10}$, $D_{50}$ and $D_{90}$ values of 61.0 μm, 95.6 μm and 146 μm, respectively, thereby affording a span of 0.889.

Example 9-5. Example 9-4 was repeated, except processing was conducted at one-half the scale of Example 9-4.

Figure 40:
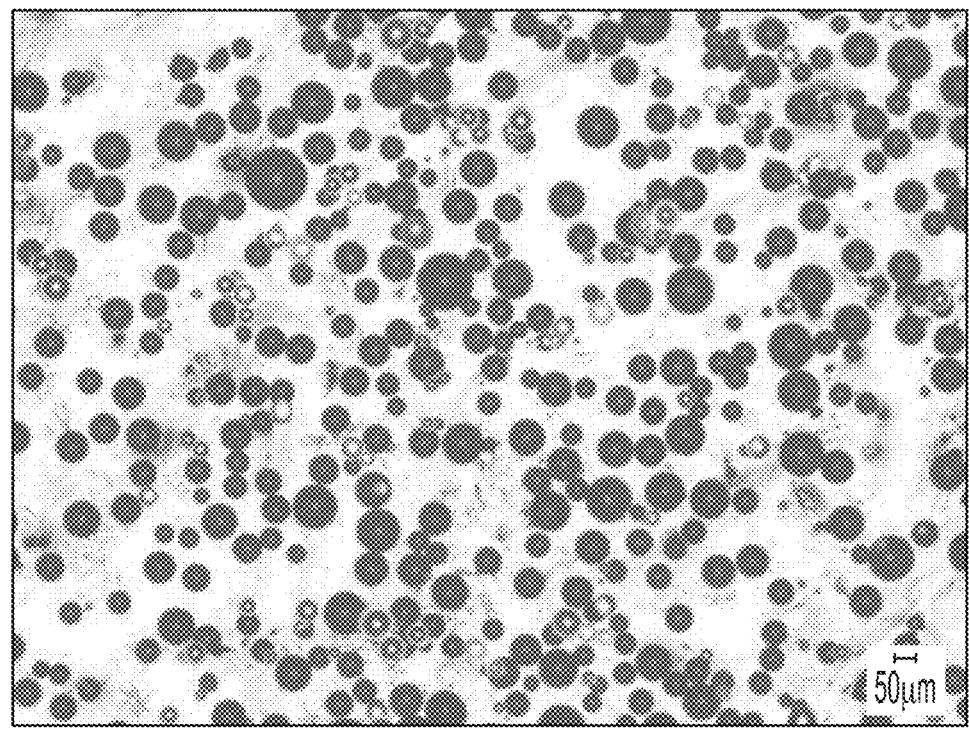
FIG. 40 shows an illustrative optical microscopy image of thermoplastic polyurethane particulates.
Figure 41A:
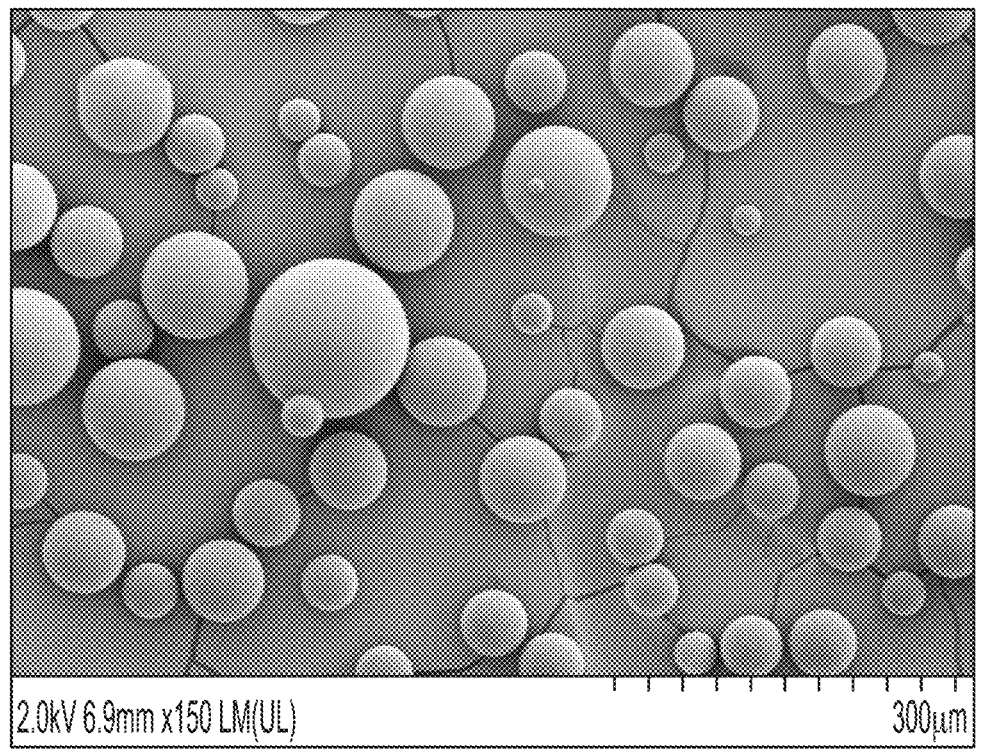
FIGS. 41A-41C show illustrative SEM images of thermoplastic polyurethane particulates at various magnifications.
Figure 41B:
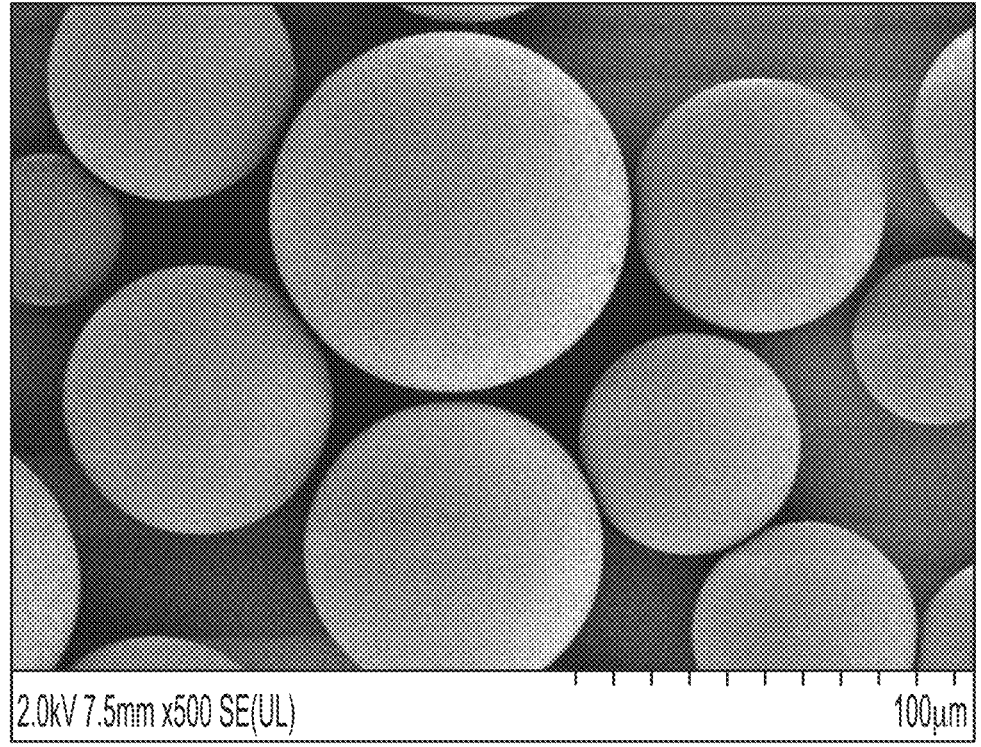
Figure 41C:
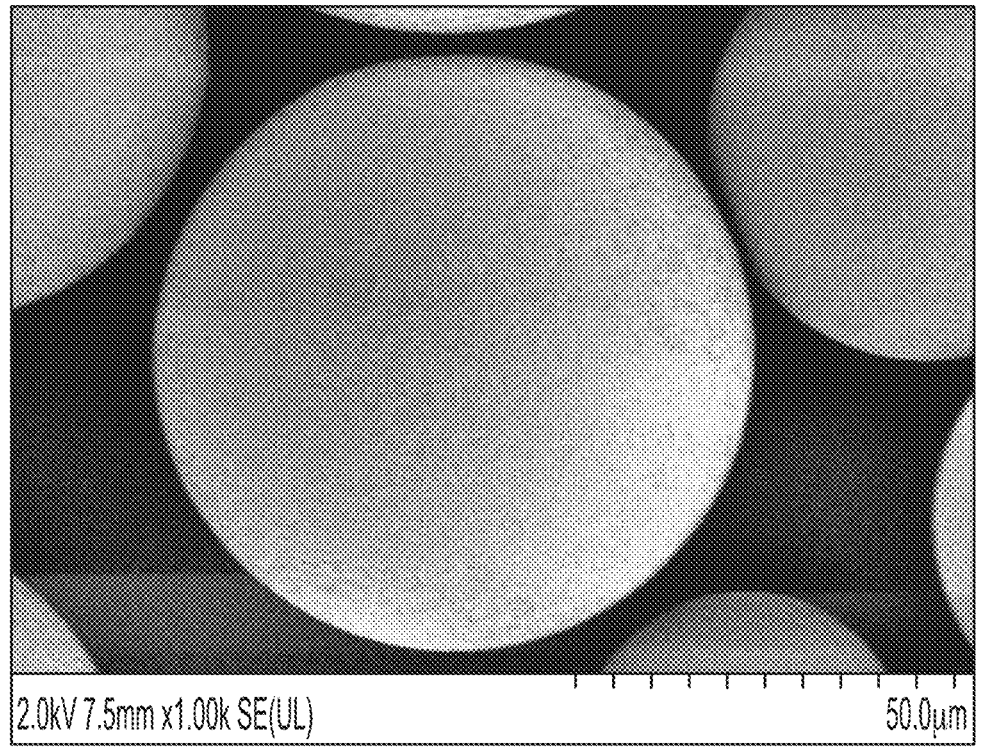
Figure 42:
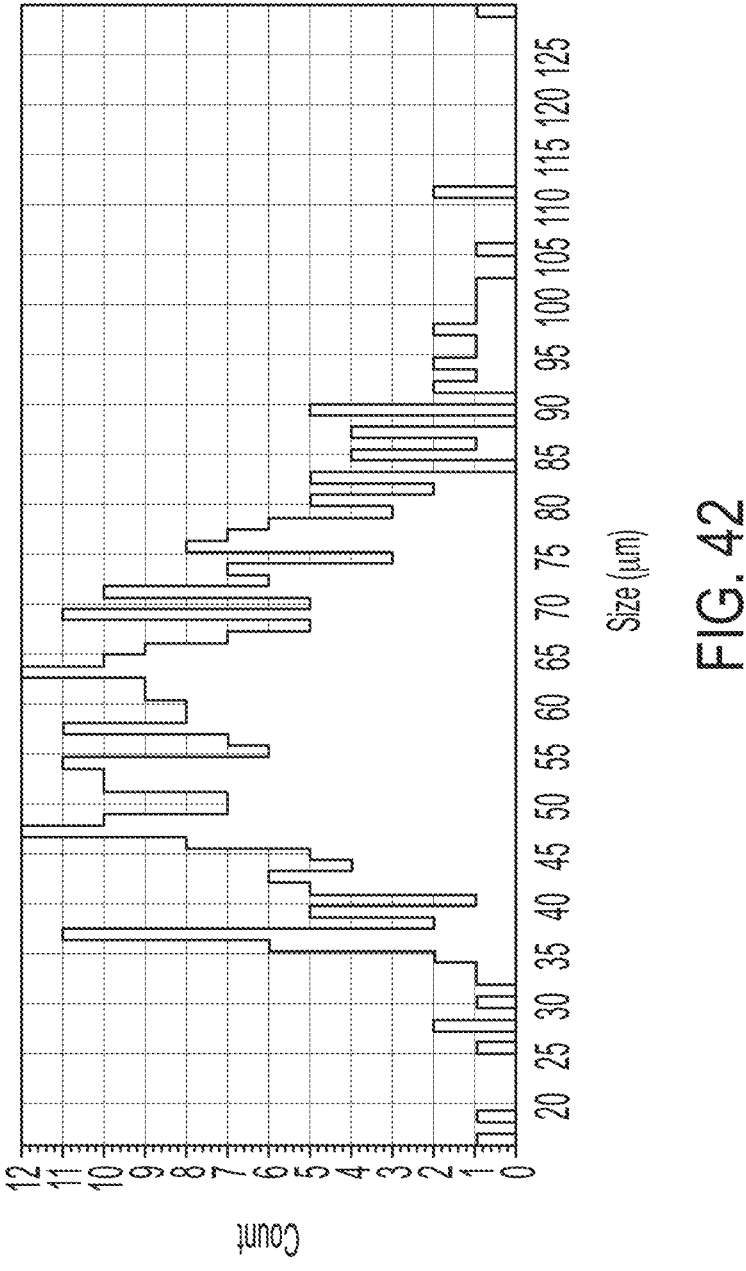
FIG. 42 shows an illustrative histogram of the particle sizes of thermoplastic polyurethane particulates.

The thermoplastic polyurethane particulates were then passed through a 150 μm sieve, and particulates passing through the sieve were characterized by optical imaging and SEM. FIG. 40 shows an illustrative optical microscopy image of thermoplastic polyurethane particulates obtained in Example 9-5. FIGS. 41A-41C show illustrative SEM images of thermoplastic polyurethane particulates obtained in Example 9-5 at various magnifications. The average particle size by optical imaging was approximately 61±17 μm. FIG. 42 shows an illustrative histogram of the particle sizes of thermoplastic polyurethane particulates obtained in Example 9-5.

The particle size distribution determined by the Malvern MASTERSIZER™ particle size analyzer provided $D_{10}$, $D_{50}$ and $D_{90}$ values of 52.6 μm, 71.7 μm and 97.2 μm, respectively, thereby affording a span of 0.622.

Comparison of Results. Tables 8A and 8B below summarize the formation conditions used for Comparative Examples 9-1 and 9-2 and Examples 9-1 through 9-5 and the properties of the thermoplastic polyurethane particulates obtained in each instance. Solids loading was calculated by dividing the mass of thermoplastic polyurethane by the combined mass of thermoplastic polyurethane and poly dimethylsiloxane.

TABLE 8A

| | Comp. Example 9-1 | Comp. Example 9-2 | Example 9-1 | Example 9-2 |
|---|---|---|---|---|
| Solids Loading | 20% | 20% | 20% | 20% |
| Thermoplastic Polyurethane (TPU) | 40 g | 40 g | 40 g | 80 g |
| Poly(dimethylsiloxane) (PDMS) | 160 g | 160 g | 160 g | 320 g |
| PDMS Viscosity | 30,000 cSt | 30,000 cSt | 30,000 cSt | 30,000 cSt |
| Fumed Silica (wt. %) | None | 40 nm (0.25%) | 7 nm (0.25%) | 7 nm (1.00%) |
| Blending Process | Melt Emuls. | Dry Blend | Melt Emuls. | Melt Emuls. |
| Reactor | 500 mL Kettle | 500 mL Kettle | 500 mL Kettle | 500 mL Kettle |
| Temperature | 200° C. | 200° C. | 200° C. | 200° C. |
| RPM | 500 | 500 | 500 | 500 |
| Reaction Time | 60 min | 60 min | 60 min | 60 min |
| Washing | Hexane x 2 | Hexane x 2 | Hexane x 2 | Hexane x 3 |
| Pre-Sieving Mass Recovery | 96% | 96% | 70% | 78% |
| Sieved Yield (150 μm) | Cannot sieve | 0.8% | 40% | 43% |
| Average Particle Size by Optical Microscopy | ~100 μm | ~100 μm | 12 ± 16 μm | 34 ± 19 μm |
| $D_{10}$ (μm) | | | | |
| $D_{50}$ (μm) | | | | |
| $D_{90}$ (μm) | | | | |
| Span | | | | |
| Digital Microscope Images | FIG. 27 (150X) | FIG. 28 (100X) | FIG. 30 (250X) | FIG. 32 (150X) |
| SEM Images | | FIGS. 29A/29B | | |
| Histogram | | | FIG. 31 | FIG. 33 |
| Angle of repose | | | | |

TABLE 8B

| | Example 9-3 | Example 9-4 | Example 9-5 |
|---|---|---|---|
| Solids Loading | 20% | 20% | 20% |
| Thermoplastic Polyurethane (TPU) | 80 g | 80 g | 40 g |
| Poly(dimethylsiloxane) (PDMS) | 320 g | 320 g | 160 g |
| PDMS Viscosity | 30,000 cSt | 30,000 cSt | 30,000 cSt |
| Fumed Silica (wt. %) | 40 nm (0.25%) | 40 nm (0.25%) | 40 nm (0.25%) |
| Blending Process | Melt Emuls. | Melt Emuls. | Melt Emuls. |
| Reactor | 500 mL Kettle | 500 mL Kettle | 500 mL Kettle |
| Temperature | 200° C. | 200° C. | 200° C. |
| RPM | 500 | 500 | 500 |
| Reaction Time | 60 min | 60 min | 60 min |
| Washing | Heptane x 4 | Heptane x 4 | Heptane x 4 |
| Pre-Sieving Mass Recovery | 89-95% | 97% | 96% |
| Sieved Yield (150 μm) | 80-83% | 73% | 87% |
| Average Particle Size by Optical Microscopy | 48 ± 20 μm | 68 ± 29 μm | 61 ± 17 μm |
| $D_{10}$ (μm) | 40.7 | 61.0 | 52.6 |
| $D_{50}$ (μm) | 68.2 | 95.6 | 71.7 |
| $D_{90}$ (μm) | 109 | 146 | 97.2 |
| Span | 1.001 | 0.889 | 0.622 |
| Digital Microscope Images | FIG. 34 (150X) | FIG. 37 (150X) | FIG. 40 (150X) |
| SEM Images | FIGS. 35A/35B | FIGS. 38A-38D | FIGS. 41A-41C |
| Histogram | FIG. 36 | FIG. 39 | FIG. 42 |
| Angle of repose | 32.0° | 29.9° | |

As shown in Tables 8A and 8B and the accompanying FIGS., there was a wide particle size distribution and some particulate coalescence in the absence of a fused silica emulsion stabilizer (Comparative Examples 9-1 and 9-2). Different loadings and sizes of fused silica particles afforded narrower particle size distributions and variations in average particle size (Examples 9-1 through 9-3). Different thermoplastic polyurethanes also led to variance in the average particle size obtained (Examples 9-3 and 9-4). The processing scale also impacted the particle size distribution as well (Examples 9-4 and 9-5).

Comparing the SEM images, there was fairly uniform coverage of silica nanoparticles upon the surface of the thermoplastic polyurethane particulates obtained by melt emulsification (Examples 9-3 through 9-5; FIGS. 35A/10B, 38A-13D and 41A-41C). The thermoplastic polyurethane particulates obtained in Example 9-5, which had a narrower particle size distribution, had a more even coverage/distribution of silica nanoparticles than did the comparable thermoplastic polyurethane particulates prepared in Example 9-4, which had a wider particle size distribution.

In contrast to thermoplastic polyurethane particulates produced by melt emulsification with silica nanoparticles, dry blending of thermoplastic polyurethane particulates with silica nanoparticles resulted in little, if any, coverage of silica nanoparticles on the thermoplastic polyurethane particulates (Comparative Example 9-2; FIGS. 29A/29B).

Figure 43A:
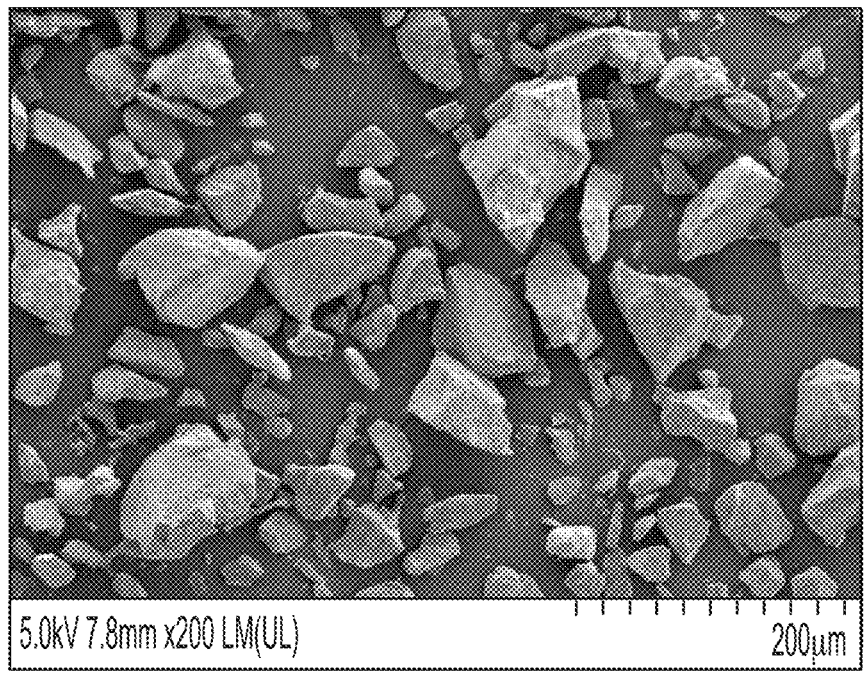
FIGS. 43A-43E show illustrative SEM images of TPU 90A NAT thermoplastic polyurethane particulates (ADVANC3D).
Figure 43B:
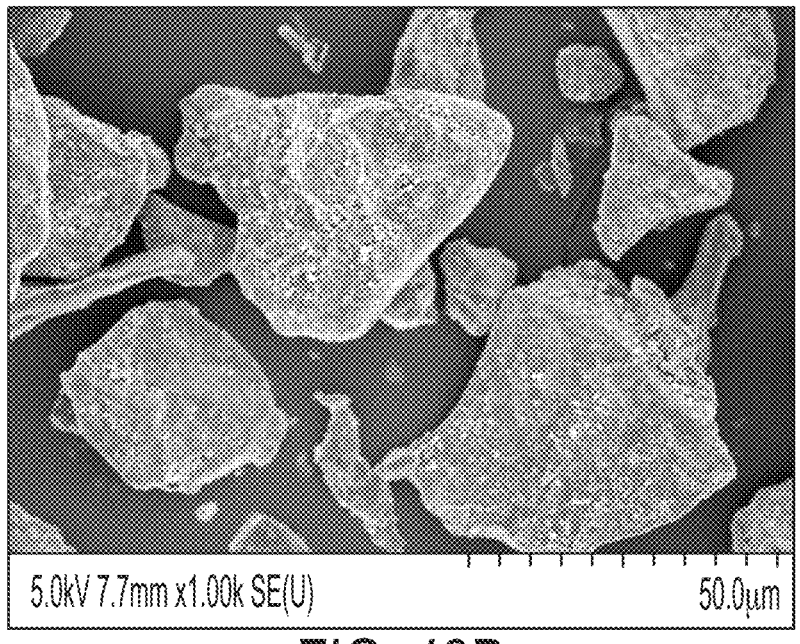
Figure 43C:
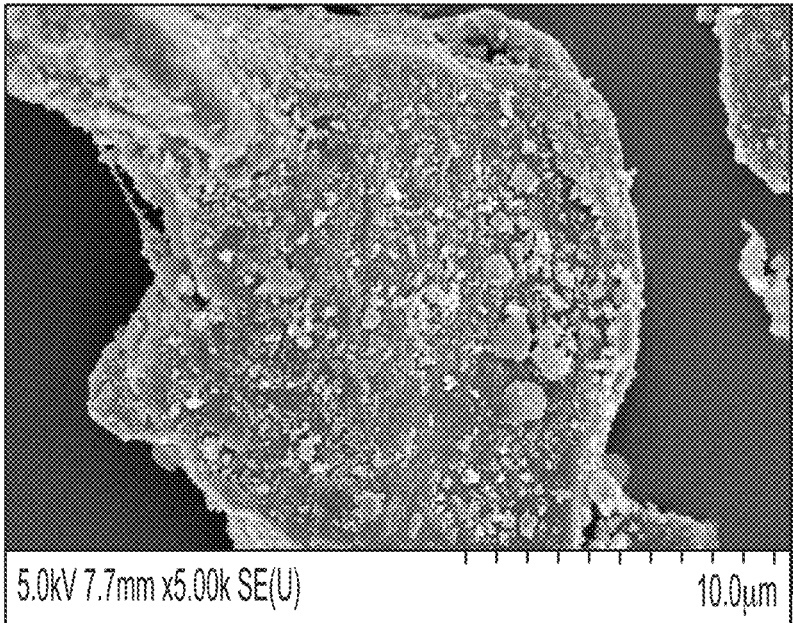
Figure 43D:
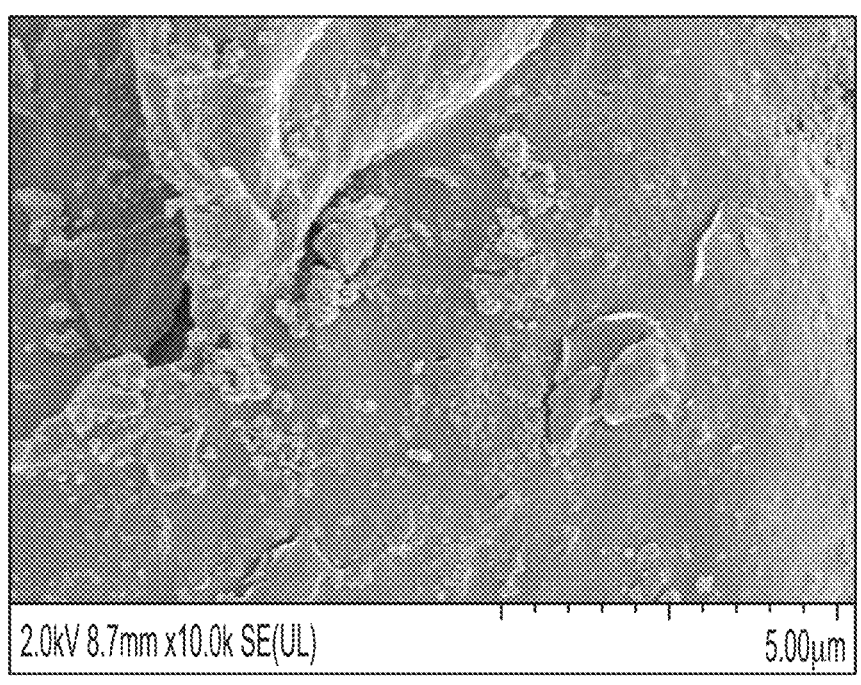
Figure 43E:
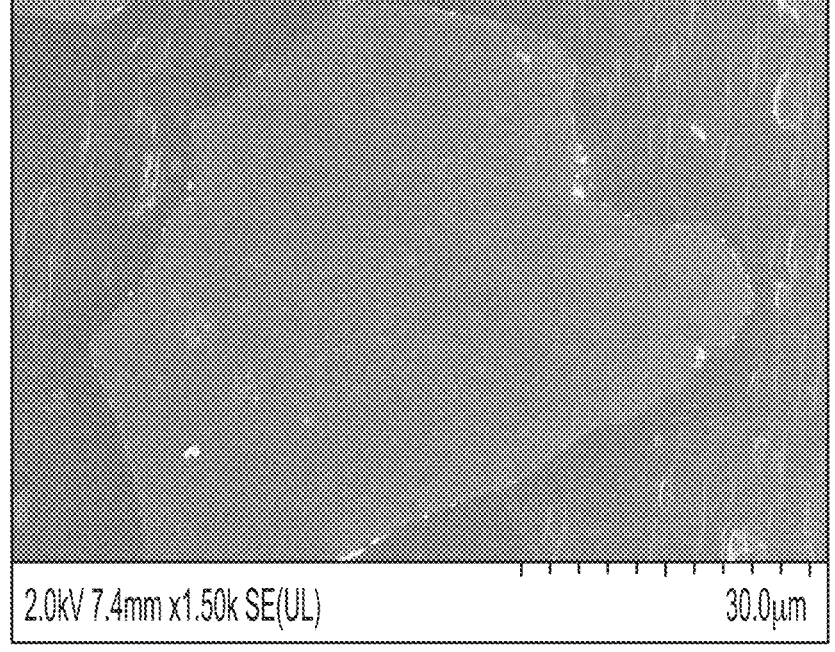

Another comparative example of thermoplastic polyurethane particulates is ADSINT TPU 90A NAT from ADVANC3D, which is a 3-D printing composition. ADSINT TPU 90A NAT thermoplastic polyurethane particulates have an irregular particulate shape, as shown in the SEM images of FIGS. 43A-43E. Based on the SEM images of FIGS. 43B and 43C there is an uneven distribution of emulsion stabilizers on the surface of ADSINT TPU 90A particulates. Particulates that are irregular in shape and have a rough surface tend to have an uneven distribution of emulsion stabilizers on the surface, and agglomeration in rough areas and crevices may occur, as shown in the SEM images of FIGS. 43C and 43D. The cross-sectional SEM image of FIG. 43E shows the presence of emulsion stabilizers in limited areas with a non-uniform distribution around the particulate.

Substantially spherical particulates with a smooth surface, as produced in Examples 9-1 through 9-5, may afford incorporation of emulsion stabilizers in a homogeneous manner around the outer surface of each particulate. Substantially homogeneous incorporation of emulsion stabilizers upon the particulates may aid in achieving uniform properties and consistent performance for the corresponding bulk materials, such as powder flow characteristics and processing properties.

Example 10. Selective laser sintering (SLS) was performed using a Snow White SLS printer system (Sharebot). The thermoplastic polyurethane particulates of Example 9-3 were deposited using the SLS printer system in a 30 mm×30 mm square and then sintered under various laser power conditions specified in Table 9 below. Void percentage following sintering was calculated using the digital microscope software.

TABLE 9

| Entry | Laser Power (%) | Scan Rate[1] | Temp. (° C.) | Comments | Length × Width (mm) | % Voids |
|---|---|---|---|---|---|---|
| 1 | 20 | 40,000 | 108 | No sintering. | | |
| 2 | 25 | 40,000 | 108 | Sintered. Lots of powder on backside. | 30,162 × 30,105 | 0.098 |
| 3 | 30 | 40,000 | 108 | Sintered. Lots of powder on backside. | 29,930 × 30,034 | 0.58 |
| 4 | 35 | 40,000 | 108 | Sintered. Lots of powder on backside. | 30,234 × 30,380 | 0.13 |
| 5 | 40 | 40,000 | 108 | Sintered. Lots of powder on backside. | 30,230 × 30,035 | 0.029 |

[1]Multiplying the reported scan rate by 0.04 gives the scan rate in mm/s.

Figure 44:
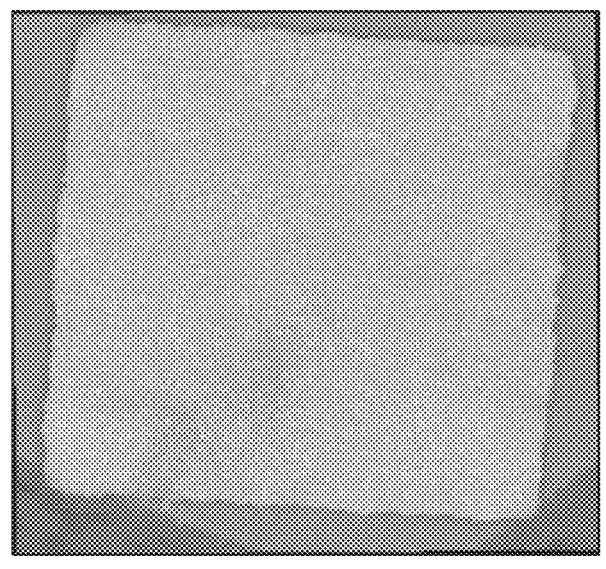
FIG. 44 shows an optical image of the printed product obtained from the thermoplastic polyurethane particulates.

As shown, effective sintering was realized at a laser power above 20%, up to a power of 40% (highest value tested) to afford low-porosity materials having under 1% voids, many times under 0.1% voids. The observed powder formation is believed to artificially lower the amount of voids measured. In any event, the low void percentage is characteristic of effective fusing of the thermoplastic polyurethane particulates with one another. As a representative example, FIG. 44 shows an optical image of the printed product obtained from Entry 5 of Example 10.

Example 11. In this example, powder flow of polyurethane particulates was characterized through sieving and angle of repose measurements. The sieved yield of the polyurethane particulates was determined by exposing a quantity of polyurethane particulates to a 150 μm U.S.A. Standard Sieve and determining the fraction by mass of particulates passing through the sieve relative to the total quantity of polyurethane particulates. The sieve was used manually without particular conditions of duration of force. Angle of repose measurements were performed using a Hosokawa Micron Powder Characteristics Tester PT-R using ASTM D6393-14 "Standard Test Method for Bulk Solids" Characterized by Carr Indices."

In this example, average particle size ($D_{50}$), $D_{10}$ and $D_{90}$ measurements were made using a Malvern MASTERSIZER™ 3000 Aero S particle size analyzer. Optical images were obtained using a Keyence VHX-2000 digital microscope using version 2.3.5.1 software for particle size analysis (system version 1.93). An average particle size was also obtained by processing the optical image.

Comparative Example 11-1. To a 500 mL glass reactor, 160 g polydimethylsiloxane (PSF-30000, Clearco) was added. The reactor was set to a stirring rate of 350 rpm using an overhead stirrer, and the temperature was raised to 190° C. Further heating to 200° C. was performed, at which point, 40 g thermoplastic polyurethane pellets were added to the stirring polydimethylsiloxane. The thermoplastic polyurethane was poly[4,4'-methylenebis(phenyl isocyanate)-alt-1, 4-butanediol/di(propylene glycol)/polycaprolactone] (Sigma-Aldrich). Once the thermoplastic polyurethane pellets were fully combined with the polydimethylsiloxane, the stirring rate was increased to 500 rpm and the temperature was maintained at 200° C. for 60 minutes. Thereafter, stirring was discontinued and the resulting slurry was allowed to cool to room temperature. The slurry was washed four times with heptane, and thermoplastic polyurethane particulates were obtained following vacuum filtration.

Figure 45:
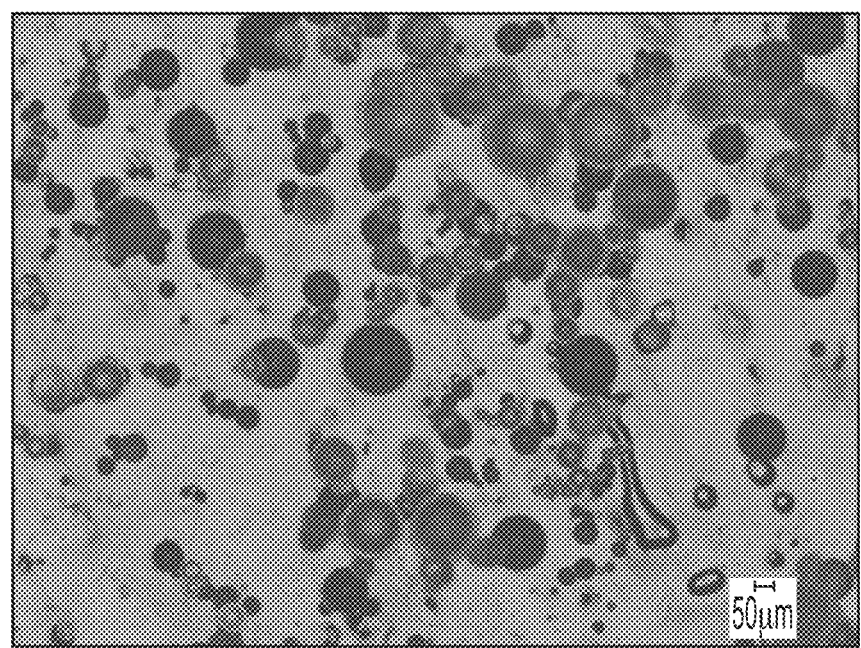
FIG. 45 shows an illustrative optical microscopy image at 150× magnification of thermoplastic polyurethane particulates.
Figure 46:
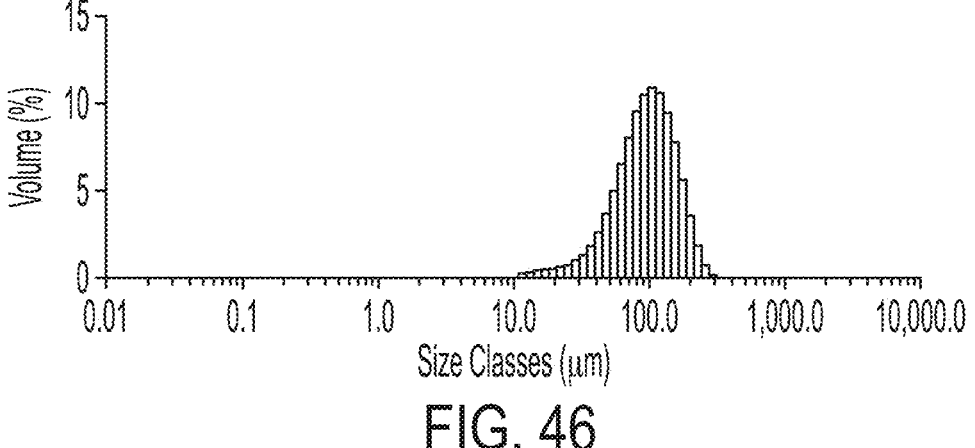
FIG. 46 shows an illustrative histogram of the particle sizes of thermoplastic polyurethane particulates.

The thermoplastic polyurethane particulates were then passed through a 150 μm sieve, and particulates passing through the sieve were characterized by optical imaging. FIG. 45 shows an illustrative optical microscopy image at 150× magnification of thermoplastic polyurethane particulates obtained in Comparative Example 11-1. The average particle size was 97.1 μm and a wide distribution of particle sizes was obtained (span=1.239). FIG. 46 shows an illustrative histogram of the particle sizes of thermoplastic polyurethane particulates obtained in Comparative Example 11-1.

Comparative Example 11-2. To a 500 mL glass reactor, 320 g polydimethylsiloxane (PSF-30000, Clearco) was added along with 0.25 wt. % fumed silica particulates functionalized with hexamethyldisilazane (AEROSIL® RX50 from Evonik, 35±10 m²/g BET surface area and 40 nm average particle size). The reactor was set to a stirring rate of 200 rpm using an overhead stirrer, and the temperature was raised to 190° C. Further heating to 200° C. was performed, at which point, 80 g thermoplastic polyurethane pellets were added to the stirring polydimethylsiloxane. The thermoplastic polyurethane in this instance was ELASTOL-LAN® 1190A, a polyether polyurethane elastomer obtained from BASF. Once the thermoplastic polyurethane pellets were fully combined with the polydimethylsiloxane, the stirring rate was increased to 500 rpm and the temperature was maintained at 200° C. for 60 minutes. Thereafter, stirring was discontinued and the resulting slurry was allowed to cool to room temperature. The slurry was washed four times with hexanes, and thermoplastic polyurethane particulates were obtained following vacuum filtration.

Figure 47:
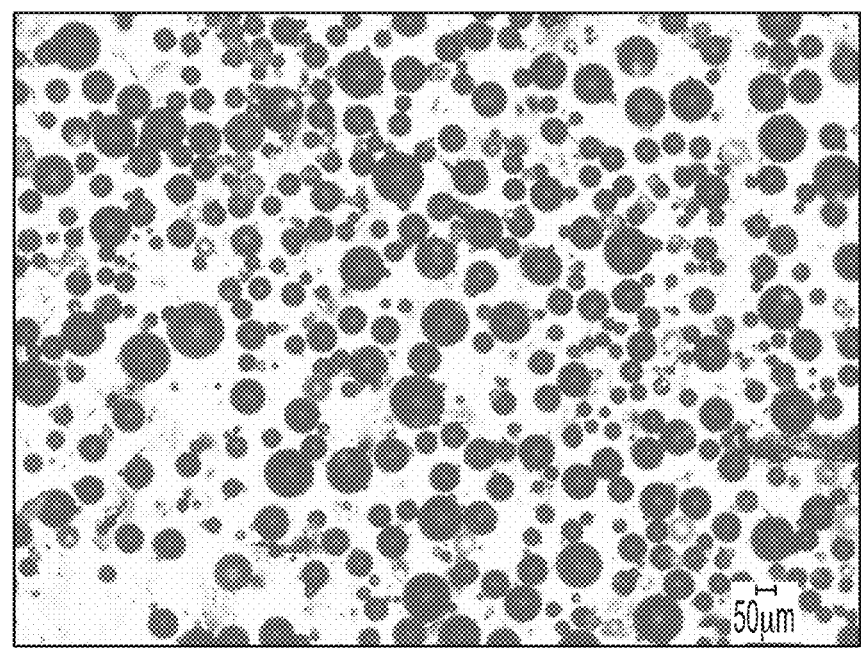
FIG. 47 shows an illustrative optical microscopy image at 150× magnification of thermoplastic polyurethane particulates.
Figure 48A:
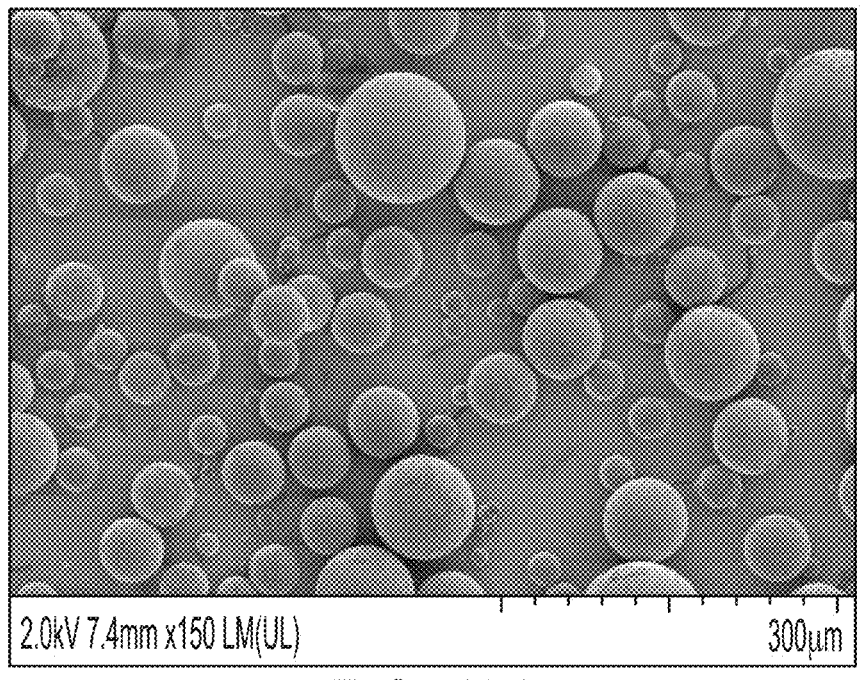
FIGS. 48A and 48B show illustrative SEM images of thermoplastic polyurethane particulates obtained in at various magnifications.
Figure 48B:
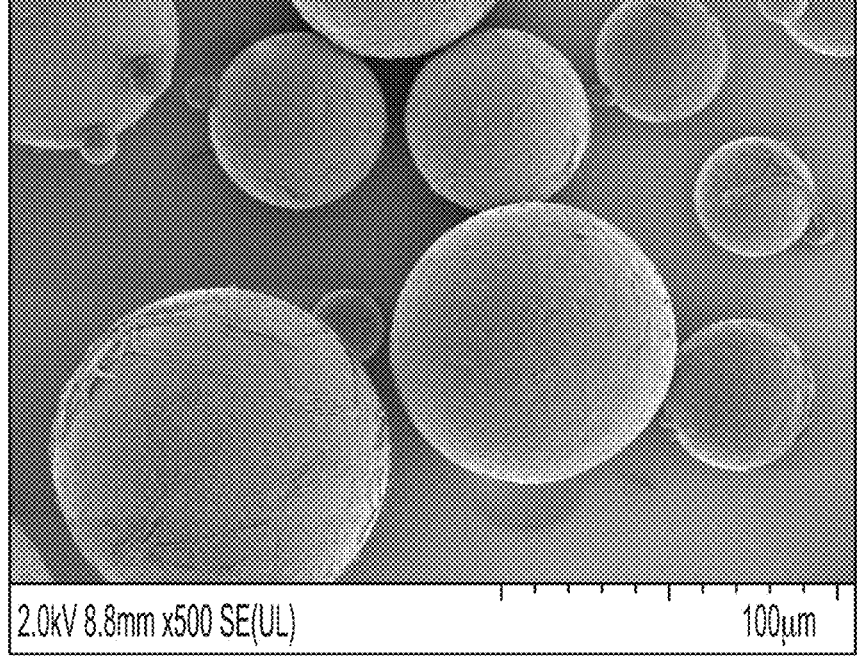
Figure 49:
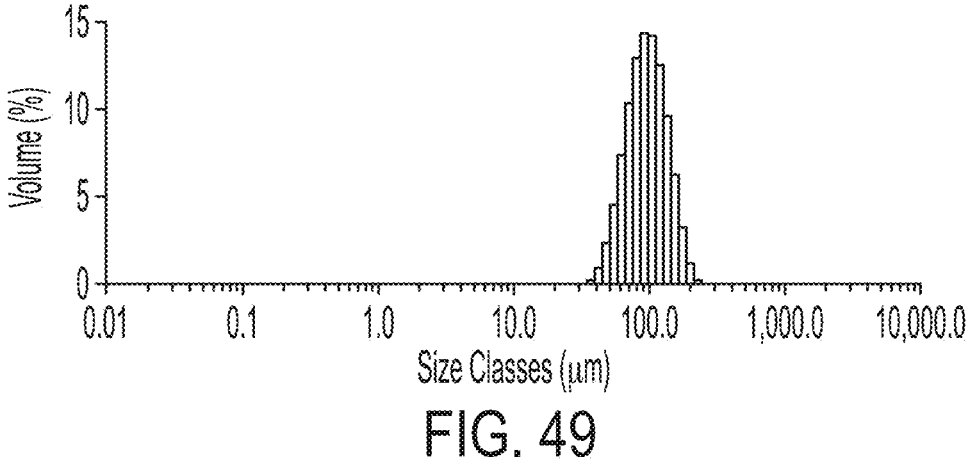
FIG. 49 shows an illustrative histogram of the particle sizes of thermoplastic polyurethane particulates.

The thermoplastic polyurethane particulates were then passed through a 150 μm sieve, and particulates passing through the sieve were characterized by optical imaging. FIG. 47 shows an illustrative optical microscopy image at 150× magnification of thermoplastic polyurethane particulates obtained in Comparative Example 11-2. The average particle size was 95.6 m and a wide distribution of particle sizes was obtained (span=0.892). The angle of repose was 29.9°. FIGS. 48A and 48B show illustrative SEM images of thermoplastic polyurethane particulates obtained in Comparative Example 11-2 at various magnifications. FIG. 49 shows an illustrative histogram of the particle sizes of thermoplastic polyurethane particulates obtained in Comparative Example 11-2.

Figure 50:
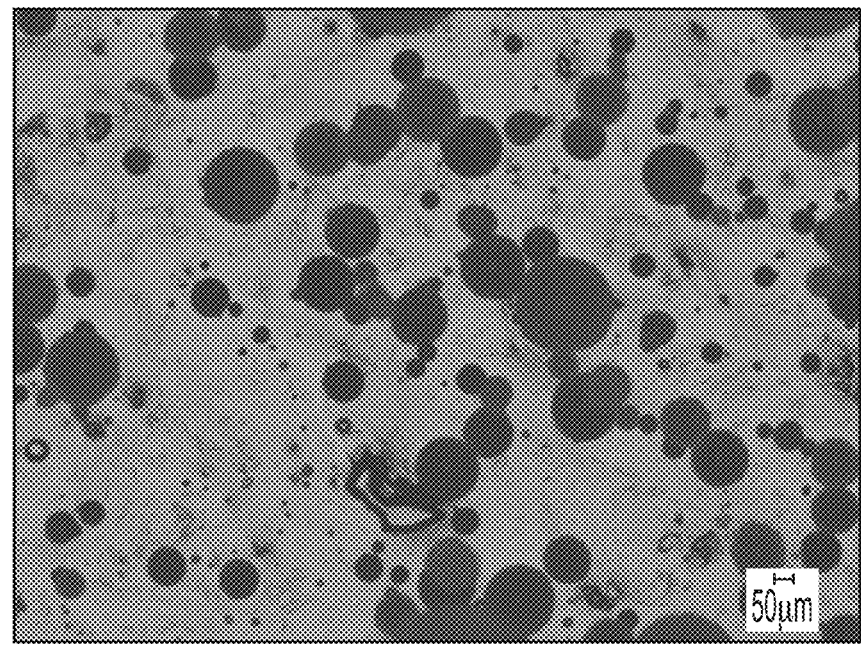
Figure 51:
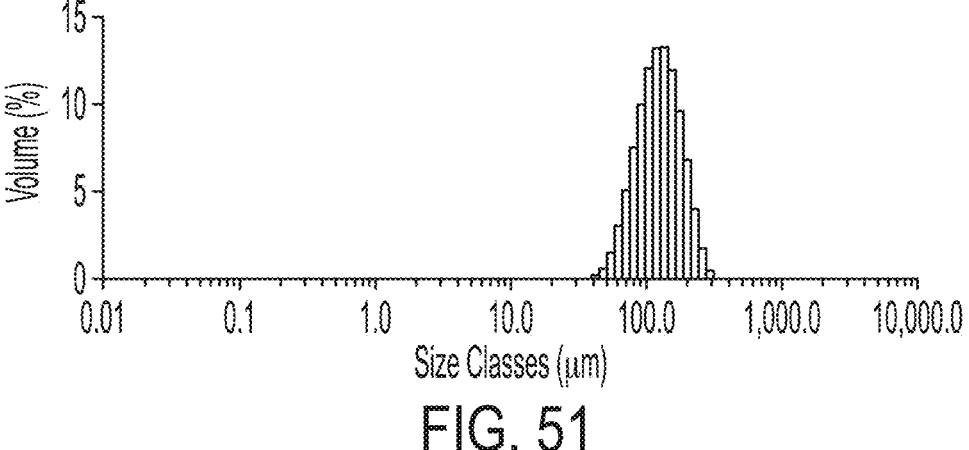
FIG. 51 shows an illustrative histogram of the particle sizes of thermoplastic polyurethane particulates.

Comparative Example 11-3. Comparative Example 11-1 was repeated, except 1.0 wt. % of poly[dimethylsiloxane-co-[3-(2-(2-hydroxyethoxy)ethoxy)propylmethylsiloxane]

surfactant was mixed with the PDMS before heating to the processing temperature. FIG. 50 shows an illustrative optical microscopy image at 100× magnification of thermoplastic polyurethane particulates obtained in Comparative Example 11-3. The average particle size was 123 m and a wide distribution of particle sizes was obtained (span=0.977). FIG. 51 shows an illustrative histogram of the particle sizes of thermoplastic polyurethane particulates obtained in Comparative Example 11-3.

Figure 52:
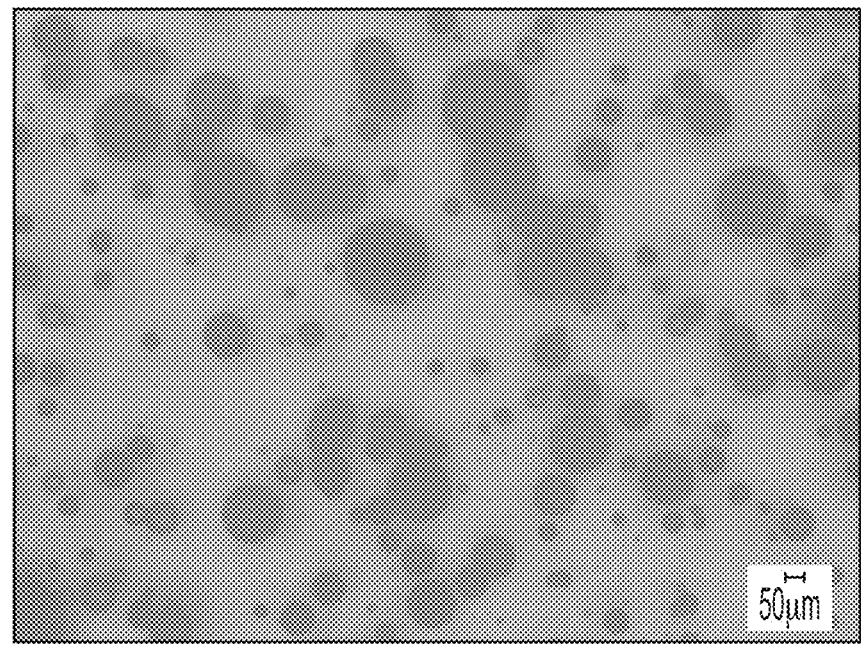
FIG. 52 shows an illustrative optical microscopy image at 100× magnification of thermoplastic polyurethane particulates.
Figure 53:
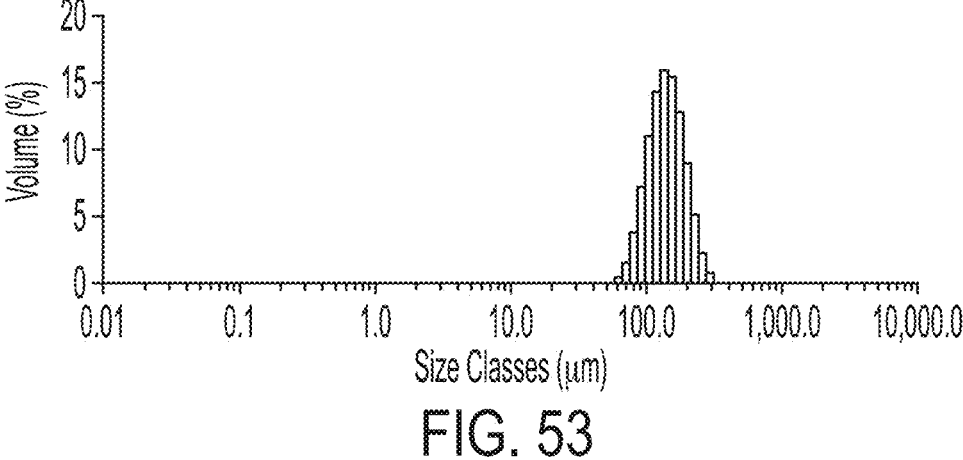
FIG. 53 shows an illustrative histogram of the particle sizes of thermoplastic polyurethane particulates.

Comparative Example 11-4. Comparative Example 11-1 was repeated, except 2.5 wt. % SPAN 80 (sorbitan maleate non-ionic surfactant) was mixed with the PDMS before heating to the processing temperature. FIG. 52 shows an illustrative optical microscopy image at 100× magnification of thermoplastic polyurethane particulates obtained in Comparative Example 11-4. The average particle size was 139 m and a wide distribution of particle sizes was obtained (span=0.811). FIG. 53 shows an illustrative histogram of the particle sizes of thermoplastic polyurethane particulates obtained in Comparative Example 11-4.

Figure 54:
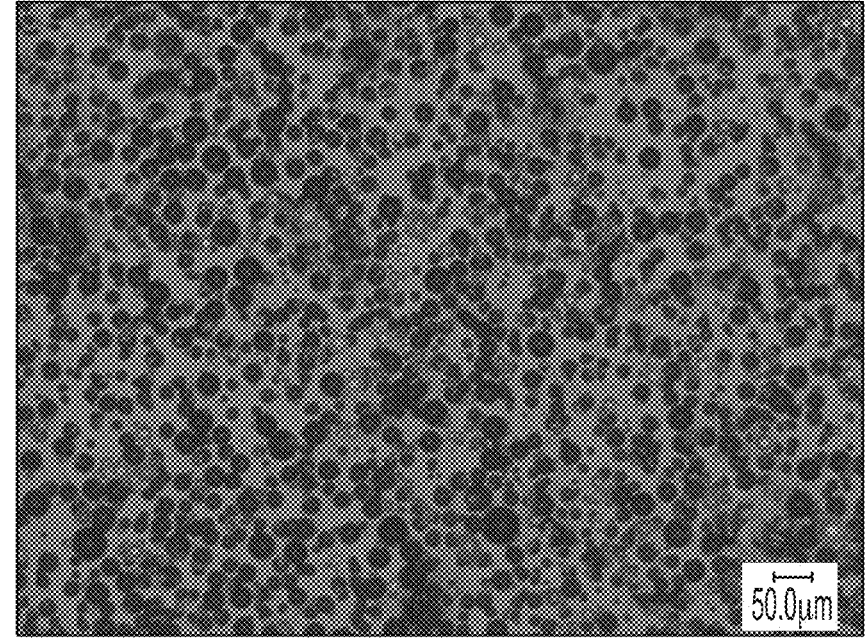
FIG. 54 shows an illustrative optical microscopy image at 300× magnification of thermoplastic polyurethane particulates.
Figure 55:
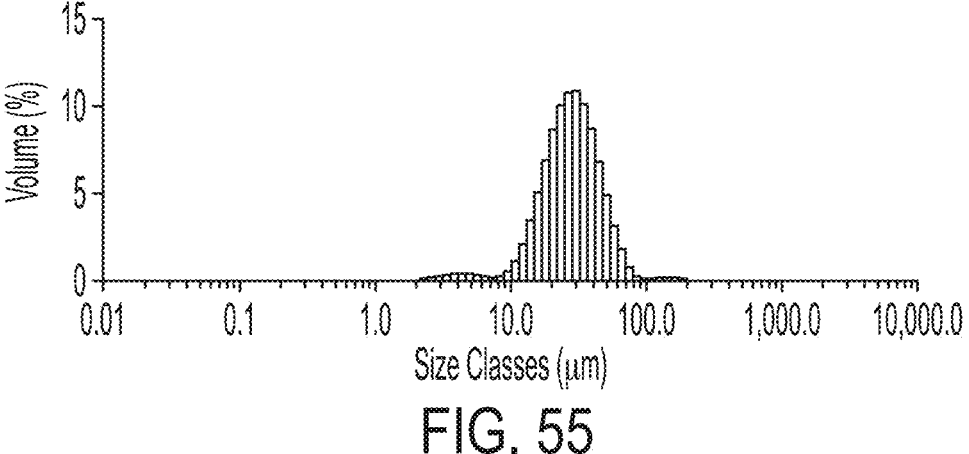
FIG. 55 shows an illustrative histogram of the particle sizes of thermoplastic polyurethane particulates.

Example 11-1. Comparative Example 11-1 was repeated, except 0.25 wt. % fumed silica particulates functionalized with hexamethyldisilazane (AEROSIL® RX50) and 1.0 wt % sodium dodecylsulfate (SDS) were mixed with the PDMS before heating to the processing temperature. FIG. 54 shows an illustrative optical microscopy image at 300× magnification of thermoplastic polyurethane particulates obtained in Example 11-1. The average particle size was 26.8 μm and a wide distribution of particle sizes was obtained (span=1.251). FIG. 55 shows an illustrative histogram of the particle sizes of thermoplastic polyurethane particulates obtained in Example 11-1.

Example 11-2. Comparative Example 11-1 was repeated, except 0.25 wt. % of fumed silica particulates functionalized with hexamethyldisilazane (AEROSIL® RX50) and 2.5 wt. % docusate sodium (sodium 1,4-bis(2-ethylhexoxy)-1,4-dioxobutane-2-sulfonate, also referred to as dioctyl sodium sulfosuccinate) were combined with the polydimethylsiloxane prior to heating the reactor to temperature and adding the thermoplastic polyurethane polymer.

Figure 56:
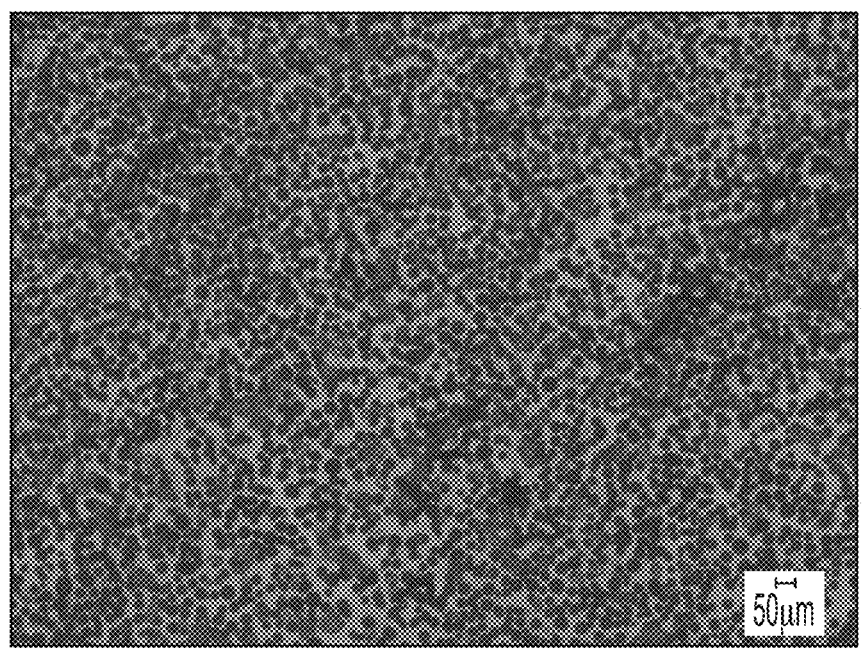
FIG. 56 shows an illustrative optical microscopy image at 150× magnification of thermoplastic polyurethane particulates.
Figure 57:
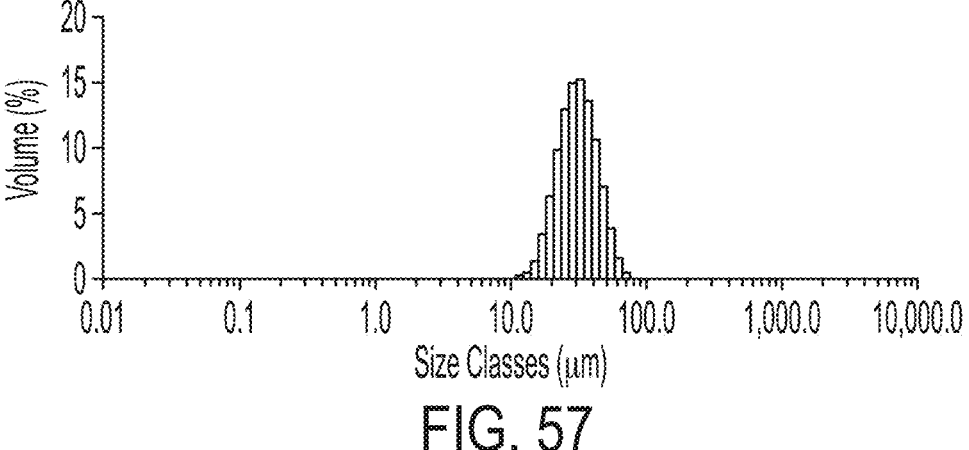
FIG. 57 shows an illustrative histogram of the particle sizes of thermoplastic polyurethane particulates.

After isolation, the thermoplastic polyurethane particulates were passed through a 150 μm sieve, and particulates passing through the sieve were characterized by optical imaging. FIG. 56 shows an illustrative optical microscopy image at 150× magnification of thermoplastic polyurethane particulates obtained in Example 11-2. The average particle size was 31.5 m and a relatively narrow distribution of particle sizes was obtained (span=0.859). The angle of repose was 38.2°. FIG. 57 shows an illustrative histogram of the particle sizes of thermoplastic polyurethane particulates obtained in Example 11-2.

Example 11-3. Comparative Example 11-1 was repeated, except 1.0 wt. % of fumed silica particulates functionalized with hexamethyldisilazane (AEROSIL® RX50) and 1.0 wt. % docusate sodium were combined with the polydimethylsiloxane prior to heating the reactor to temperature and adding the thermoplastic polyurethane polymer.

Figure 58:
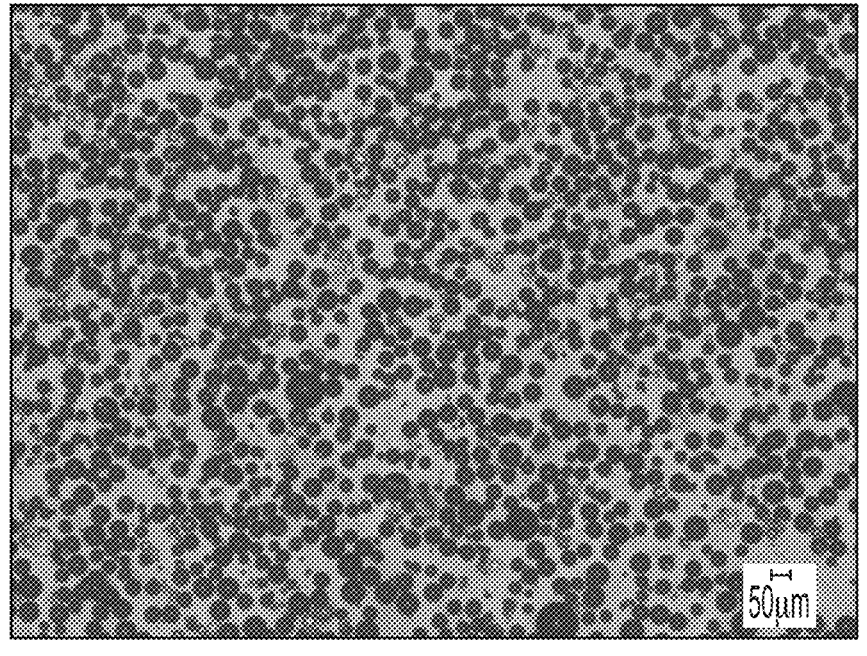
FIG. 58 shows an illustrative optical microscopy image at 150× magnification of thermoplastic polyurethane particulates.
Figure 59:
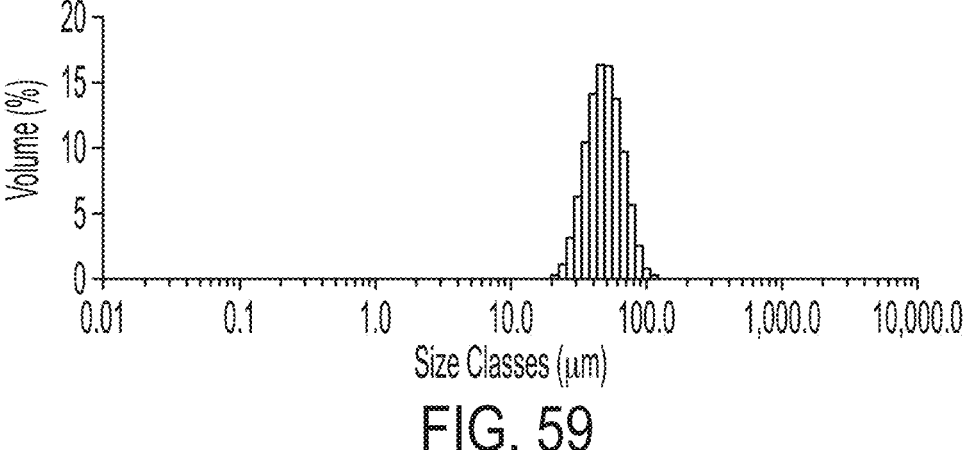
FIG. 59 shows an illustrative histogram of the particle sizes of thermoplastic polyurethane particulates.

After isolation, the thermoplastic polyurethane particulates were passed through a 150 μm sieve, and particulates passing through the sieve were characterized by optical imaging. FIG. 58 shows an illustrative optical microscopy image at 150× magnification of thermoplastic polyurethane particulates obtained in Example 11-3. The average particle size was 51.2 m and a relatively narrow distribution of particle sizes was obtained (span=0.777). The angle of repose was 32.6°. FIG. 59 shows an illustrative histogram of the particle sizes of thermoplastic polyurethane particulates obtained in Example 11-3.

Example 11-4. Comparative Example 11-1 was repeated, except 0.25 wt. % of fumed silica particulates functionalized with hexamethyldisilazane (AEROSIL® RX50) and 5 wt. % CALFAX® DB-45 were combined with the polydimethylsiloxane prior to heating the reactor to temperature and adding the thermoplastic polyurethane polymer.

Figure 60:
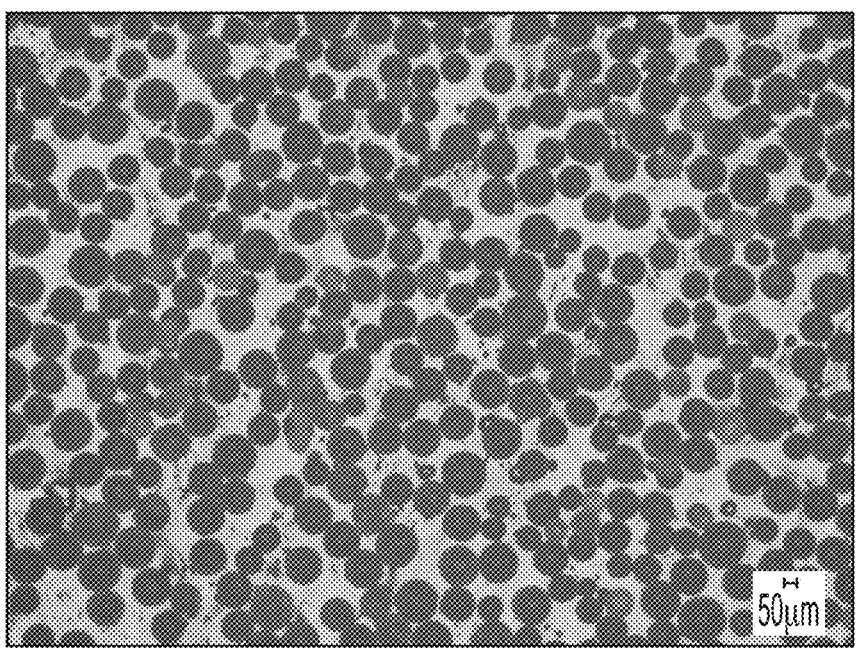
FIG. 60 shows an illustrative optical microscopy image at 150× magnification of thermoplastic polyurethane particulates.
Figure 61A:
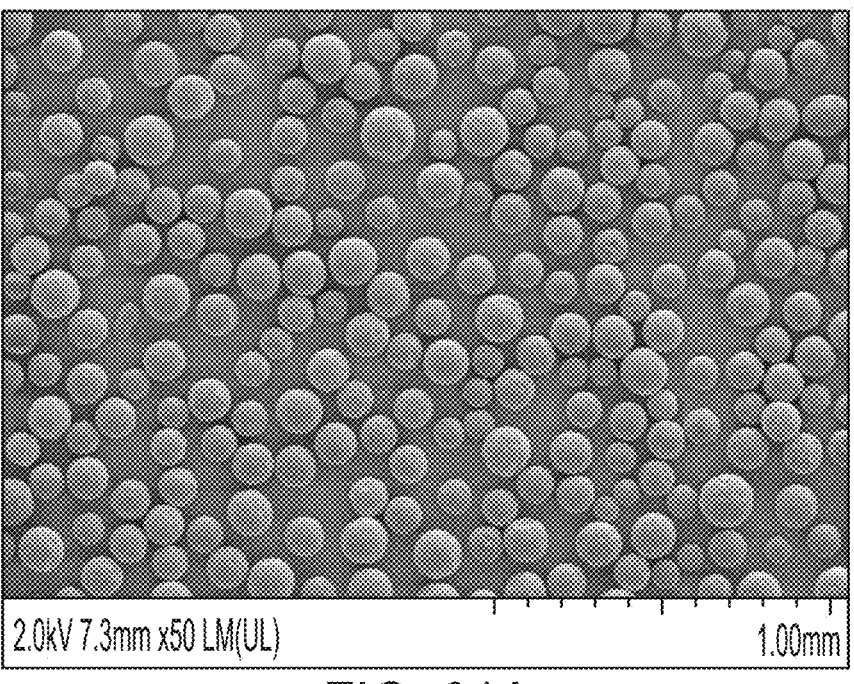
FIGS. 61A and 61B show illustrative SEM images of thermoplastic polyurethane particulates at various magnifications.
Figure 61B:
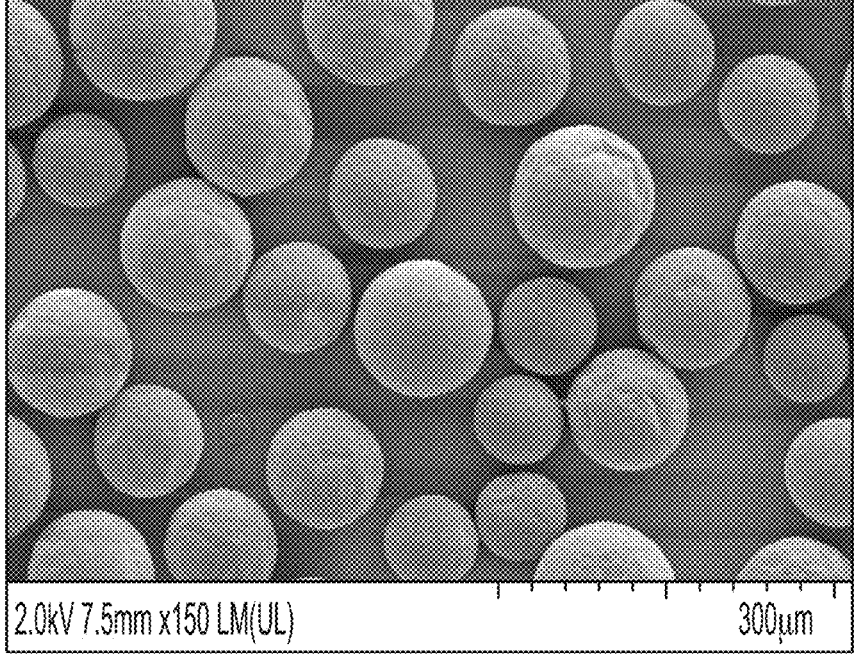
Figure 62:
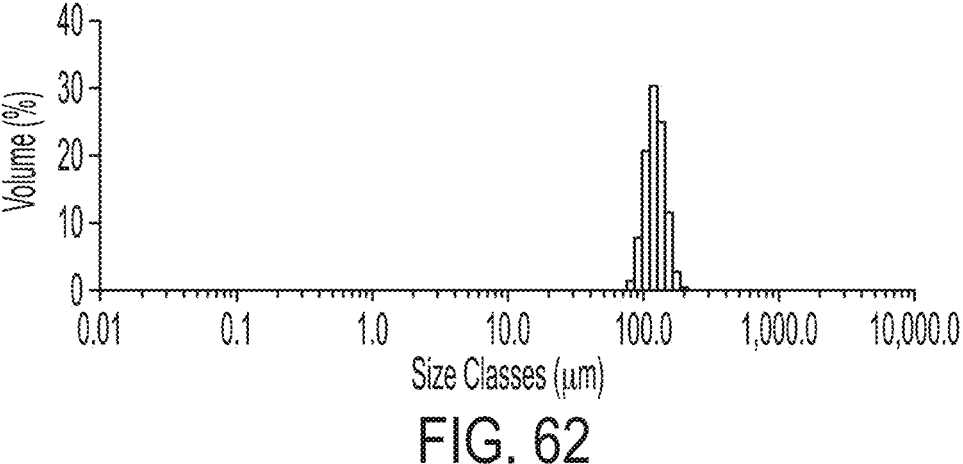
FIG. 62 shows an illustrative histogram of the particle sizes of thermoplastic polyurethane particulates.

After isolation, the thermoplastic polyurethane particulates were passed through a 150 μm sieve, and particulates passing through the sieve were characterized by optical imaging. FIG. 60 shows an illustrative optical microscopy image at 150× magnification of thermoplastic polyurethane particulates obtained in Example 11-4. The average particle size was 121 m and a relatively narrow distribution of particle sizes was obtained (span=0.435). FIGS. 61A and 61B show illustrative SEM images of thermoplastic polyurethane particulates obtained in Example 11-4 at various magnifications. FIG. 62 shows an illustrative histogram of the particle sizes of thermoplastic polyurethane particulates obtained in Example 11-4.

Example 11-5. Comparative Example 11-1 was repeated, except 1.0 wt. % of fumed silica particulates functionalized with hexamethyldisilazane (AEROSIL® RX50) and 2.5 wt. % CALFAX® DB-45 were combined with the polydimethylsiloxane prior to heating the reactor to temperature and adding the thermoplastic polyurethane polymer.

Figure 63:
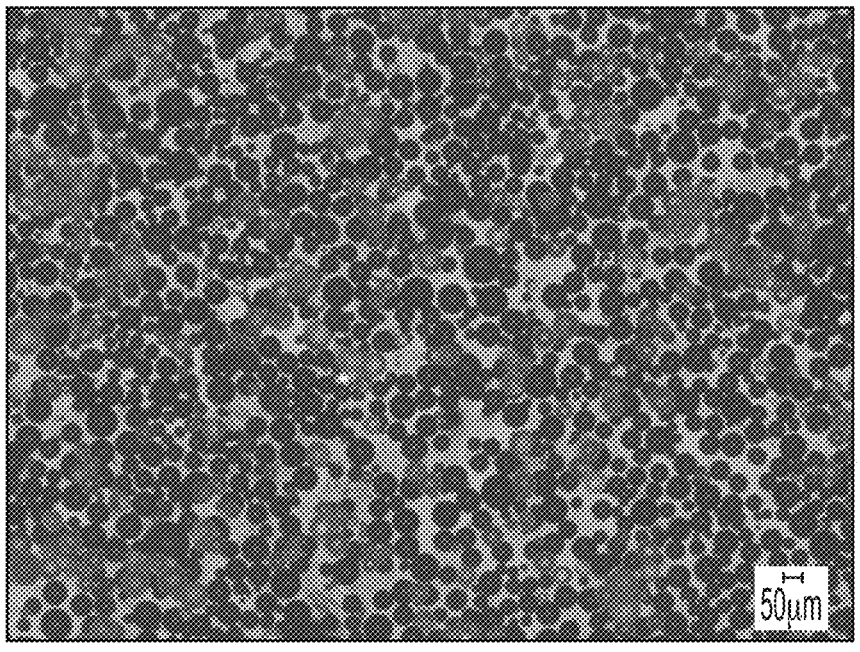
FIG. 63 shows an illustrative optical microscopy image at 150× magnification of thermoplastic polyurethane particulates.
Figure 64:
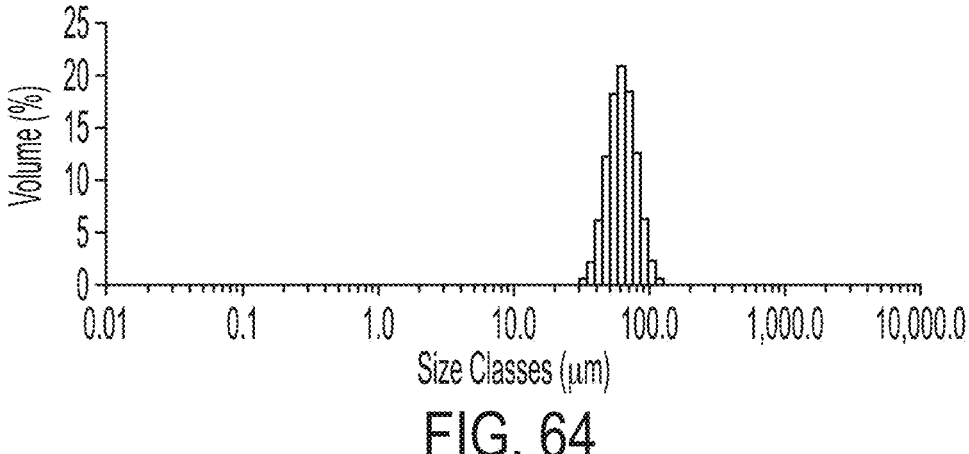
FIG. 64 shows an illustrative histogram of the particle sizes of thermoplastic polyurethane particulates.

After isolation, the thermoplastic polyurethane particulates were passed through a 150 μm sieve, and particulates passing through the sieve were characterized by optical imaging. FIG. 63 shows an illustrative optical microscopy image at 150× magnification of thermoplastic polyurethane particulates obtained in Example 11-5. The average particle size was 62.9 μm and a relatively narrow distribution of particle sizes was obtained (span=0.619). The angle of repose was 31.3°. FIG. 64 shows an illustrative histogram of the particle sizes of thermoplastic polyurethane particulates obtained in Example 11-5.

Comparison of Results. Table 10 below summarizes the formation conditions used for Comparative Examples 11-1 through 11-4 and the properties of the thermoplastic polyurethane particulates obtained in each instance. Table 11 below summarizes the formation conditions used for Examples 11-1 through 11-5 and the properties of the thermoplastic polyurethane particulates obtained in each instance.

TABLE 10

| | Comp. Example 11-1 | Comp. Example 11-2 | Comp. Example 11-3 | Comp. Example 11-4 |
| --- | --- | --- | --- | --- |
| Solids Loading | 20% | 20% | 20% | 20% |
| Thermoplastic Polyurethane (TPU) | 40 g | 80 g | 40 g | 40 g |

TABLE 10-continued

| | Comp. Example 11-1 | Comp. Example 11-2 | Comp. Example 11-3 | Comp. Example 11-4 |
|---|---|---|---|---|
| Poly(dimethylsiloxane) (PDMS) | 160 g | 320 g | 160 g | 160 g |
| PDMS Viscosity | 30,000 cSt | 30,000 cSt | 30,000 cSt | 30,000 cSt |
| Fumed Silica (wt. %) | None | 40 nm (0.25%) | None | None |
| Surfactant (wt. %) | None | None | poly[dimethylsiloxane-co-[3-(2-(2-hydroxyethoxy)ethoxy)propylmethylsiloxane] (1.0%) | Span 80 (2.5%) |
| Blending Process | Melt Emuls. | Melt Emuls. | Melt Emuls. | Melt Emuls. |
| Reactor | 500 mL Kettle | 500 mL Kettle | 500 mL Kettle | 500 mL Kettle |
| Temperature | 200° C. | 200° C. | 200° C. | 200° C. |
| RPM | 500 | 500 | 500 | 500 |
| Reaction Time | 60 min | 60 min | 60 min | 60 min |
| Washing | Heptane x 4 | Hexane x 4 | Heptane x 4 | Heptane x 4 |
| Pre-Sieving Mass Recovery | 95% | 97% | 97% | 95% |
| Sieved Yield (150 μm) | 50% | 73% | 43% | 15% |
| Average Particle Size | 97.1 μm | 95.6 μm | 123 μm | 139 μm |
| Particle Size Span | 1.239 | 0.892 | 0.977 | 0.811 |
| Digital Microscope Images | FIG. 45 (150X) | FIG. 47 (100X) | FIG. 50 (100X) | FIG. 52 (100X) |
| SEM Images | | FIGS. 48A/48B | | |
| Histogram | FIG. 46 | FIG. 49 | FIG. 51 | FIG. 53 |
| Angle of repose | | | | |

TABLE 11

| | Example 11-1 | Example 11-2 | Example 11-3 | Example 11-4 | Example 11-5 |
|---|---|---|---|---|---|
| Solids Loading | 20% | 20% | 20% | 20% | 20% |
| Thermoplastic Polyurethane (TPU) | 40 g | 40 g | 40 g | 40 g | 40 g |
| Poly(dimethylsiloxane) (PDMS) | 160 g | 160 g | 160 g | 160 g | 160 g |
| PDMS Viscosity | 30,000 cSt | 30,000 cSt | 30,000 cSt | 30,000 cSt | 30,000 cSt |
| Fumed Silica (wt. %) | 40 nm (0.25%) | 40 nm (0.25%) | 40 nm (1.0%) | 40 nm (0.25%) | 40 nm (1.0%) |
| Surfactant (wt. %) | Sodium Dodecyl-sulfate (1.0%) | Ducosate sodium (2.5%) | Ducosate sodium (1%) | CALFAX ® DB-45 (5.0%) | CALFAX ® DB-45 (2.5%) |
| Blending Process | Melt Emuls. | Melt Emuls. | Melt Emuls. | Melt Emuls. | Melt Emuls. |
| Reactor | 500 mL Kettle | 500 mL Kettle | 500 mL Kettle | 500 mL Kettle | 500 mL Kettle |
| Temperature | 200° C. | 200° C. | 200° C. | 200° C. | 200° C. |
| RPM | 500 | 500 | 500 | 500 | 500 |
| Reaction Time | 60 min | 60 min | 60 min | 60 min | 60 min |
| Washing | Heptane x 4 | Heptane x 4 | Heptane x 4 | Heptane x 4 | Heptane x 4 |
| Pre-Sieving Mass Recovery | 92% | 87% | 92% | 93% | 91% |
| Sieved Yield (150 μm) | 97% | 95% | 95-99% | 94% | 91% |
| Average Particle Size | 26.8 μm | 31.5 μm | 51.2 μm | 121 μm | 62.9 μm |
| Particle Size Span | 1.251 | 0.859 | 0.777 | 0.435 | 0.619 |
| Digital Microscope Images | FIG. 54 (300X) | FIG. 56 (150X) | FIG. 58 (150X) | FIG. 60 (150X) | FIG. 63 (150X) |
| SEM | | | | FIGS. 61A/61B | |
| Histogram | FIG. 55 | FIG. 57 | FIG. 59 | FIG. 62 | FIG. 64 |
| Angle of repose | 49.3° | 38.2° | 32.6° | | 31.3° |

The combination of silica nanoparticles and a sulfonate surfactant was effective to form elastomeric particulates having a narrow size distribution (span<0.9), and the post-sieving yield of the original unsieved product was greater than 90% (Examples 11-2 through 11-5). A sulfate surfactant (Example 11-1) afforded a much wider particle size distribution, in contrast, in spite having a particle size similar to that produced with sulfonate surfactants. Elastomeric particulates formed in the absence of silica nanoparticles were considerably larger in size, and the yield following sieving was low (Comparative Examples 11-1, 11-3, and 11-4).

Figure 65:
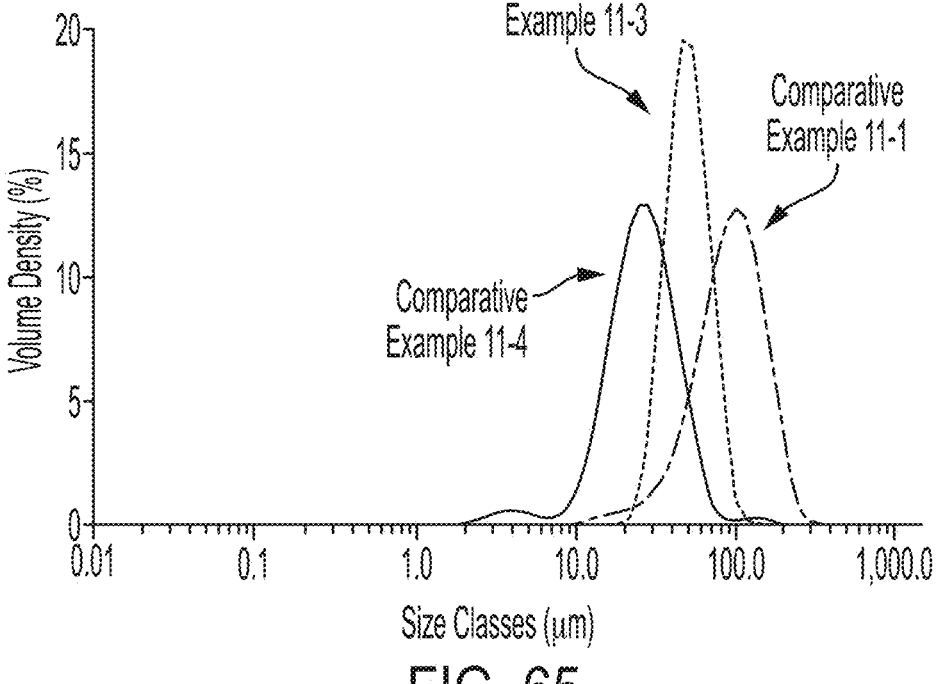
FIG. 65 shows an illustrative particle size distribution plot for thermoplastic polyurethane particulates.

FIG. 65 shows an illustrative particle size distribution plot for Comparative Examples 11-1 and 11-4 and Example 11-3. As shown, use of silica particles and a sulfonate surfactant (Example 11-3) afforded a much smaller particle size distribution.

Example 12. Selective laser sintering (SLS) was performed using a Snow White SLS printer system (Sharebot). The thermoplastic polyurethane particulates of Example 11-3 were deposited using the SLS printer system in a 30 mm×30 mm square and then sintered under various laser power conditions specified in Table 12 below. Void percentage following sintering was calculated using the digital microscope software. Little to no caking was seen following sintering, which may be indicative of good single layer sintering performance.

TABLE 12

| Entry | Laser Power (%) | Scan Rate[1] | Temp. (° C.) | Comments | Length × Width (mm) | % Voids |
|---|---|---|---|---|---|---|
| 1 | 20 | 40,000 | 108 | No sintering. | | |
| 2 | 25 | 40,000 | 108 | Sintered. Very flexible. | 30,055 × 29,880 | 3.12 |
| 3 | 30 | 40,000 | 108 | Sintered. Very flexible. | 30,037 × 29,722 | 1.49 |
| 4 | 35 | 40,000 | 108 | Sintered. | 30,163 × 30,301 | 1.4 |
| 5 | 40 | 40,000 | 108 | Sintered. | 30,480 × 30,288 | 1.21 |
| 6 | 45 | 40,000 | 108 | Sintered. Powder on backside. | 30,274 × 30,520 | 0.37 |

[1]Multiplying the reported scan rate by 0.04 give the scan rate in mm/s.

As shown, effective sintering was realized at a laser power above 20 up to a power of 45% (highest value tested) to afford low-porosity materials with a small quantity of voids, under 1.50% voids at laser powers above 30%. The low void percentage is characteristic of effective fusing of the thermoplastic polyurethane particulates with one another. Powder formation in Entry 6 is believed to artificially lower the amount of voids measured.

Table 13 compares the laser sintering performance of the thermoplastic polyurethane particulates of Example 11-3 against those of Comparative Example 11-2 and commercial ADSINT polyurethane particulates.

TABLE 13

| | | | % Voids | | |
|---|---|---|---|---|---|
| Entry | Laser Power (%) | Scan Rate | Example 11-3 | Comp. Example 11-2 | ADSINT TPU |
| 1 | 20 | 40,000 | No sintering | No sintering | No sintering |
| 2 | 25 | 40,000 | 3.12 | No sintering | 5.07 |
| 3 | 30 | 40,000 | 1.49 | No sintering | 4.28 |
| 4 | 35 | 40,000 | 1.4 | 4.48 | 2.65 |
| 5 | 40 | 40,000 | 1.21 | 0.38 | 1.68 |
| 6 | 45 | 40,000 | 0.37 | 0.84 | No sintering |

Figure 66:
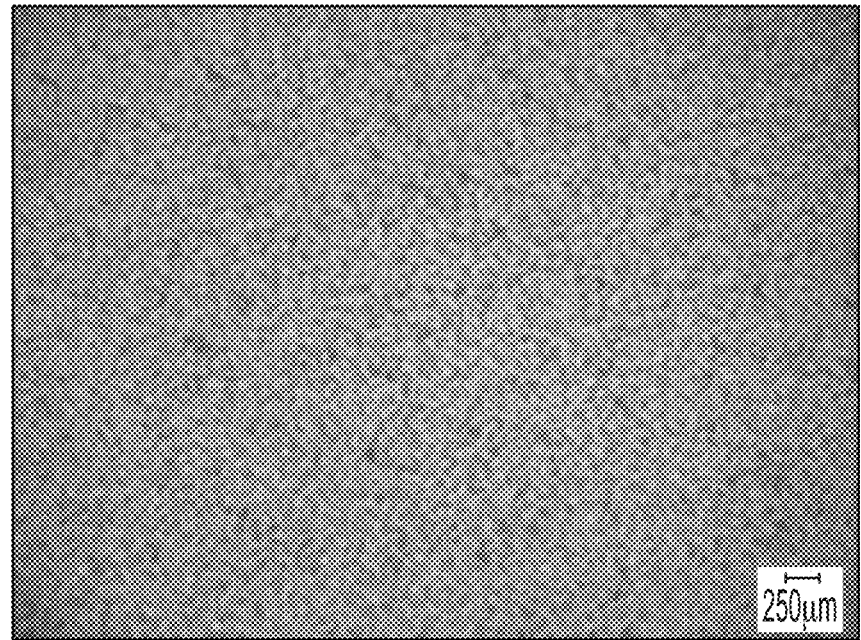
FIG. 66 shows an optical image of the printed product.

As shown, effective sintering was realized at a laser power above 20%, up to a power of 45% (highest value tested), to afford low-porosity materials when using the thermoplastic polyurethane particles of Example 11-3. The laser sintering performance of the thermoplastic polyurethane particulates of Example 11-3 was considerably better than that of the commercial ADSINT thermoplastic polyurethane particulates, as evaluated by the porosity obtained. The laser sintering performance of the thermoplastic polyurethane particulates of Example 11-3 was also superior to that of Comparative Example 11-2 in terms of being sinterable at lower laser powers and affording lower porosity values in most cases. As a representative example, FIG. 66 shows an optical image of the printed product obtained from Entry 5 of Table 12 (40% laser power).

Example 13. To a 500 mL glass kettle reactor equipped with a heating mantle was added 140 g of PDMS (PSF-10000), 0.6 g (1.0 wt. %) of AEROSIL RX50 silica nanoparticles, and 60 g of HYTREL® HTR 6108 pellets (glycol-modified polyethylene terephthalate, available from DuPont). The reactor was set to a stirring rate of 200 RPM, and the temperature was raised to 200° C. over 30 minutes under flowing argon purge. Once the temperature reached 200° C., the stirring rate was increased to 1000 RPM. After 60 minutes, heating and stirring were discontinued, and the slurry was allowed to cool to room temperature. The slurry was then washed three times with heptane, and the particulates were isolated by vacuum filtration. After drying under vacuum overnight, the particulates were then sieved through a 150 µm filter. For the produced particulates, the average particle size (determined via optical microscopy) was 57 µm, the span was 0.87, and the angle of repose was 29.8°.

Example 14. To a 2 L Buchi reactor was added 871 g of PDMS (PSF-10000), 50 g of a PDMS/AEROSIL® RX50 slurry containing 2.9 g (0.5 wt. %) AEROSIL® RX50 and 580 g of ELASTOLLAN 1190A10 polyurethane. The reactor was purged with nitrogen, and stirring was conducted at 200 RPM. The jacket temperature was increased to 240° C. over 60 minutes. Once the reactor temperature had reached 200° C., the stirring rate was increased to 500 RPM and the nitrogen flow was turned off. The slurry was stirred for 30 minutes at 240° C. and then discharged while hot. After cooling, the slurry was then washed twice with hexane, and the particulates were isolated by vacuum filtration. After drying under vacuum overnight, the particulates were then sieved through a 150 µm filter. For the produced particulates, the average particle size (determined via optical microscopy) was 56 µm, the span was 0.59, and the angle of repose was 32.4°.

Example 15. Polypropylene microparticles were produced in a Haake small-scale double screw extruder with high shear rotors. The carrier fluid was PDMS oil of either 30,000 cSt or 60,000 cSt viscosity at room temperature. The concentrations of components in the final mixture in the extruder are provided in Table 15. The order of addition of components to the extruder were either (a) the carrier fluid was added to the extruder, brought to temperature, and then room temperature polymer pellets added to the heated carrier fluid in the extruder or (b) where the polymer pellets were added to the extruder, brought to temperature, and then room temperature carrier fluid added to the molten polymer in the extruder. The polypropylene pellets were added at 30% solids loading (that is, 18 g polypropylene in 60 g PDMS). The polypropylene used was PP D115A polypropylene homopolymer, available from Baskem USA. At temperature of either 225° C. or 250° C. (see Table 14), the extruder was operated at approximately 200 rpm for 30 minutes. Then, the mixture was discharged from the extruder onto a cold surface to provide rapid quench cooling. During heating, at temperature, and cooling, the torque of the extruder system was measured. The resultant mixture was then washed three times with 300 mL of heptane and filtered through a 90 mm WHATMAN® #1 paper filter (available from SigmaAldrich) to separate the polypropylene particles from the carrier fluid. The particles were then allowed to air dry overnight in an aluminum pan in a fume hood. The dried polypropylene particles were characterized for morphology with SEM micrographs and for size with a Malvern MAS-TERSIZER™ 3000 Aero S particle size analyzer. Thermal properties were evaluated using Differential Scanning Calorimetry (DSC) to determine the melting temperature and crystallization temperature. Inductively Coupled Plasma (ICP) determined the residual silicone oil present on the particles.

In this example, powder flow of particulates was characterized through sieving and angle of repose measurements. The sieved yield of the particulates was determined by exposing a quantity of particulates to a 250 mm U.S.A. Standard Sieve (ASTM E11) and determining the fraction by mass of particulates passing through the sieve relative to the total quantity of particulates. The sieve was used manually without particular conditions of duration of force. Angle of repose measurements were performed using a Hosokawa Micron Powder Characteristics Tester PT-R using ASTM D6393-14 "Standard Test Method for Bulk Solids" Characterized by Carr Indices." The results are described in Table 14.

The SEM micrographs depict smooth round particles with a fairly wide particle size distribution. The particles were selectively laser sintered in a single layer on the Sharebot SnowWhite SLS printer. Particles made using 30,000 cSt oil required higher laser power to produce a robust sintered single layer relative to the 60,000 cSt oil particles. Particles made using 60,000 cSt oil showed extreme edge curl as laser power increased.

TABLE 15

| Sample | Screw RPM | Extruder Temp (° C.) | wt % PA* | wt % silica** | Silica | D10 (μm) | D50 (μm) | D90 (μm) |
|---|---|---|---|---|---|---|---|---|
| 16-1 | 1000 | 280 | 45% | 0.20% | R812S | 38.6 | 60.2 | 93.2 |
| 16-2 | 1000 | 280 | 45% | 0.20% | R812S | 31.5 | 47.9 | 72.1 |
| 16-3 | 1000 | 280 | 45% | 0.10% | R812S | 24.7 | 39.3 | 62.8 |
| 16-4 | 250 | 280 | 45% | 0.10% | R812S | 31 | 48.4 | 75.6 |
| 16-5 | 1000 | 280 | 35% | 0.10% | R812S | 19.9 | 35 | 62.6 |
| 16-6 | 1000 | 280 | 35% | 0.75% | X24*** | 15.9 | 27.7 | 54.1 |
| 16-7 | 1000 | 280 | 40% | 0.75% | X24 | 19.2 | 32.3 | 60.5 |
| 16-8 | 1000 | 270 | 30% | 0.25% | R812S | 21.6 | 34.4 | 53.7 |
| 16-9 | 1000 | 290 | 30% | 0.25% | R812S | 16.8 | 29.7 | 53.7 |
| 16-10 | 1000 | 290 | 30% | 0.75% | X24 | 17 | 29.6 | 52.6 |
| 16-11 | 1000 | 270 | 30% | 0.75% | X24 | 17.5 | 30.1 | 54.2 |
| 16-12 | 250 | 250 | 30% | 0.50% | R812S | 23.1 | 36.9 | 57.8 |
| 16-13 | 1000 | 250 | 30% | 0.50% | R812S | 20.6 | 34.1 | 56.4 |
| 16-14 | 500 | 250 | 30% | 0.50% | R812S | 22.9 | 39.8 | 71 |
| 16-15 | 500 | 250 | 30% | 0.50% | R812S | 21.3 | 36.6 | 63.2 |
| 16-16 | 250 | 290 | 30% | 1% | R812S | 16 | 25.3 | 39 |
| 16-17 | 1000 | 290 | 30% | 1% | R812S | 14.5 | 22 | 33.1 |
| 16-18 | 250 | 250 | 30% | 1% | R812S | 21.3 | 33 | 50.6 |
| 16-19 | 1000 | 250 | 30% | 1% | R812S | 18.6 | 28.3 | 43.4 |

*relative to the total combined weight of PDMS oil and polyamide
**relative to the weight of polyamide
***X24 is a silica powder available from ShinEtsu having an average particle size of 0.1 μm, a specific gravity of 1.8, and a water content of 2%.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than

TABLE 14

| Example | Ex 15-1 | Ex 15-2 | Ex 15-3 | Ex 15-4 |
|---|---|---|---|---|
| PDMS Viscosity | 30,000 cSt | 60,000 cSt | 60,000 cSt | 30,000 cSt |
| Temperature | 250° C. | 250° C. | 225° C. | 225° C. |
| Percent Sieved Yield (thru 250 μm sieve) | 62% | 65% | 71% | 78% |
| D10 (μm) sieved | 33.0 | 25.8 | 21.8 | 36.4 |
| D50 (μm) sieved | 66.9 | 47.2 | 40.8 | 65.7 |
| D90 (μm) sieved | 118 | 84.9 | 72.4 | 110 |
| Span | 1.27 | 1.25 | 1.24 | 1.12 |
| Angle of Repose (°) | 42.7 | 42.3 | 40.2 | 36.1 |
| Melting Temperature (Tm) | 164° C. | 163° C. | 164° C. | 162° C. |
| Crystallization Temperature (Tc) | 120° C. | 114° C. | 111° C. | 113° C. |
| Sintering Window | 44° C. | 49° C. | 53° C. | 49° C. |
| ICP—Si | 825.4 ppm | 807.25 ppm | 433.25 ppm | 555.35 ppm |
| Sintering Temperature | 115° C. | 115° C. | 115° C. | 115° C. |
| Laser Power Range | 60-80% | 45-65% | 50-65% | 55-80% |

Example 16. Polyamide 12 microparticles were produced in a 25 mm twin-screw extruder (Werner & Pfleiderer ZSK-25). The carrier fluid was PDMS oil with 60,000 cSt viscosity at room temperature. The concentrations of components in the final mixture in the extruder are provided in Table 15. The polymer pellets were added to the extruder, brought to temperature, and then preheated carrier fluid having silica nanoparticles dispersed therein added to the molten polymer in the extruder. Other operational parameters are provided in Table 15. Then, the mixture was discharged into a container and allowed to cool to room temperature over several hours. The light scattering particle size data is also provided in Table 15.

as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. A method comprising:
providing a mixture within a reactor, the mixture comprising a thermoplastic polymer, a carrier fluid that is immiscible with the thermoplastic polymer, and an emulsion stabilizer comprising a plurality of nanoparticles;
shearing the mixture within the reactor at a temperature greater than a melting point or softening temperature of the thermoplastic polymer and at a shear rate sufficiently high to form the thermoplastic polymer into melted droplets in the reactor, the melted droplets being dispersed in the carrier fluid;
cooling the mixture to below the melting point or softening temperature of the thermoplastic polymer to form solidified particles comprising the thermoplastic polymer and the emulsion stabilizer associated with an outer surface of the solidified particles; and
separating the solidified particles from the carrier fluid.

2. The method of claim 1, wherein the plurality of nanoparticles comprises oxide nanoparticles, carbon black, polymer nanoparticles, or any combination thereof.

3. The method of claim 1, wherein the plurality of nanoparticles comprises oxide nanoparticles.

4. The method of claim 3, wherein the oxide nanoparticles comprise silica nanoparticles.

5. The method of claim 1, wherein at least a portion of the nanoparticles are embedded in the outer surface.

6. The method of claim 1, wherein the emulsion stabilizer comprises a surfactant and the plurality of nanoparticles.

7. The method of claim 1, wherein the emulsion stabilizer is present in the mixture at about 0.01 wt % to about 10 wt % by weight of the thermoplastic polymer.

8. The method of claim 1, wherein the thermoplastic polymer is present the mixture at about 5 wt % to about 60 wt % of the mixture.

9. The method of claim 1, wherein the carrier fluid has a viscosity at 25° C. of about 1,000 cSt to about 150,000 cSt.

10. The method of claim 1, wherein the carrier fluid is selected from the group consisting of silicone oil, fluorinated silicone oils, perfluorinated silicone oils, polyethylene glycols, alkyl-terminal polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxyalkylenes, and any combination thereof.

11. The method of claim 1, wherein the thermoplastic polymer is selected from the group consisting of polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters, polylactic acid, polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block, grafted or ungrafted thermoplastic polyolefins, functionalized or nonfunctionalized ethylene/vinyl monomer polymer, functionalized or nonfunctionalized ethylene/alkyl (meth) acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS) core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate) s, polybutadienes, polyisoprenes, styrenic block copolymers, polyacrylonitriles, silicones, and any combination thereof.

12. The method of claim 1, wherein the solidified particles have a D10 of about 0.5 μm to about 125 μm, a D50 of about 1 μm to about 200 μm, and a D90 of about 70 μm to about 300 μm, wherein D10<D50<D90.

13. The method of claim 1, wherein the solidified particles have a Hausner ratio of about 1.0 to about 1.5.

14. The method of claim 1, wherein the solidified particles have a circularity of about 0.9 to about 1.0.

15. The method of claim 11, wherein the thermoplastic polymer contains an internal additive before forming the mixture.

16. The method of claim 15, wherein the internal additive is present in the thermoplastic polymer at about 0.1 wt % to about 60 wt % relative to the thermoplastic polymer.

17. The method of claim 1, wherein the plurality of nanoparticles has a D50 of about 10 nm to about 150 nm.

18. The method of claim 1, wherein shearing occurs in an extruder.

19. The method of claim 11, further comprising:
combining an external additive with the solidified particles after separation thereof.

* * * * *